United States Patent
Beemer et al.

(10) Patent No.: US 11,187,360 B2
(45) Date of Patent: Nov. 30, 2021

(54) FLUIDIC CONNECTOR ASSEMBLY FOR QUICK CONNECT/DISCONNECT

(71) Applicant: IDEX Health & Science LLC, Oak Harbor, WA (US)

(72) Inventors: Eric Beemer, Anacortes, WA (US); Scott Ellis, Anacortes, WA (US); Craig Graham, Anacortes, WA (US); Nathaniel Nienhuis, Coupeville, WA (US); Troy Sanders, Oak Harbor, WA (US)

(73) Assignee: IDEX Health & Science LLC, Oak Harbor, WA (US)

(*) Notice: Subject to any disclaimer, the term of this patent is extended or adjusted under 35 U.S.C. 154(b) by 843 days.

(21) Appl. No.: 15/617,792

(22) Filed: Jun. 8, 2017

(65) Prior Publication Data
US 2017/0276275 A1 Sep. 28, 2017

Related U.S. Application Data

(63) Continuation-in-part of application No. 14/922,041, filed on Oct. 23, 2015.
(Continued)

(51) Int. Cl.
*F16L 33/22* (2006.01)
*G01N 30/60* (2006.01)
(Continued)

(52) U.S. Cl.
CPC .............. *F16L 33/227* (2013.01); *B01L 3/563* (2013.01); *F16L 19/0206* (2013.01);
(Continued)

(58) Field of Classification Search
CPC ..... F16L 33/227; F16L 33/32; F16L 19/0206; F16L 19/0212; F16L 3/0985; G01N 30/6026; G01N 30/6039
(Continued)

(56) References Cited

U.S. PATENT DOCUMENTS 2,748,804 A   6/1956   Guarnaschelli
3,245,703 A   4/1966   Manly
(Continued)

FOREIGN PATENT DOCUMENTS

CN   2087340    10/1991
DE   4114765    11/1992
(Continued)

OTHER PUBLICATIONS

International Search Report and Written Opinion; PCT/US2017/036590 dated Aug. 24, 2017.
(Continued)

*Primary Examiner* — Matthew Troutman
*Assistant Examiner* — Fannie C Kee
(74) *Attorney, Agent, or Firm* — Kilpatrick Townsend & Stockton LLP

(57) ABSTRACT

A fluidic connection assembly and methods for quickly connecting or disconnecting a tube to a port by hand and without the use of tools. A body is adapted to receive a tube therethrough, and may have at least two sides which are hinged. Each of the hinged sides has corresponding latching portions or projections located near a lower end of the body. These projections are adapted to fit into a port or other fitting and be securely held in place. The assembly may include a tube extending through a body and through a spring located between the end of the body and the end of the tube, whereby the spring exerts a force directly or indirectly against the end of the tube and against the body, thus holding the tubing securely and sealingly engaged in the port when the assembly is connected. The body may further comprise an additional body or an adapter, and/or a cap and latch. A second spring may be used to push a projecting member into a groove or notch of an adapter when an end of the adapter is inserted into one end of the latch or the body. The fluidic (Continued)

connection assembly is useful in analytical instrument systems, such as for in vitro applications and/or in high pressure applications, among other things, and may be used in methods for connecting, or disconnecting, tubing or a fluidic connection assembly from a port or other fitting or connection.

22 Claims, 36 Drawing Sheets

Related U.S. Application Data

(60) Provisional application No. 62/349,569, filed on Jun. 13, 2016, provisional application No. 62/067,739, filed on Oct. 23, 2014, provisional application No. 62/127,276, filed on Mar. 2, 2015, provisional application No. 62/168,491, filed on May 29, 2015.

(51) Int. Cl.
  F16L 19/02      (2006.01)
  F16L 37/098     (2006.01)
  B01L 3/00       (2006.01)
  F16L 33/32      (2006.01)

(52) U.S. Cl.
  CPC ........... *F16L 19/0212* (2013.01); *F16L 33/32* (2013.01); *F16L 37/0985* (2013.01); *G01N 30/60* (2013.01); *B01L 2300/0838* (2013.01)

(58) Field of Classification Search
  USPC .................................................. 285/305, 308
  See application file for complete search history.

(56) References Cited

U.S. PATENT DOCUMENTS

| | | |
|---|---|---|
| 3,880,452 A | 4/1975 | Fields |
| 4,076,286 A | 2/1978 | Spontelli |
| 4,083,702 A | 4/1978 | Hartigan et al. |
| 4,135,745 A | 1/1979 | Dehar |
| 4,311,328 A * | 1/1982 | Truchet .................. F16L 37/22 285/308 |
| 4,413,846 A * | 11/1983 | Oetiker ................. F16L 37/086 285/317 |
| 4,436,125 A * | 3/1984 | Blenkush ............ F16L 37/0841 137/797 |
| 4,483,510 A * | 11/1984 | Palau ................. F16L 37/0841 137/596 |
| 4,619,473 A | 10/1986 | Someya |
| 4,781,399 A | 11/1988 | Collon |
| 4,834,423 A | 5/1989 | DeLand |
| 4,915,427 A | 4/1990 | Zahuranec |
| 4,991,883 A | 2/1991 | Worden |
| 5,169,120 A | 12/1992 | Guthrie, Jr. et al. |
| 5,183,140 A | 2/1993 | Nicoli |
| 5,306,052 A | 4/1994 | Megushion |
| 5,525,303 A | 6/1996 | Ford et al. |
| 5,595,406 A | 1/1997 | Warchol |
| 5,601,785 A | 2/1997 | Higdon |
| 5,651,885 A | 7/1997 | Schick |
| 5,709,413 A | 1/1998 | Salyers |
| 5,730,943 A | 3/1998 | Ford et al. |
| 5,803,512 A | 9/1998 | Hollnagel |
| 5,951,063 A | 9/1999 | Szabo |
| 6,056,331 A | 5/2000 | Benett et al. |
| 6,095,572 A | 8/2000 | Ford et al. |
| 6,149,127 A | 11/2000 | Kish |
| 6,273,478 B1 | 8/2001 | Benette et al. |
| 6,361,687 B1 | 3/2002 | Ford et al. |
| 6,494,500 B1 | 12/2002 | Todosiev et al. |
| 6,497,433 B1 | 12/2002 | Ketcham |
| 6,926,313 B1 | 8/2005 | Renzi |
| 7,014,222 B1 | 3/2006 | Poppe |
| 7,434,842 B2 * | 10/2008 | Schmidt .............. F16L 37/0841 285/308 |
| 7,434,844 B2 * | 10/2008 | Kao .................... F16L 37/0841 137/614.03 |
| 7,472,930 B2 * | 1/2009 | Tiberghien .......... F16L 37/0841 285/316 |
| 7,513,535 B2 | 4/2009 | Charles et al. |
| 7,695,020 B2 | 4/2010 | Schmidt |
| 7,984,933 B2 | 7/2011 | Helstern |
| 8,006,367 B1 | 8/2011 | Best |
| 8,448,994 B2 | 5/2013 | Pisula, Jr. et al. |
| 9,091,693 B2 | 7/2015 | Hochgraeber et al. |
| 9,334,989 B2 | 5/2016 | Jencks et al. |
| 2002/0093194 A1 | 7/2002 | Lacroix et al. |
| 2002/0101079 A1 | 8/2002 | Ehrke |
| 2005/0012330 A1 * | 1/2005 | Schmidt .............. F16L 37/0841 285/317 |
| 2005/0057042 A1 | 3/2005 | Wicks |
| 2007/0052237 A1 | 3/2007 | Udhofer et al. |
| 2007/0120361 A1 * | 5/2007 | Kao .................... F16L 37/0841 285/308 |
| 2007/0205567 A1 | 9/2007 | Eberle |
| 2009/0160133 A1 | 6/2009 | Williams et al. |
| 2009/0295156 A1 | 12/2009 | Ford et al. |
| 2011/0006519 A1 | 1/2011 | Weh |
| 2011/0298210 A1 | 12/2011 | Hochgraeber et al. |
| 2012/0024405 A1 | 2/2012 | Boeld et al. |
| 2012/0024411 A1 | 2/2012 | Hahn et al. |
| 2012/0061955 A1 | 3/2012 | Hochgraeber et al. |
| 2013/0298647 A1 | 11/2013 | Falk-Jordan |
| 2013/0341260 A1 | 12/2013 | Dehmer |
| 2014/0102561 A1 | 4/2014 | Wright |
| 2014/0145437 A1 | 5/2014 | Burger et al. |
| 2016/0116088 A1 | 4/2016 | Graham et al. |

FOREIGN PATENT DOCUMENTS

| | | |
|---|---|---|
| DE | 102008059897 | 6/2010 |
| DE | 102009022368 | 11/2010 |
| EP | 0087598 | 9/1983 |
| EP | 2564104 | 3/2013 |
| JP | 2004044780 | 2/2004 |
| JP | 2004169829 | 6/2004 |
| JP | 2004197835 | 7/2004 |
| WO | 91/00470 | 1/1991 |
| WO | 2001073338 | 10/2001 |
| WO | 2006083597 | 8/2006 |
| WO | 2006091952 | 8/2006 |
| WO | 2010000324 | 1/2010 |
| WO | 2010010884 | 1/2010 |
| WO | 2011137452 | 11/2011 |
| WO | 2012177403 | 12/2012 |

OTHER PUBLICATIONS

Notice of Opposition dated Jan. 22, 2015.
A. Sonnenschein, H. Knauer, "Dynaseal-Connection System for HPLC", Chromatographia vol. 22, No. 7-12, Dec. 1986.
Dr. Herbert Knauer Wissenschaftliche Gerate KG, "Dynaseal-Verbindungsytem für die HPLC," 1986.
Excerpt from catalog "Scivex 2003, Upchurch Scientific Division: Catalog of Chromatography & fluid Transfer Components," 2003.
International Search Report dated Mar. 3, 2016.
Japanese Application No. 2019-516915, Office Action dated Apr. 14, 2021, 11 pages (3 pages of Original Document and 8 pages of English Translation).
European Application No. EP17813822.8, Extended European Search Report dated Dec. 12, 2019, 12 pages.
International Application No. PCT/US2017/036590, International Preliminary Report on Patentability dated Dec. 27, 2018, 8 pages.

* cited by examiner

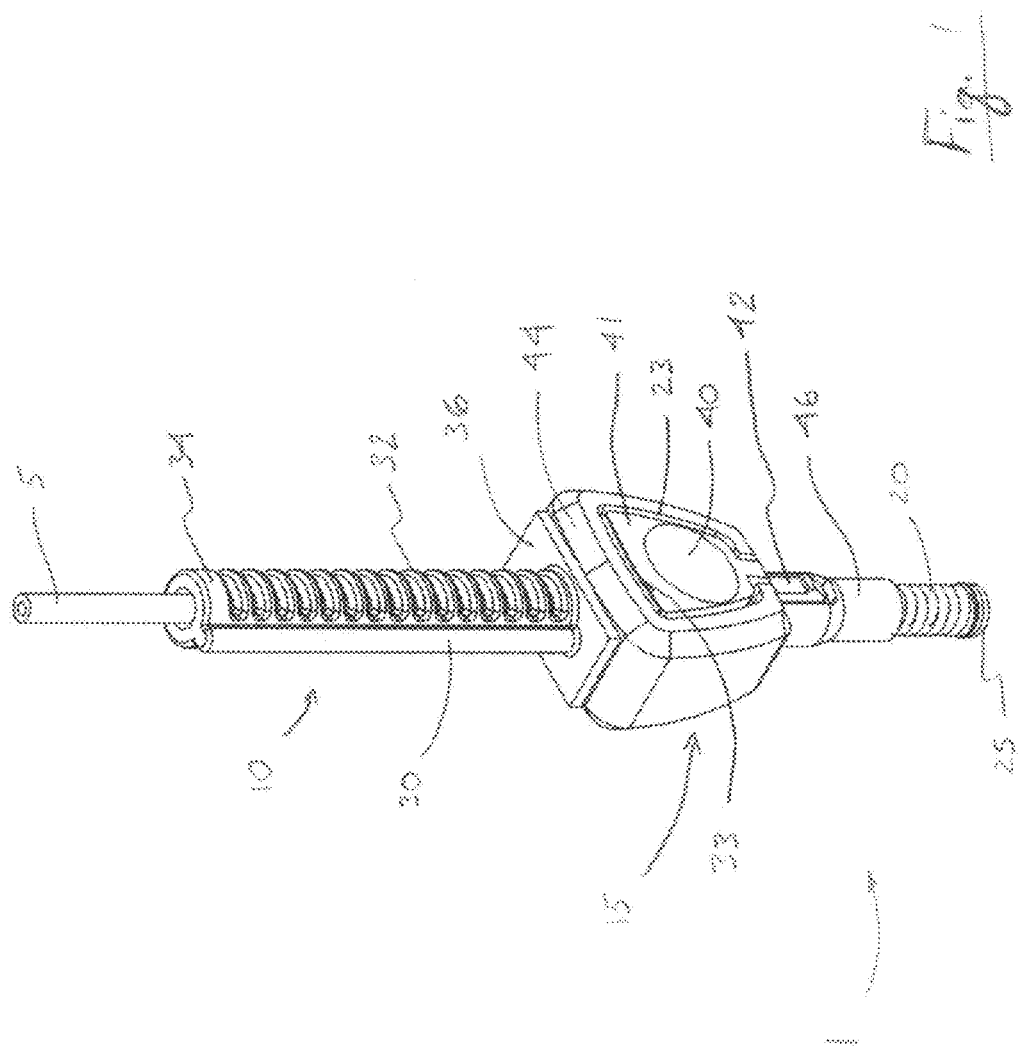

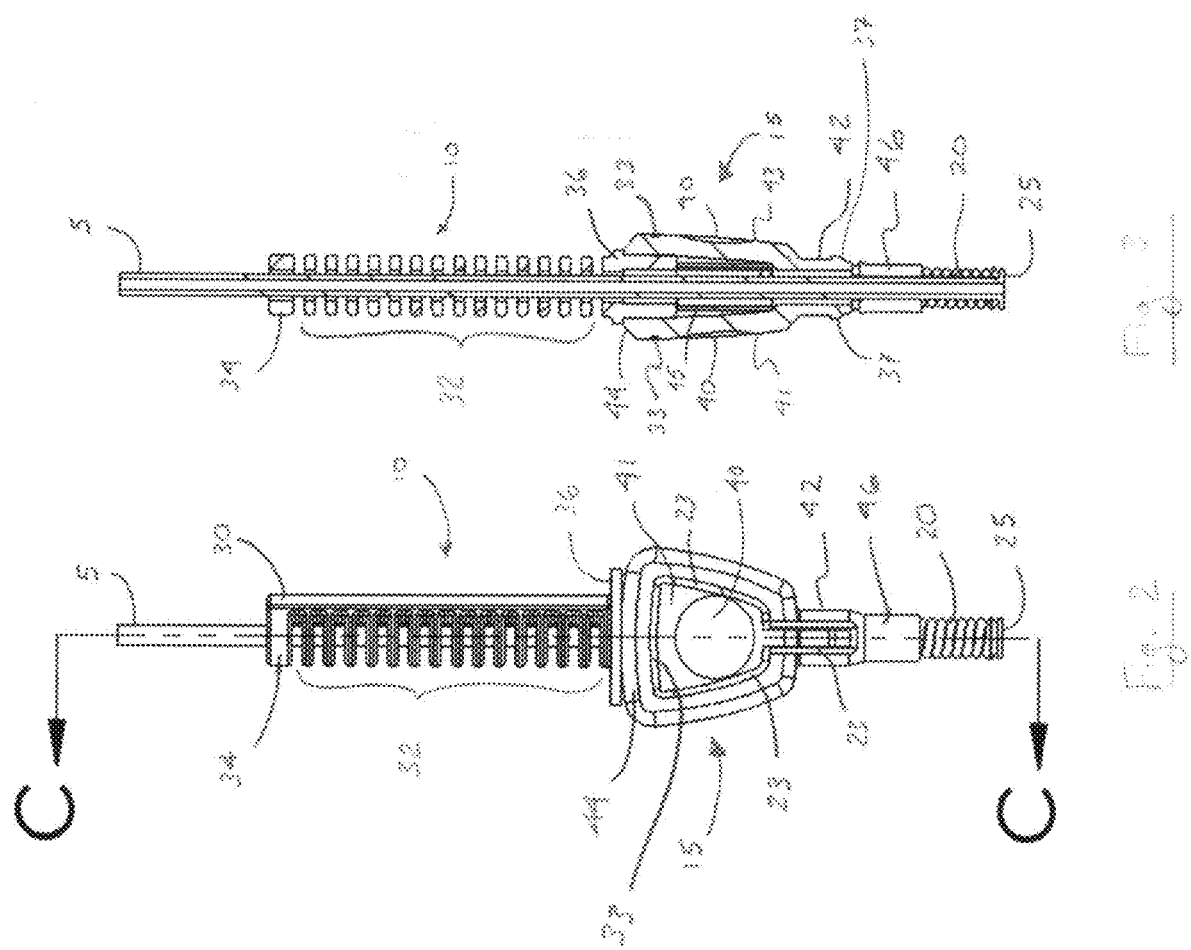

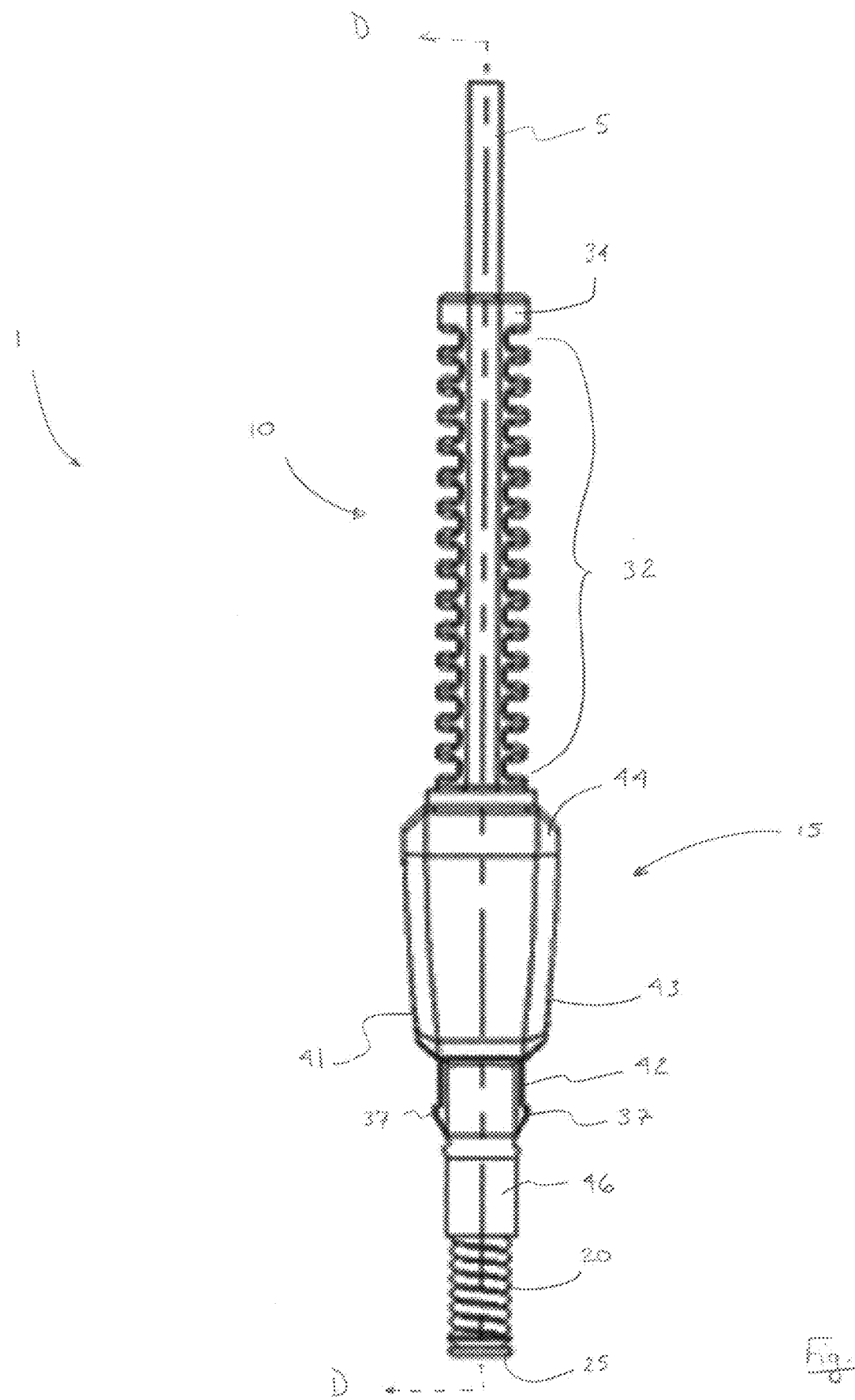

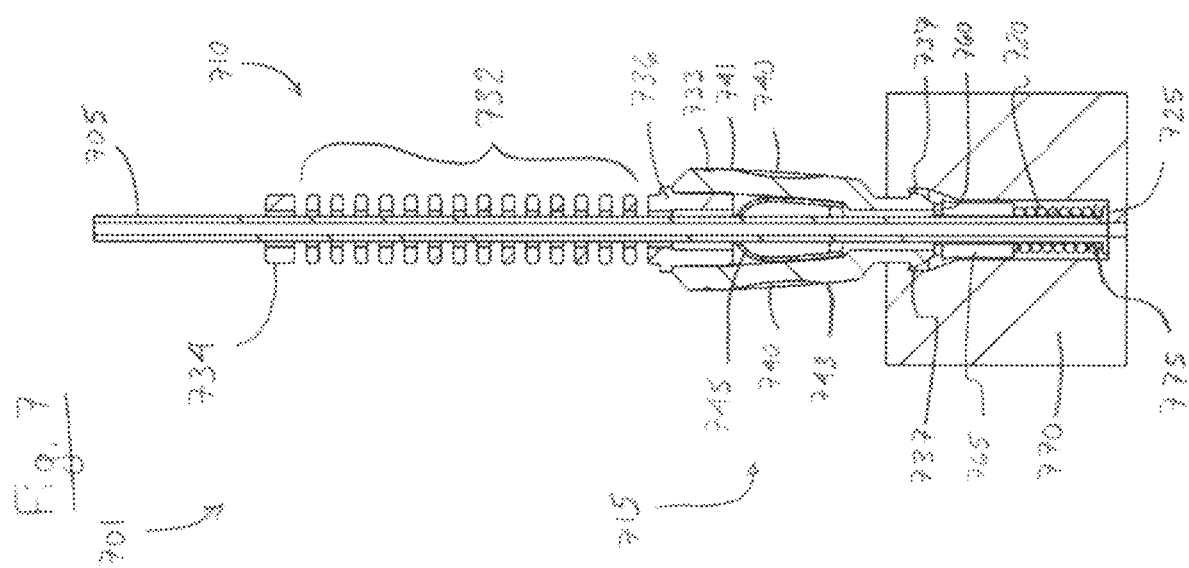

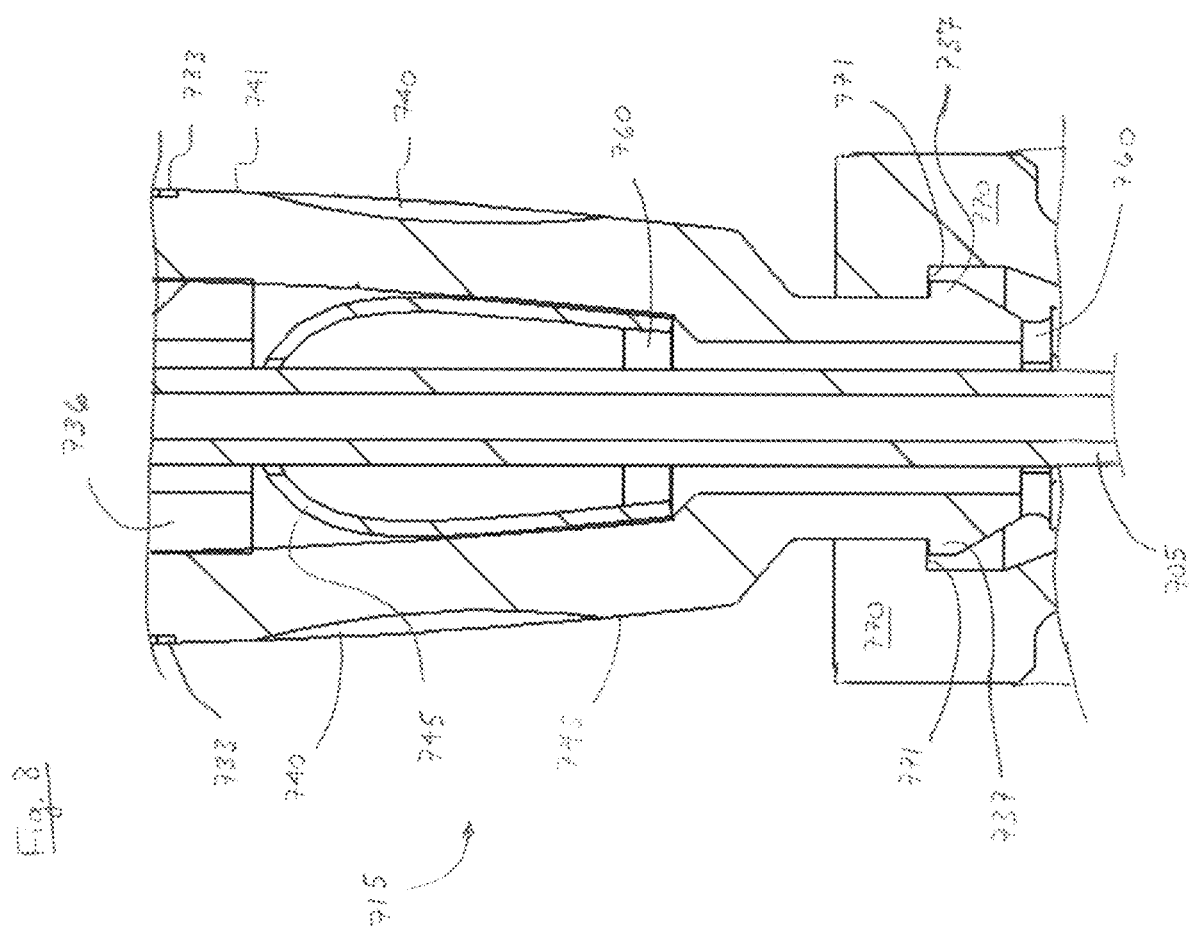

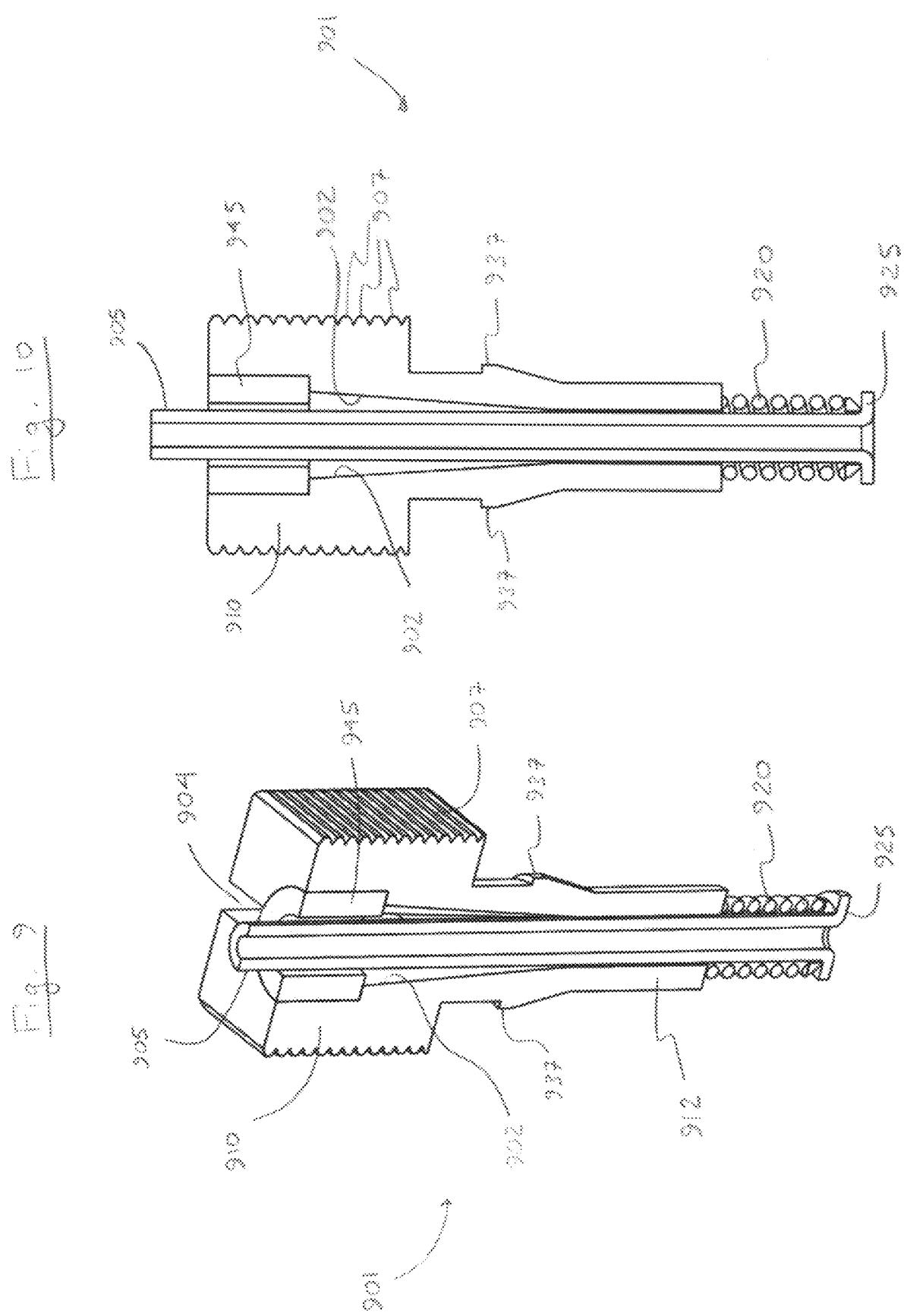

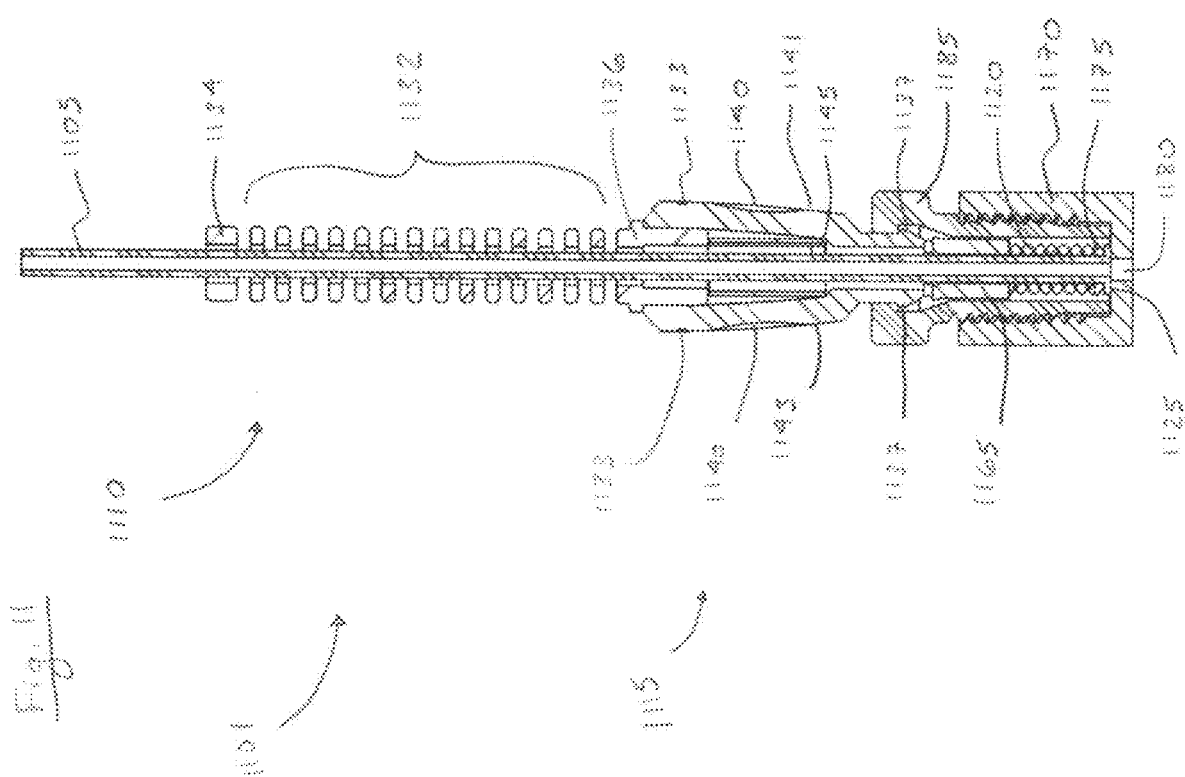

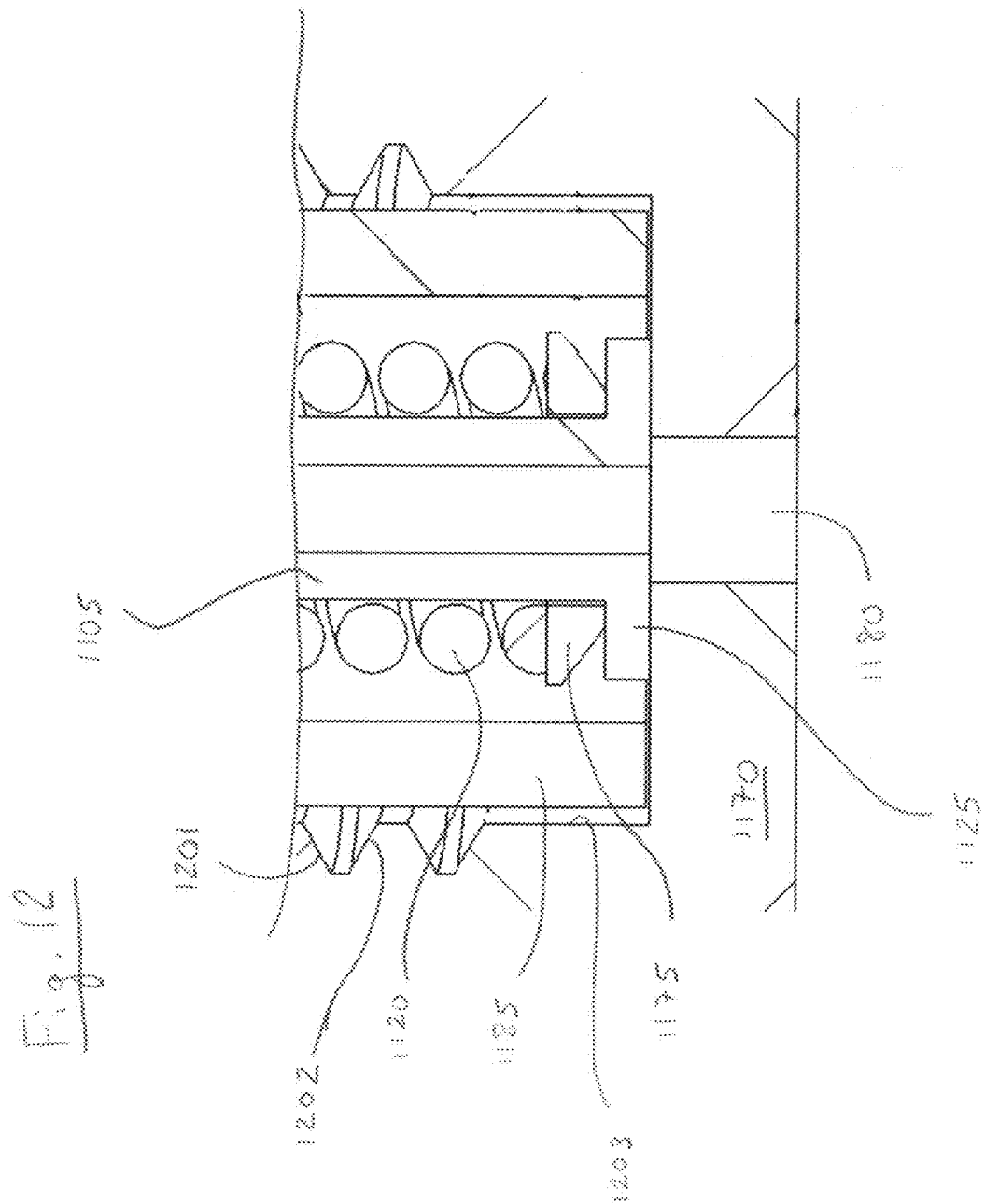

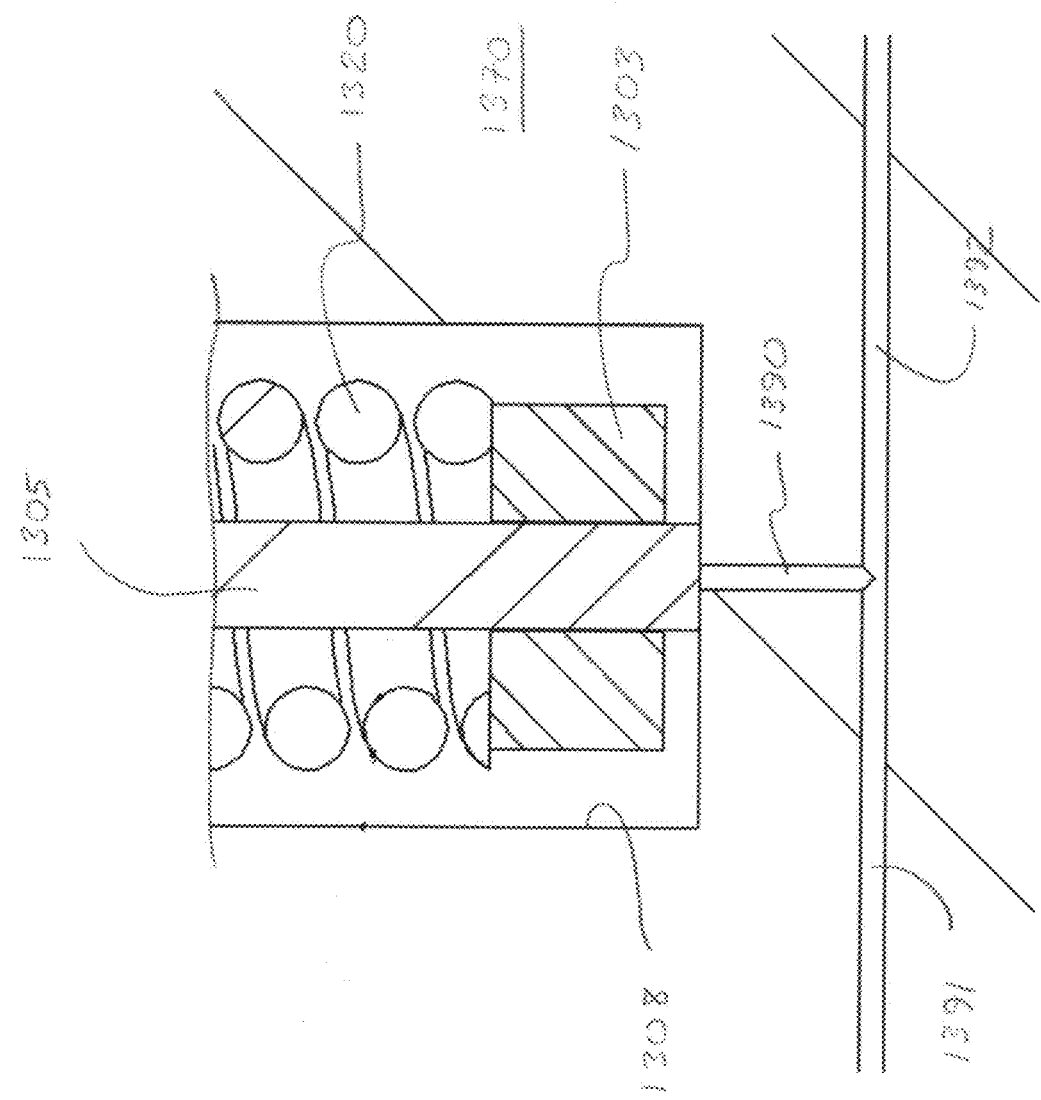

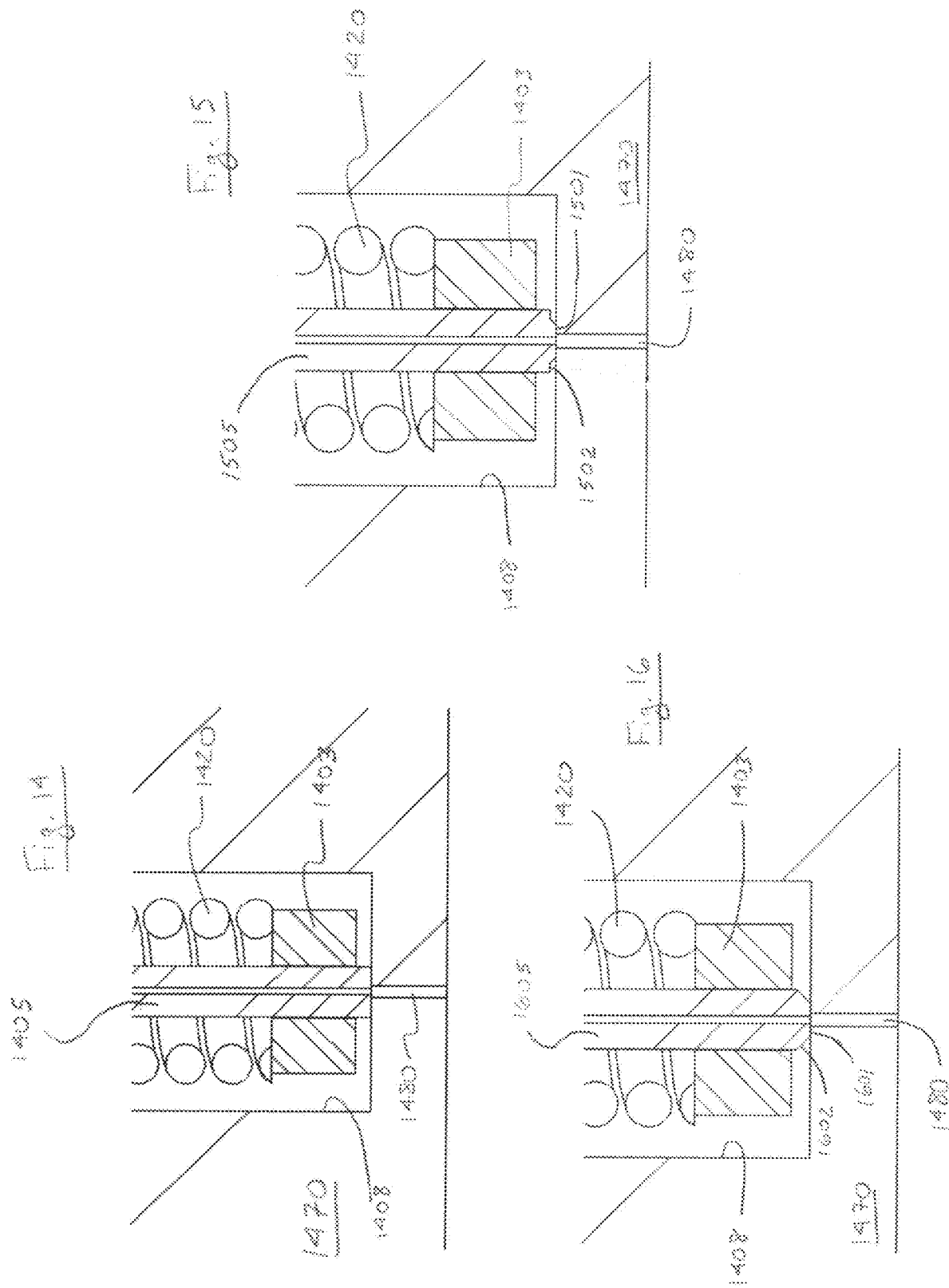

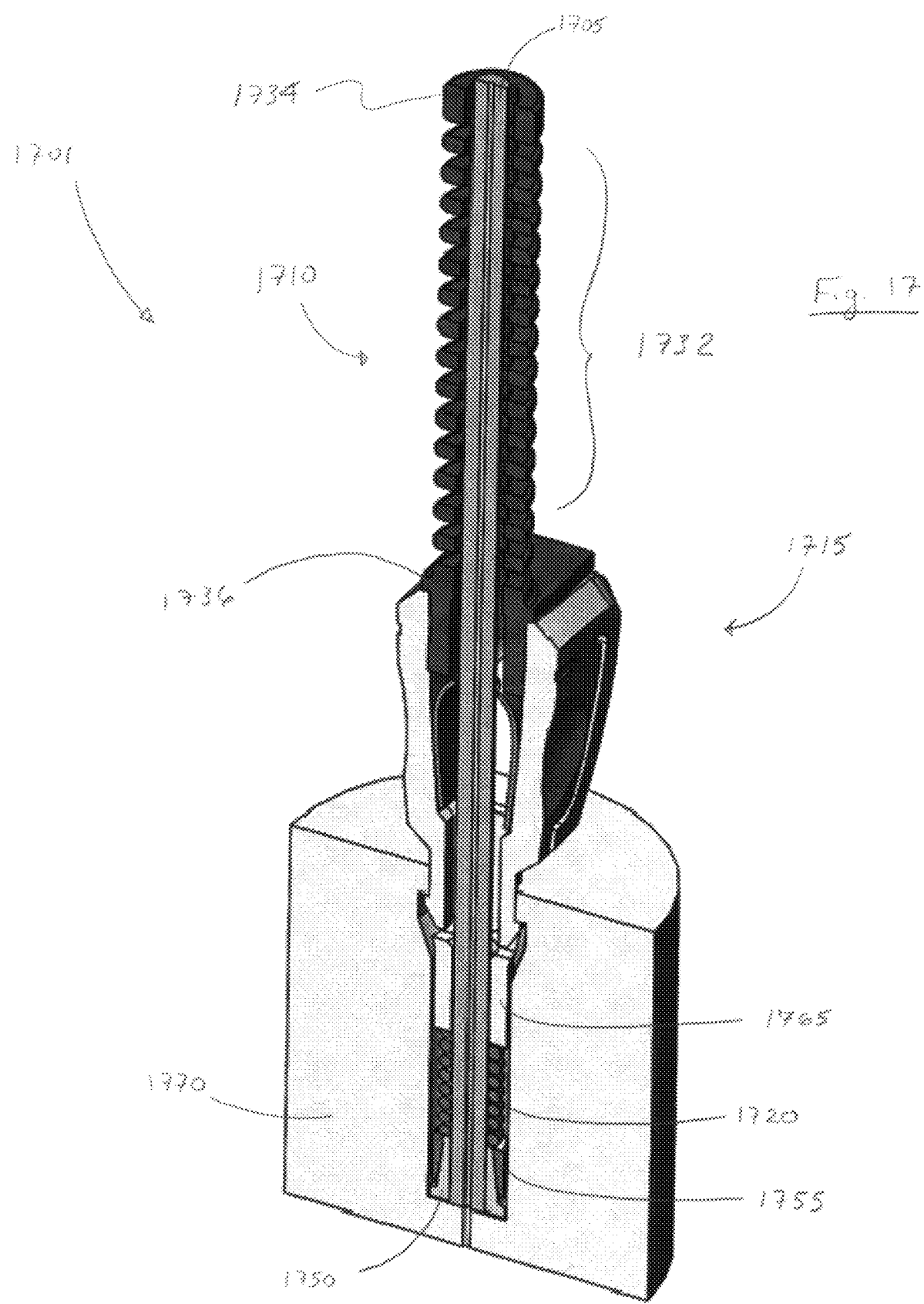

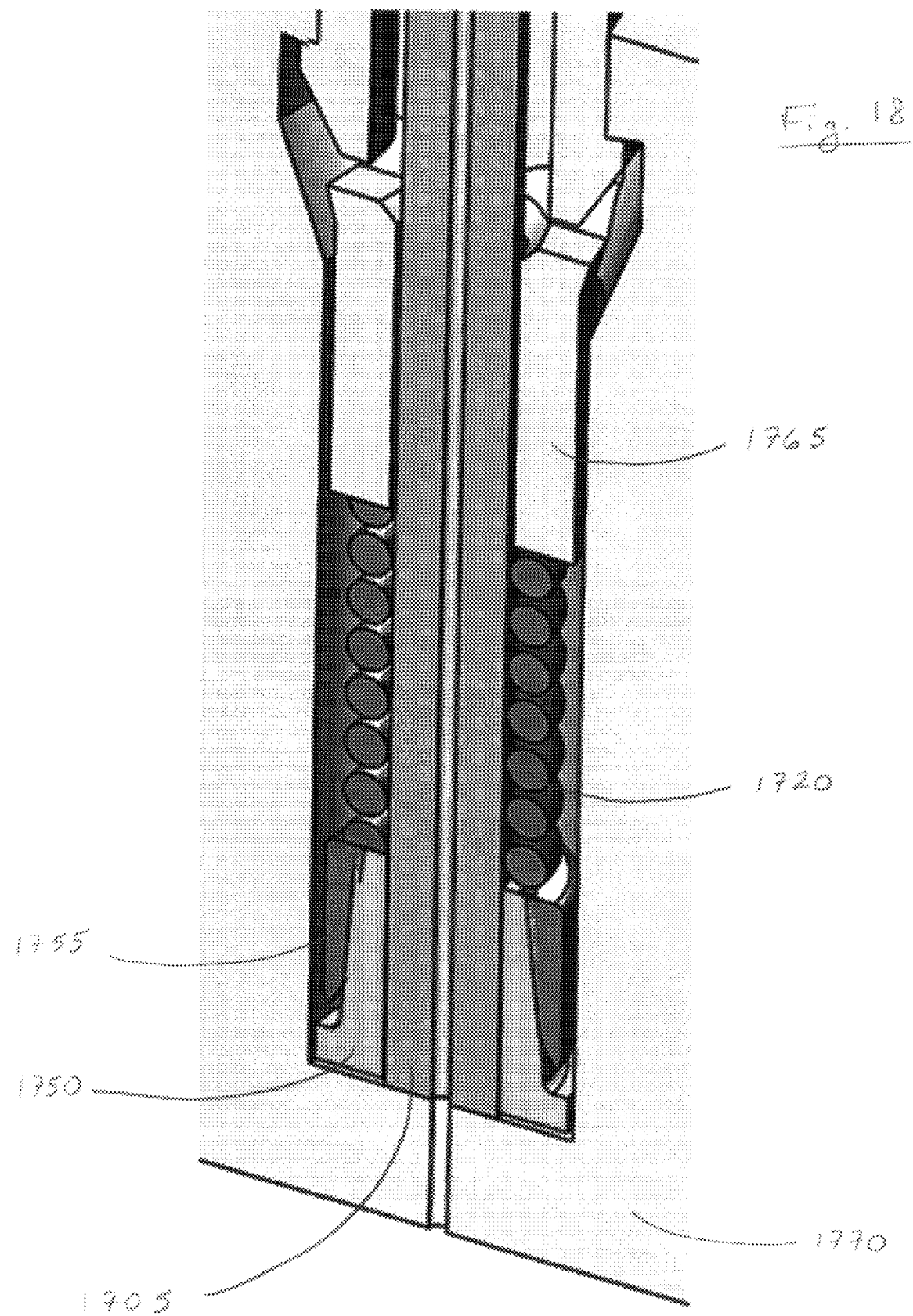

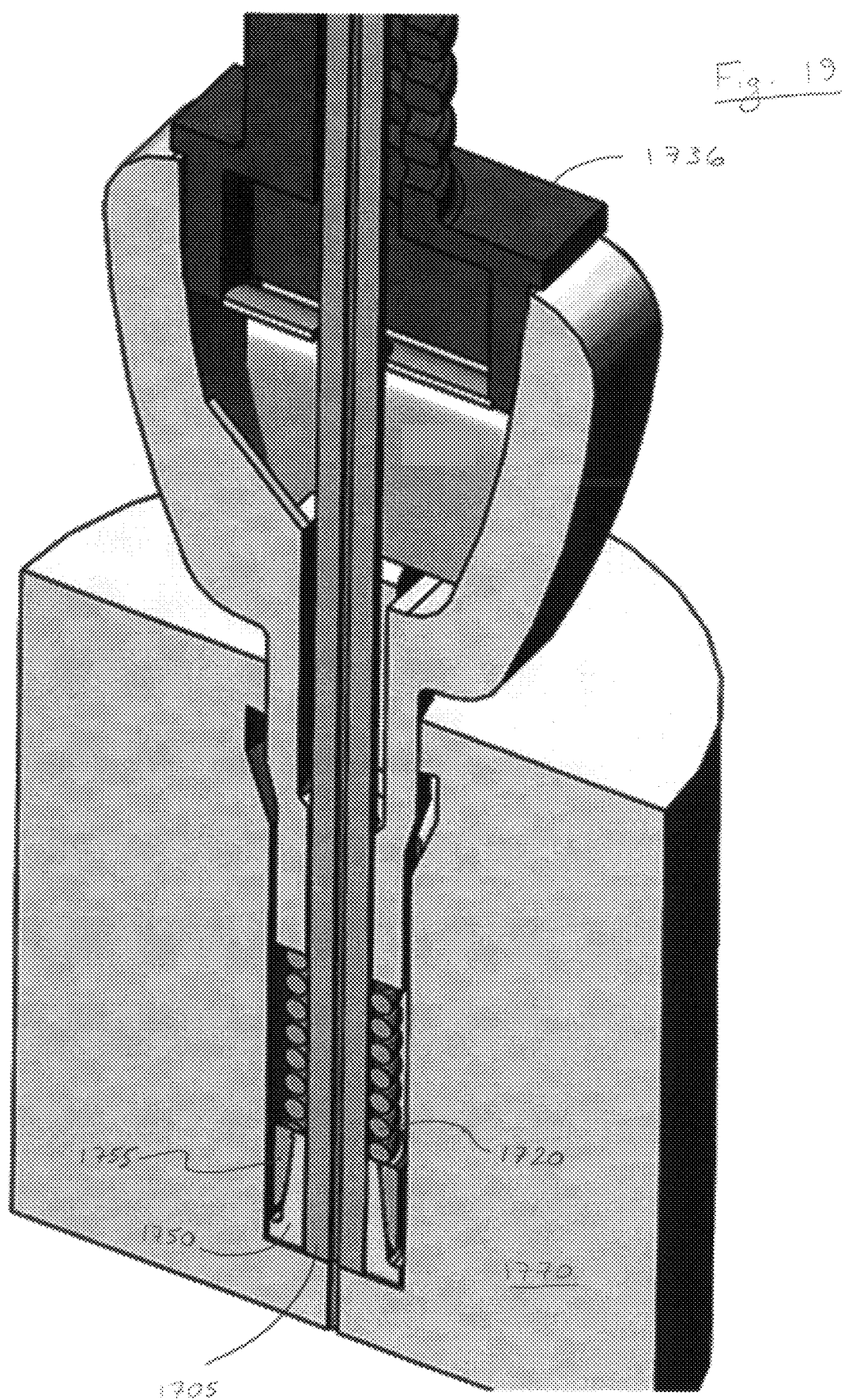

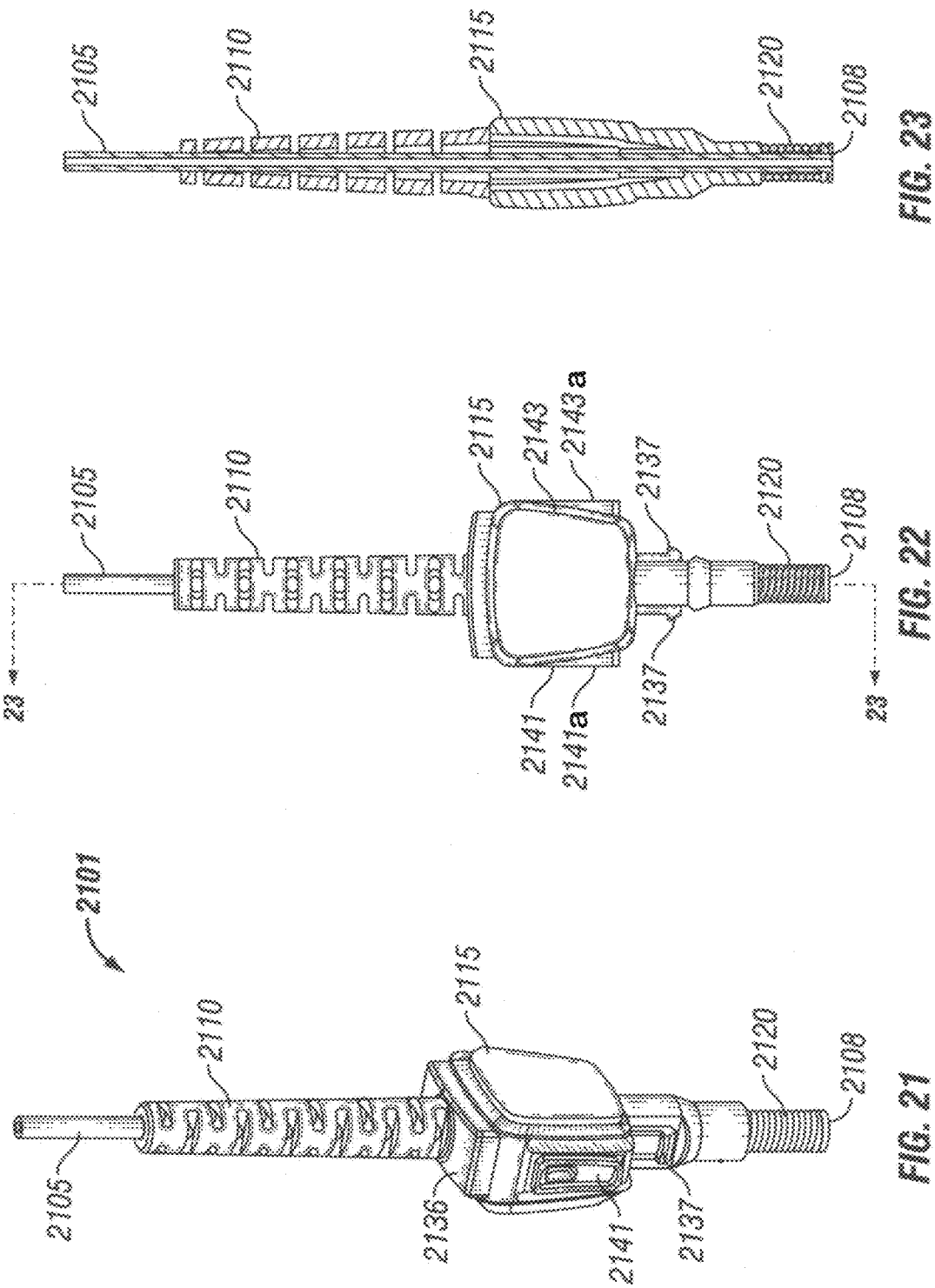

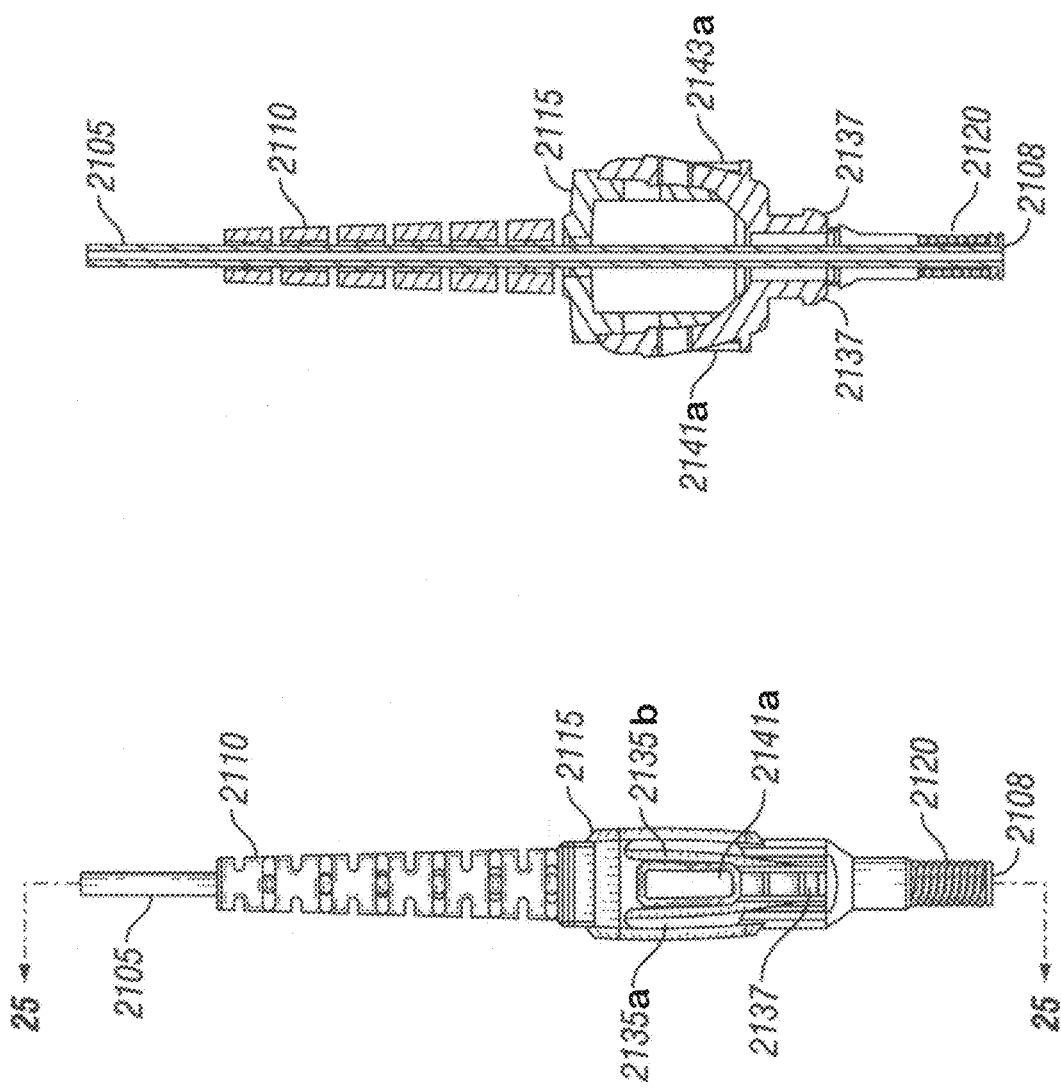

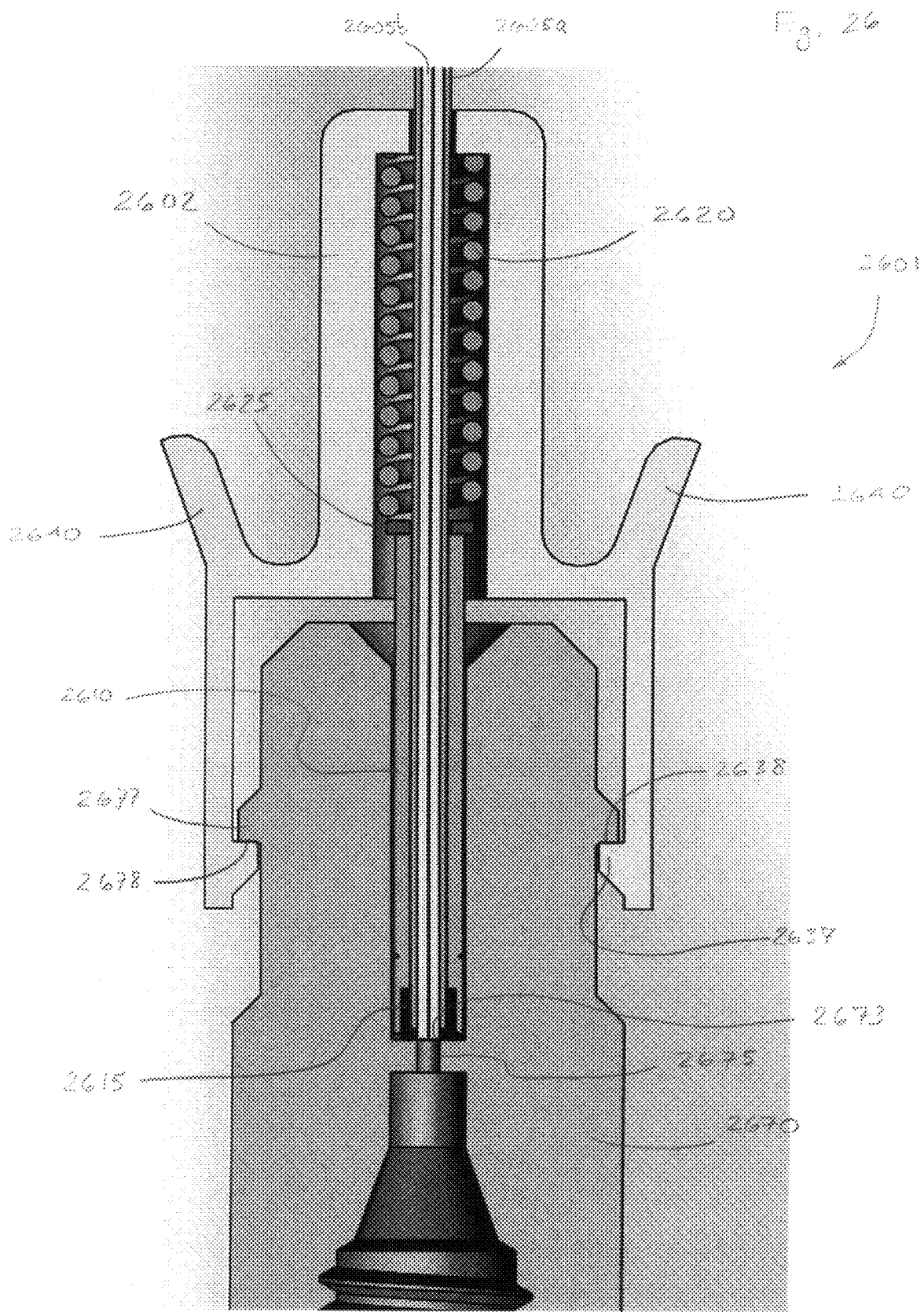

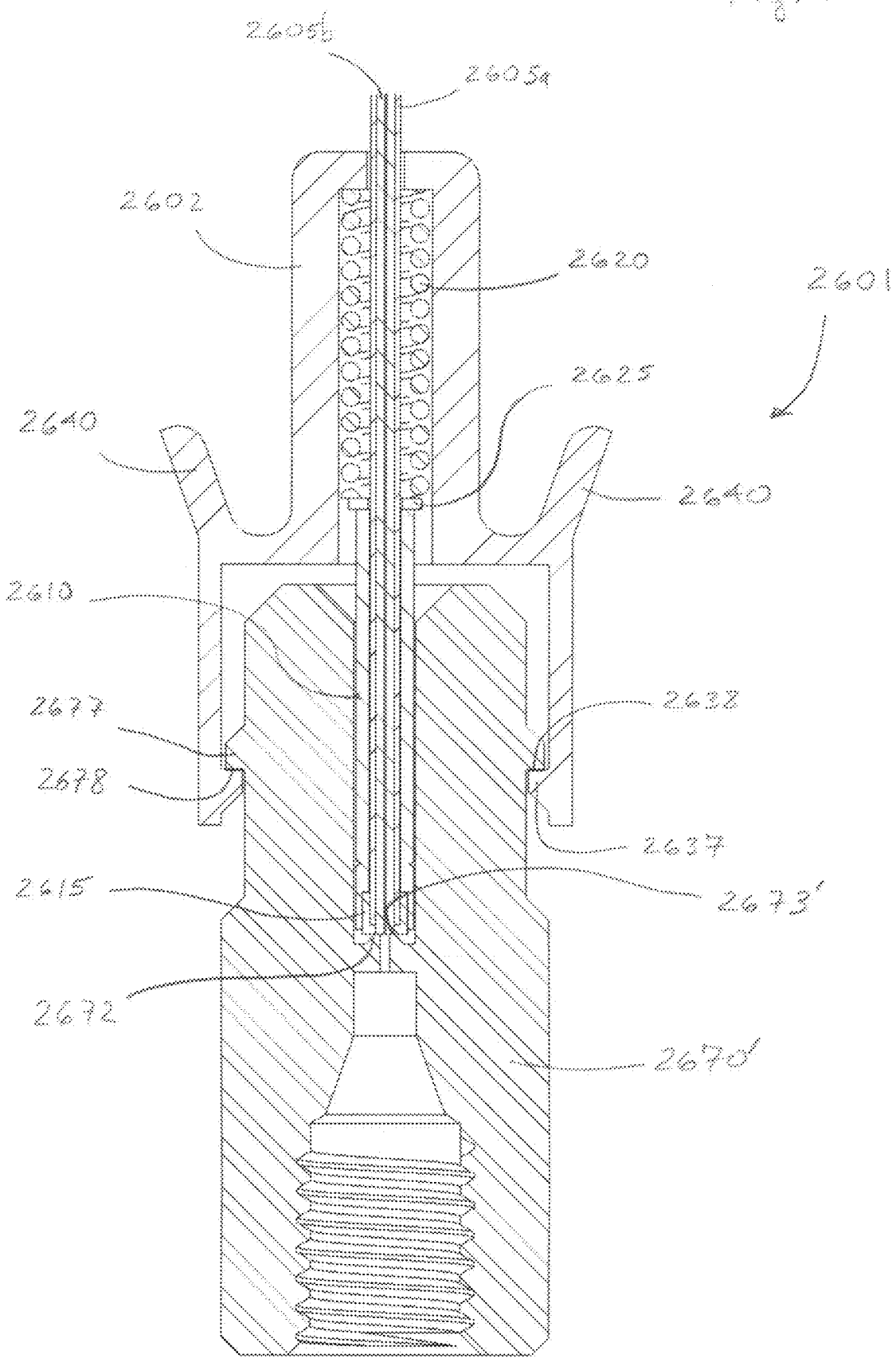

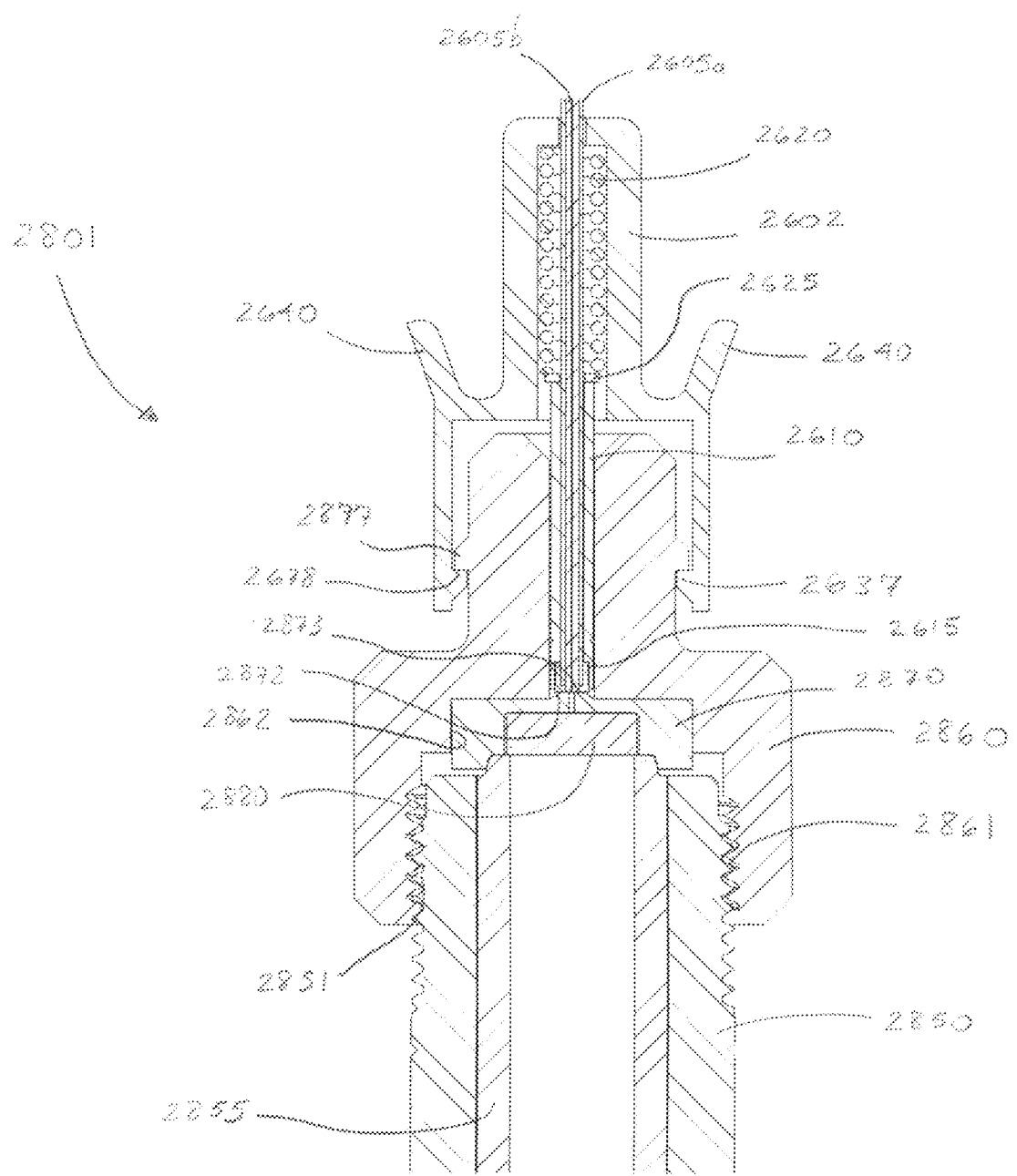

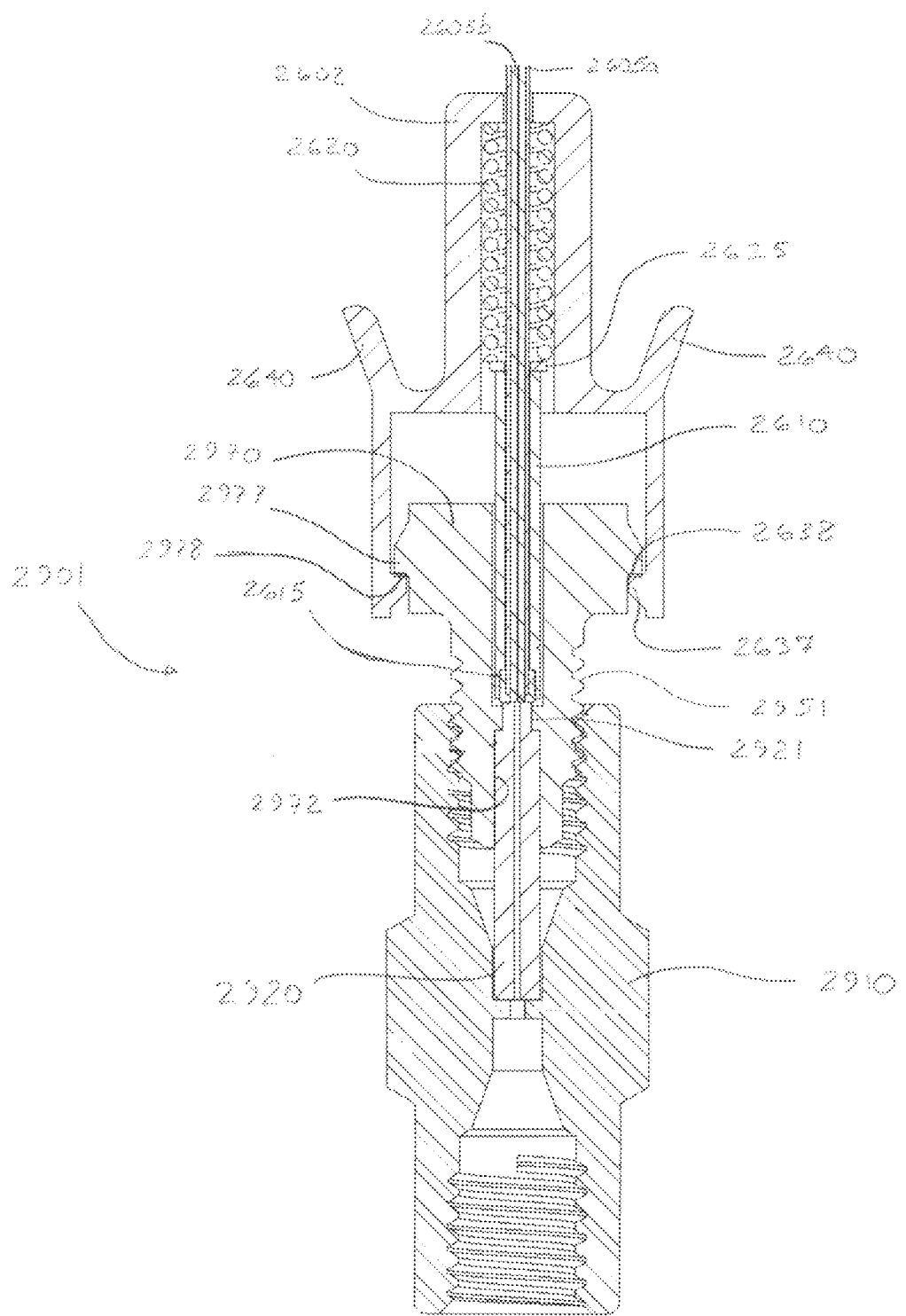

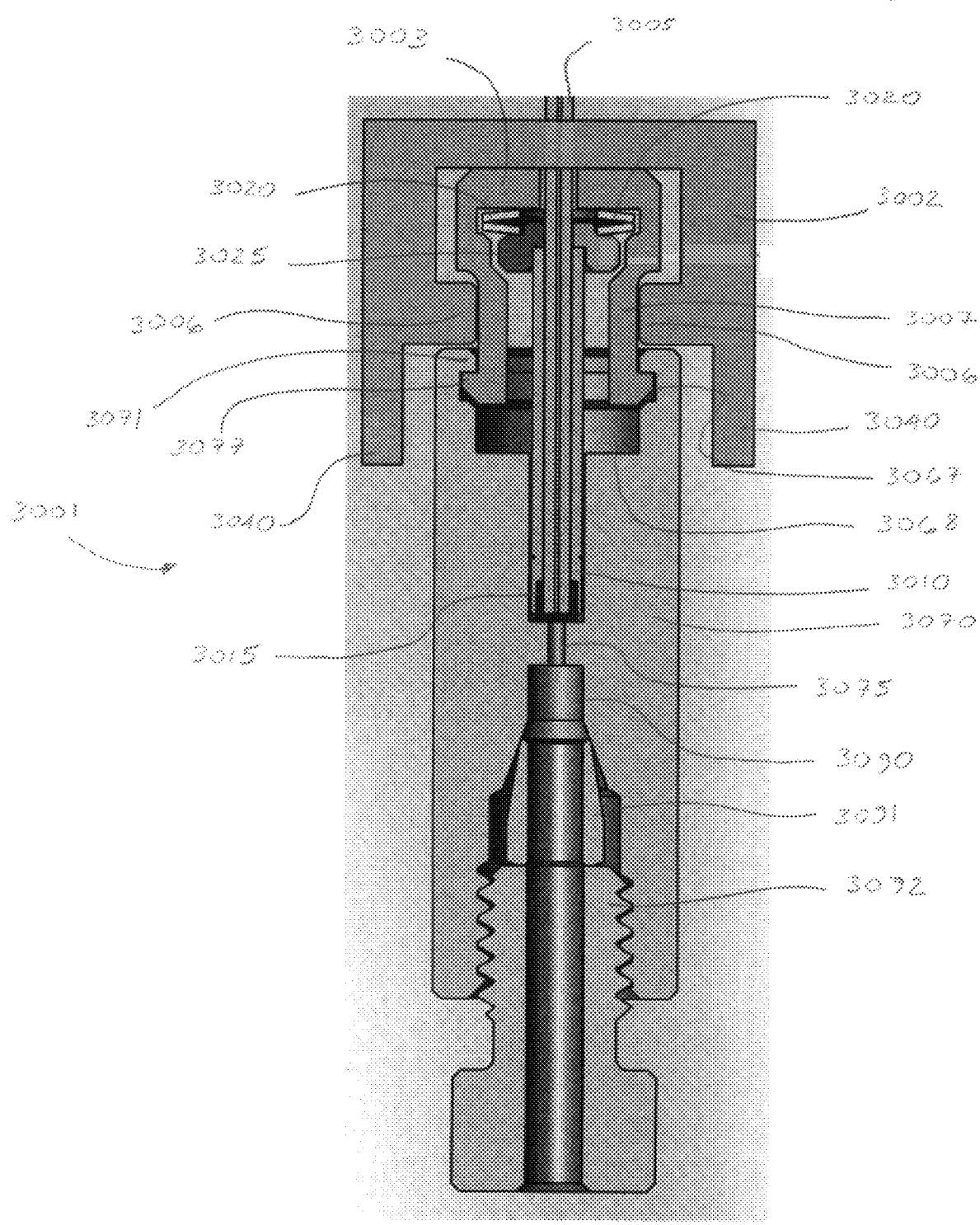

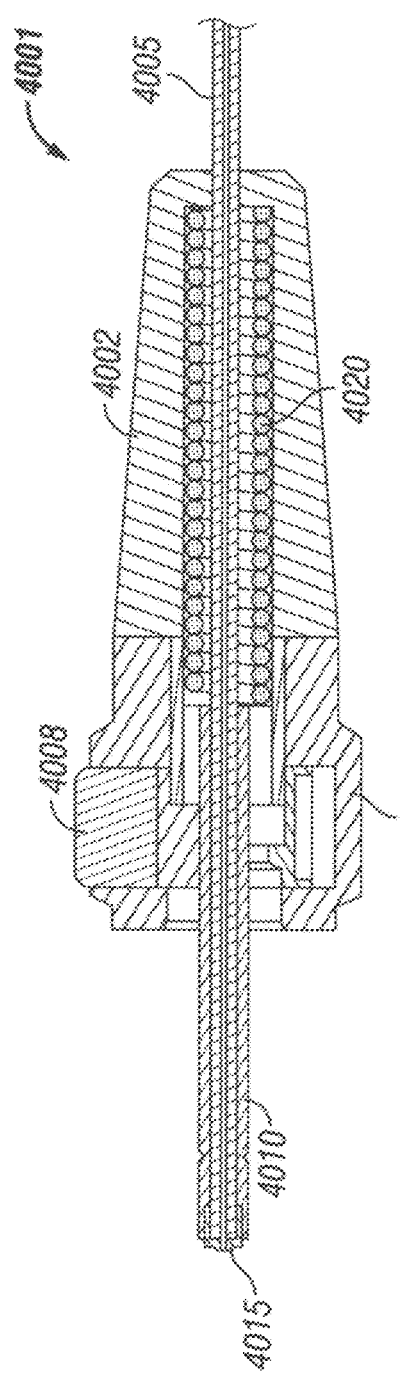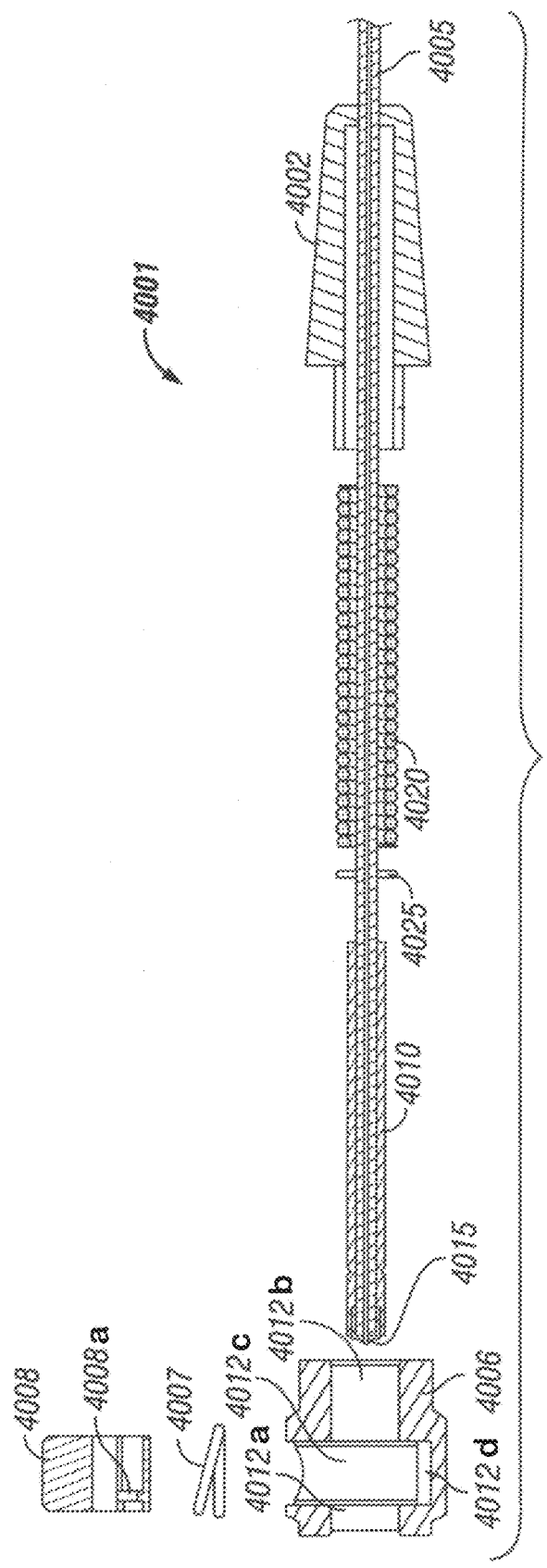
FIG. 39
FIG. 40

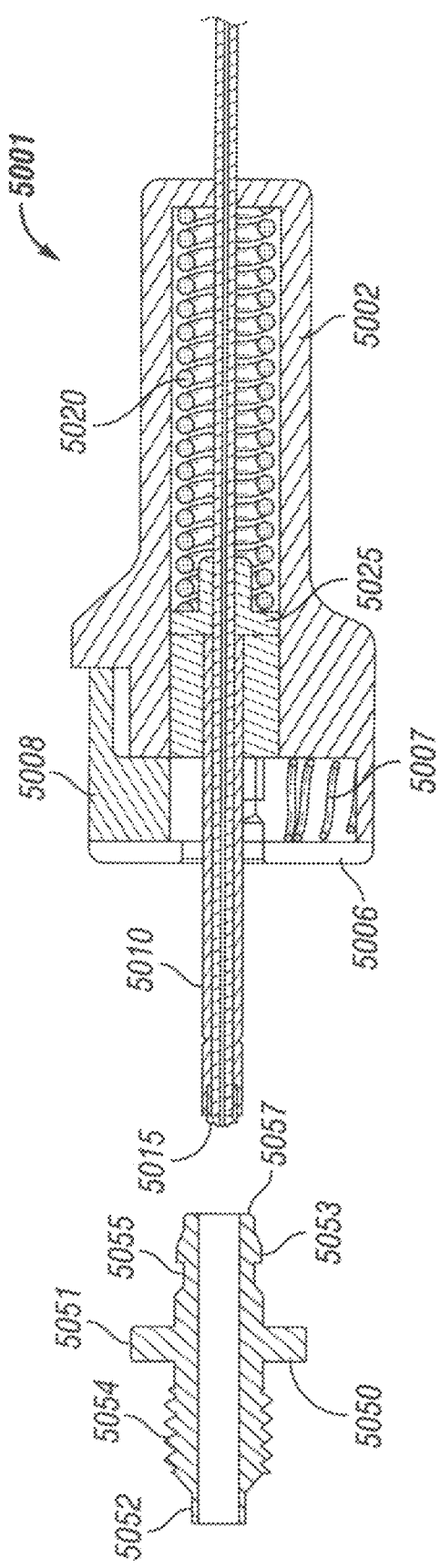
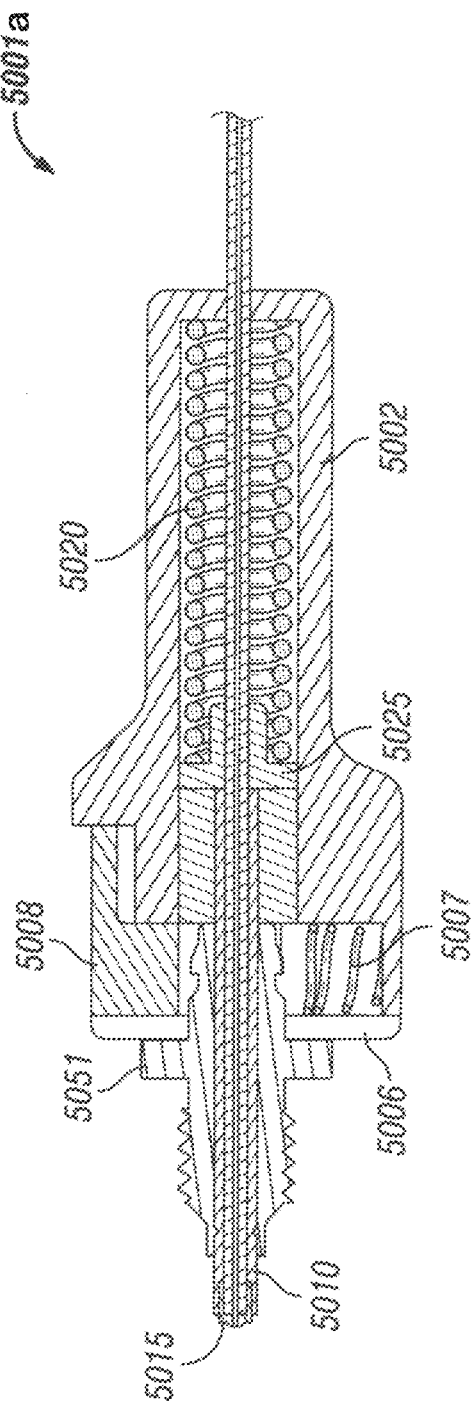
FIG. 45
FIG. 46

FLUIDIC CONNECTOR ASSEMBLY FOR QUICK CONNECT/DISCONNECT

CROSS-REFERENCE TO RELATED APPLICATIONS

This application claims the benefit of and priority to U.S. Provisional Patent Application Ser. No. 62/349,569, filed Jun. 13, 2016, which is incorporated by reference as if fully set forth herein, and this application is a continuation-in-part and claims the benefit of and priority to U.S. Non-provisional patent application Ser. No. 14/922,041, filed Oct. 23, 2015, which is incorporated by reference as if fully forth herein, which in turn claims the benefit of and priority to U.S. Provisional Patent Application Ser. No. 62/067,739, filed Oct. 23, 2014, U.S. Provisional Patent Application Ser. No. 62/127,276, filed Mar. 2, 2015, and U.S. Provisional Patent Application Ser. No. 62/168,491, filed May 29, 2015, each of which is hereby incorporated by reference as if fully set forth herein.

FIELD OF THE INVENTION

This invention relates generally to fluidic connections and fitting assemblies, and more specifically to fluidic connections and fittings which are easy to use, provide reliable sealing connections, and can be used without additional tools or equipment, and more particularly to fluidic connections and fitting assemblies for making fluidic connections or disconnecting fluidic connections quickly, such as may be useful in analytical instrument systems.

BACKGROUND OF THE INVENTION

There are numerous types of conventional analytical instrument (AI) systems in use and commercially available. Conventional AI systems include systems for Liquid chromatography (LC), ion chromatography (IC), and gas chromatography (GC), in addition, AI systems include high-pressure liquid chromatography, ultra-high pressure liquid chromatography, mass spectrometry systems, micro-flow chromatography systems, nanoflow and nano-scale chromatography systems, capillary electrophoresis systems, reverse-gradient chromatography systems, and systems which include or combine one or more of the foregoing. Although the following background discussion focuses on liquid chromatography systems and applications, those skilled in the art that the references to LC systems and applications are exemplary only and for the convenience of the reader, and are not limiting in any fashion.

LC systems provide well-known techniques for separating the constituent elements in a given sample. In a conventional LC system, a liquid solvent (referred to as the "mobile phase") is introduced from a reservoir and is pumped through the LC system. The mobile phase exits the pump under pressure. The mobile phase then travels via tubing to a sample injection valve. As the name suggests, the sample injection valve allows an operator to inject a sample into the LC system, where the sample will be carried along with the mobile phase.

In a conventional LC system, the sample and mobile phase pass through one or more filters and often a guard column before coming to the column. A typical column usually consists of a piece of tubing which has been packed with a "packing" material. The "packing" consists of the particulate material "packed" inside the column. It usually consists of silica- or polymer-based particles, which are often chemically bonded with a chemical functionality. When the sample is carried through the column (along with the mobile phase); the various components in the sample migrate through the packing within the column at different rates (i.e., there is differential migration of the solutes). In other words, the various components in a sample will move through the column at different rates. Because of the different rates of movement, the components gradually separate as they move through the column. Differential migration is affected by factors such as the composition of the mobile phase, the composition of the stationary phase (i.e., the material with which the column is "packed"), and the temperature at which the separation takes place. Thus, such factors will influence the separation of the sample's various components.

Once the sample (with its components now separated) leaves the column, it flows with the mobile phase past a detector. The detector detects the presence of specific molecules or compounds. Two general types of detectors are used in LC applications. One type measures a change in some overall physical property of the mobile phase and the sample (such as their refractive index). The other type measures only some property of the sample (such as the absorption of ultraviolet radiation). In essence, a typical detector in a LC system can measure and provide an output in terms of mass per unit of volume (such as grams per milliliter) or mass per unit of time (such as grams per second) of the sample's components. From such an output signal, a "chromatogram" can be provided; the chromatogram can then be used by an operator to determine the chemical components present in the sample. Additionally, LC systems may utilize mass spectrometric detection for identification and quantification of the sample, either in addition to, or as an alternative to, the conventional detectors described previously. Ion chromatography relies on the detection of ions in solution, so most metallic materials in the flow path can create interference in the detection scheme, as they create background ions.

In addition to the above components, a LC system will often include filters, check valves, a guard column, or the like in order to prevent contamination of the sample or damage to the LC system. For example, an inlet solvent filter may be used to filter out particles from the solvent (or mobile phase) before it reaches the pump. A guard column is often placed before the analytical or preparative column; i.e., the primary column. The purpose of such a guard column is to "guard" the primary column by absorbing unwanted sample components that might otherwise bind irreversibly to the analytical or preparative column.

In practice, various components in an LC system may be connected by an operator to perform a given task. For example, an operator will select an appropriate mobile phase and column, and then connect a supply of the selected mobile phase and a selected column to the LC system before operation. In order to be suitable for LC applications, each connection must be able to withstand the typical operating pressures of the LC system. If the connection is too weak, it may leak. Because the types of solvents that are sometimes used as the mobile phase are often toxic and because it is often expensive to obtain and/or prepare many samples for use, any such connection failure is a serious concern.

It is fairly common for an operator to disconnect a column (or other component) from a LC system and then connect a different column (or other component) in its place after one test has finished and before the next begins. Given the importance of leak-proof connections in LC applications, the operator must take time to be sure the connection is sufficient. Replacing a column (or other component) may occur several times in a day. Moreover, the time involved in disconnecting and then connecting a column (or other component) is unproductive because the LC system is not in use and the operator is engaged in plumbing the system instead of preparing samples or other more productive activities. Hence, the replacement of a column (or other component) in a conventional LC system can involve a great deal of wasted time and inefficiencies.

Given concerns about the need for leak-free connections, conventional connections have been made with stainless steel tubing and stainless steel end fittings. More recently, however, it has been realized that the use of stainless steel components in a LC system have potential drawbacks in situations involving biological samples, and cannot be routinely used for ion chromatography. For example, the components in a sample may attach themselves to the wall of stainless steel tubing. This presents problems because the detector's measurements (and thus the chromatogram) of a given sample may not accurately reflect the sample if some of the sample's components or ions remain in the tubing and do not pass the detector. Perhaps of even greater concern, however, is the fact that ions from the stainless steel tubing may detach from the tubing and flow past the detector, thus leading to potentially erroneous results. Hence, there is a need for "biocompatible" or "metal-free" connections through the use of a material that is chemically inert with respect to such "biological" samples and the mobile phase used with such samples, so that ions will not be released by the tubing and thus contaminate the sample.

In many applications using selector/injector valves to direct fluid flows, and in particular in liquid chromatography, the volume of fluids is small. This is particularly true when liquid chromatography is being used as an analytical method as opposed to a preparative method. Such methods often use capillary columns and are generally referred to as capillary chromatography. In capillary chromatography, it is often desired to minimize the internal volume of the selector or injector valve. One reason for this is that a valve having a large volume will contain a relatively large volume of liquid, and when a sample is injected into the valve the sample will be diluted, decreasing the resolution and sensitivity of the analytical method.

Micro-fluidic analytical processes also involve small sample sizes. As used herein, sample volumes considered to involve micro-fluidic techniques can range from as low as volumes of only several picoliters or so, up to volumes of several milliliters or so, whereas more traditional LC techniques; for example, historically often involved samples of about one microliter to about 100 milliliters in volume. Thus, the micro-fluidic techniques described herein involve volumes one or more orders of magnitude smaller in size than traditional LC techniques. Micro-fluidic techniques can also be expressed as those involving fluid flow rates of about 0.5 ml/minute or less.

As noted, liquid chromatography (as well as other analytical) systems typically include several components. For example, such a system may include a pump; an injection valve or autosampler for injecting the analyte; a precolumn filter to remove particulate matter in the analyte solution that might clog the column; a packed bed to retain irreversibly adsorbed chemical material; the LC column itself; and a detector that analyzes the carrier fluid as it leaves the column. Ion chromatography may also utilize a suppressor column to facilitate detection dynamic range. These various components may typically be connected by a miniature fluid conduit, or tubing, such as metallic or polymeric tubing (for ion chromatography), usually having an internal diameter of 0.003 to 0.040 inch.

All of these various components and lengths of tubing are typically interconnected by threaded fittings. Fittings for connecting various LC system components and lengths of tubing are disclosed in prior patents, for example, U.S. Pat. Nos. 5,525,303; 5,730,943; and 6,095,572, the disclosures of which are herein all incorporated by reference as if fully set forth herein. Often; a first internally threaded fitting seals to a first component with a ferrule or similar sealing device. The first fitting is threadedly connected through multiple turns by hand or by use of a wrench or wrenches to a second fitting having a corresponding external fitting; which is in turn sealed to a second component by a ferrule or other seal. Disconnecting these fittings for component replacement, maintenance; or reconfiguration often requires the use of a wrench or wrenches to unthread the fittings. Although a wrench or wrenches may be used, other tools such as pliers or other gripping and holding tools are sometimes used. In addition; the use of such approaches to connect components of an LC system often results in deformation or swaging of a ferrule used to provide a leak proof seal of tubing to a fitting or component. This often means that the ferrule and tubing connection, once made, cannot be reused without a risk of introducing dead volumes into the system. In addition, such approaches may involve crushing or deformation of the inner diameter of the tubing, which may adversely affect the flow characteristics and the pressures of the fluid within the tubing.

Another approach to provide a connection in an LC system involves providing a fitting assembly that uses a combination of components, including two separate ferrules. Such an approach is considered undesirable because by requiring two places for the ferrules to provide leak proof seals; it provides two places where the fluid to be analyzed may leak; as well as where dead volumes may be provided. In addition, this approach involves the use of additional components, which can cost more and also increase the time and effort to assemble them to make a connection or disassemble them when disconnecting tubing from a component or other fitting assembly.

There exists a need for fluidic fittings that are more reliable and have increased performance, which can be accomplished by applying a specific amount of torque to a fluidic fitting. The long used standard of "finger tight" when applying torque introduces a great deal of variation into the process. This results in fittings being under tightened, which causes leaks, or potentially over-tightened (with a tool), which can result in damage to fittings and ports. In general a torque limiting fitting may be preferred over the use a torque tool (such as a torque wrench) since torque tools require specific designs to allow access to specific fittings, employee training, additional assembly time, and associated costs (e.g., tool purchase and periodic calibration).

U.S. Pat. No. 5,183,140 discloses a general torque limiting mechanism, which comprises two rotatable members, one of which is the driving member and the other of which is the driven member. One of the members includes a single radial projection extending from a central hub that engages a recessed area on the other member. Below the torque limit the projection engages the recessed area and allows the driving member to drive the driven member, but above the torque limit the projection disengages the recessed area and prohibits the driving member from driving the driven member. U.S. Pat. No. 7,984,933 discloses a torque limiting fitting, which also comprises two rotatable members, one of which is the driving member and the other of which is the driven member. One of the members includes a lever extending from a central hub that engages an abutment on the other member. Below the torque limit the lever engages the abutment and allows the driving member to drive the driven member, but above the torque limit the lever deflects from the abutment and prohibits the driving member from driving the driven member. However, the radial projection and the lever are only supported on one end, which can result in inconsistency in the torque limit and generally lower maximum torque values.

It will be understood by those skilled in the art that, as used herein, the term "LC system" is intended in its broad sense to include all apparatus and components in a system used in connection with a liquid chromatography system, and that the discussion of fittings in the context of LC systems is exemplary, as the invention may apply beyond LC systems to gas and ion chromatography, as well as or in vitro diagnostic or environmental analysis, and in other analytical instruments and systems, and may be made of only a few simple components or made of numerous, sophisticated components which are computer controlled or the like. Those skilled in the art will also appreciate that an LC system is one type of an analytical instrument (AI) system. Those skilled in the art will appreciate that much of the foregoing discussion with respect to LC systems also has application to other types of AI systems and methods.

Conventional fitting assemblies in certain applications will use fittings that are screwed into ports. Such conventional fittings do not include an energizing member to supply a constant force, which may be needed if the fitting assembly or one or more of its components changes (e.g., such as via creep) over time.

Experience teaches that most users of equipment involving such fluidic connections do not like using tools to install fittings. Most prefer to make fluidic connections by hand and to disconnect the fluidic connections, once made, by hand. Moreover, most users do not like to be required to apply torque to threaded fittings (whether by hand or by use of a tool) to a specific torque value or range or values, often due to the time or extra equipment needed to do so. Also, in many situations, it is not entirely clear if an operator has applied enough or too much torque in making up a connection until the AI system is in operation and a leak occurs or the pressure of the fluid flowing through a tube causes its extrusion from the port.

In many conventional fluidic connections, it can be difficult to determine if the fitting assembly is correctly or fully installed or not, unless and until a leak or burst occurs. For example, a fitting assembly may appear fine because it is partially screwed into a threaded port; but in fact is not fully engaged to provide a seal at a desired pressure range for a given application because the user failed to apply sufficient torque when making the connection. Conventional fluidic connections and fitting assemblies do not provide an easily observable indication of whether the fitting assembly is fully connected.

Attempts have been made to try to address some of the drawbacks and issues with conventional fitting assemblies and connections. For example, attempts have been made to develop approaches intended to provide fittings which may be quickly connected to and disconnected from a component. In U.S. Pat. No. 5,803,512, titled "Tube Quick Connect to Female Socket," issued to Hollnagel on Sep. 8, 1998, a quick connect assembly is described, which relies on a pair of slanted arms, the radial deflection of which allows a fitting to connect and disconnect with a female socket member. Likewise; U.S. Pat. No. 4,834,423, titled "Quick Connect Fluid Fitting Assembly," issued to DeLand on May 30, 1989, describes a quick-connect fitting assembly which relies on a retainer means including at least one finger which can connect and release in interlocking engagement with a socket. Similarly, U.S. Pat. No. 8,448,994, titled "Latch Assembly For Joining Two Conduits," issued to Pisula et al. on May 28, 2013, describes a latch assembly for the connection of conduits, where the connection is established by engagement of a feature within a slot and is disengaged by a release button. U.S. Pat. No. 6,497,433, titled "Coupling Assemblies for Providing Fluid Connection," issued to Ketcham on Dec. 4, 2002, also discloses a retainer feature, in this case relying on at least two locking beams to engage and release a conduit to and from a female connector body.

Other attempts have been made to provide various connection assemblies. For example, U.S. Pat. No. 4,781,399, titled "Quick-Connect Coupling Having improved Seal" and issued on Nov. 1, 1988, describes a connection assembly with a ball detest and seal for a household faucet or the like. U.S. Pat. No. 4,135,745, titled "Quick Connect Fluid Fitting" and issued on Jan. 23, 1979, describes a connection assembly with an expandable clip on a tube intended to allow tubing to be attached to a housing with a preassembled nut. U.S. published patent application No. 2014/01.02561, published on Apr. 17, 2014 and titled "Quick-Release Connectors and Connection Assemblies for Fluidic Coupling" describes the use of a plunger body for use with a check valve. U.S. Pat. No. 7,695,020, issued on Apr. 13, 2010, and titled "Coupling with Latch Mechanism," describes a coupling apparatus with a mechanical latch assembly with a latch plate. U.S. Pat. No. 6,361,687, titled "Quarter Turn Quick Connect Fitting" and issued on Mar. 26, 2002, describes a fitting assembly with a quarter turn nut which cooperates with a fitting with pins. U.S. Pat. No. 6,149,127, issued on Nov. 21, 2000, and titled "Spring Loaded Compression Valve Fitting" describes a valve fitting to be coupled to a valve body and cause a compression member to limit the pressure exerted on the valve body. U.S. Pat. No. 5,951,063, titled "Quick Connector with Snap-On Retainer Having Enhanced Engagement" and issued on Sep. 14, 1999, describes a retainer with lock projections for releasably locking together male and female components. It is believed that none of these prior attempts have provided a connection assembly which can quickly and easily be used by an operator to connect or disconnect tubing without the need for any torque or any rotation of a component of the assembly, and without any tools, and yet provide a sealing engagement for high pressure applications in a cost effective manner. U.S. Pat. Nos. 4,781,399, 4,135,745, 7,695,020, 6,361,687, 6,149,127, and 5,951,063, and U.S. published patent application No. 2014/0102561, are hereby incorporated by reference as if fully set forth herein.

None of these references disclose a means for supplying constant axial force on the fitting as the fitting changes over time (e.g., the fitting material creeps). Such a force can be advantageous to maintain the integrity of the tube-to-port seal as the fitting assembly creeps. If the fitting assembly creeps and there is no compensating axial force, this could result in leakage at the point of the tube-to-port interface and could thus compromise the fitting assembly. In addition, none of the references noted above disclose a tube-to-port seal wherein the seal is generated solely by the tube face, without the need for torque or extra components (e.g., ferrules). Moreover, conventional fitting assemblies fail to provide a connection system in which an operator can easily determine from visual examination that a seal has been obtained when a connection has been made.

SMMARY OF THE INVENTION

In one embodiment of the present disclosure, a fluidic connection assembly is provided which includes a body having a first end and a second end, and having a plurality of sides, and further having a bottom portion with a plurality of latch portions, each corresponding to one of the sides of the body, wherein the latch portions are adapted to be retained in a port when inserted therein, said body further having a passageway therethrough adapted to receive a tube extending through said body, said body further having a plurality of hinges, each of the hinges corresponding to one of the sides of said body, wherein the sides and the corresponding latch portions of said body are adapted to move inwardly towards the longitudinal axis of the body when a force is exerted thereon, thereby allowing the body to be disconnected from the port, and wherein the first end of said body comprises an extension member and the second end of said body is adapted to cooperate with a spring for exerting a force against a bottom of the tube. The fluidic connection assembly can further comprise a second spring in an interior portion of said body such that the second spring exerts a force against the plurality of sides of said body towards the exterior of said body and away from the longitudinal axis of the body. The extension and said body can be integral or can be formed from separate pieces. The second spring can be one or more of any of a number of different types of springs, such as a band spring, a cantilever spring, an elastomeric spring, or the like.

In some embodiments of the present disclosure, the fluidic connection assembly can also include a spring and a tube extending through the extension member, through the body, and through the spring, wherein the spring is located between the second end of said body and one end of said tube. In addition, the end of the tube can comprise a flange and/or the spring can comprise a coiled spring. In some embodiments, the extension portion may include a plurality of toroidal members and/or a spine member, and the spine member can be provided by a wire having a polymeric coating. Some embodiments may further include a backup ring located between the spring and the flange of said tube, wherein the backup ring may be used to help concentrate the force from said spring on the flange in an area smaller than the total surface area of the flange. The backup ring can be radially tapered to concentrate axial force on a smaller area of the tube second end, and the end of the tube may comprise a reduced surface area. The fluidic connection assembly in accordance with the present disclosure may have a body which comprises any one or more of various materials, which may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand poiyetherimide (PEI), polyetherketoneketone (PEKK), polyaryletherketone (PAEK), polyethylene, polypropylene, polyvinylchloride, acrylic, and/or other materials, such a fused silica, silica botite, PEEKsil, and the like.

In some embodiments of the present disclosure, methods are provided, including a method of making a connection which includes the steps of providing a tube having first and second ends, wherein the second end comprises a flange, inserting the first end of the tube through a backup ring, a spring, and a body, wherein said body comprises a first end and a second end, a plurality of sides, and a bottom portion having a plurality of latch portions, each corresponding to one of the sides, wherein the latch portions are adapted to be retained in a port when inserted therein, said body further having a passageway therethrough adapted to receive a tube extending through said body, said body further having a plurality of hinges, each of the hinges corresponding to one of the sides of said body, wherein the sides and the corresponding latch portions of said body are adapted to move inwardly towards the center of the body when a force is exerted thereon, and wherein the second end of said body is adapted to cooperate with a spring for exerting a force against a bottom of the tube, and inserting a least a portion of the body, including at least the latch portions of the body, into a port, wherein the latch portions are retained within the port. In at least some embodiments, such methods do not require the application of any torque, or the use of a threaded engagement of two members, or the relative rotation of two threaded members to provide a threaded engagement.

In some embodiments, methods of disconnecting a tube connected to a port are provided. Such methods may include the steps of exerting a force on a plurality of sides of a body in a fluidic connection assembly, wherein the fluidic connection comprises a tube having first and second ends, wherein the second end comprises a flange, and wherein at least a portion of the tube between the second end and the first end extends through the body, wherein the body has a first end and a second end, and a bottom portion with a plurality of latch portions, each corresponding to one of the sides, said body further having a passageway therethrough adapted to receive the tube, said body further having a plurality of hinges, each of the hinges corresponding to one of the sides of said body, wherein the sides and the corresponding latch portions of said body are adapted to move inwardly towards the center of the body when a force is exerted thereon, thereby moving the latch portions of the body inwardly, and then pulling the assembly from the port, in some embodiments of such methods, the steps do not require the application of any torque to a component of the assembly.

In some embodiments of the present disclosure, an analytical instrument system is provided which includes a fluidic connection which in turn includes a body having a first end and a second end, and having a plurality of sides, and further having a bottom portion with a plurality of latch portions, each corresponding to one of the sides, wherein the latch portions are adapted to be retained in a port when inserted therein, said body further having a passageway therethrough adapted to receive a tube extending through said body, said body further having a plurality of hinges, each of the hinges corresponding to one of the sides of said body, wherein the sides and the corresponding latch portions of said body are adapted to move inwardly towards the center of the body when a force is exerted thereon, thereby allowing the body to be disconnected from the port, and wherein the first end of said body comprises an extension member and the second end of said body is adapted to cooperate with a spring for exerting a force against a bottom of the tube. The AI system may further include a spring and a tube extending through the extension member, through the body, and through the spring, wherein the spring is between the second end of said body and one end of said tube. In addition, the spring may exert a force against the flange of the one end of said tube and maintain a sealing engagement. In some embodiments, the AI system may be used for in vitro applications. In at least some of the embodiments of the present disclosure, the fitting assembly, once connected, may provide a seal at a fluid pressure of at least 200 psi, 500 psi, 1000 psi, 2500 psi, 5000 psi, 10000 psi, and 20000 psi. In addition, in some embodiments, the fitting assembly can provide a visual cue to an operator to indicate that a proper connection has been made for an intended application. Moreover, the present disclosure provides apparatus and methods which allow an operator to make up a fluidic connection, or to disconnect a fluidic connection, but hand and without the need for pliers, wrenches, or other tools, and without the need for application of a torque, such as is the case when a connection is made which requires the relative rotation of two threaded members. The connection assembly can be used in connection with any one of a number of ports and/or components in any one or more AI system, including in connection with components including any one or more of the following: a pump, a column, a filter, a guard column, a valve, a detector, a pressure regulator, a reservoir, a degasser, a debubbler, a union, a tee, a cross, an adapter, a splitter, a sample loop, or a connector.

In certain embodiments in accordance with the present disclosure, an assembly body for connecting a tube to a port comprising a body is provided, which has a passageway therethrough and has located therein means for exerting an axial force to bias an end of a tube towards a face of a port, and further has means for removably and securely attaching said body to the port, wherein the means for removably and securely attaching said body are adapted to allow a user to select between a first position and second position of the means for removably and securely attaching said body to thereby attach said body to the port in the first position and to disengage said body from the port in the second position. The end of the tube may further comprise a tip, and the port may be formed by a recess formed in an adapter attached to another component, such as an adapter connected to the end of a column, or may be a port which is part of a manifold, a pump, a valve, a column, a filter, a guard column, a detector, a pressure regulator, a reservoir, a degasser, a debubbler, a union, a tee, a cross, a splitter, a sample loop, a connector, or another component in an AI instrument or system. The means for exerting an axial force may comprises a spring, including without limitation a coiled spring. The means for removably and securely attaching may comprise radial projections on said body adapted to engage with portions of the port, such as radial projections shoulders which latch together when connected, or may comprise a ball detent mechanism. The body is adapted to removably and securely attach to a port with axial loading, such as by an operator by hand or by automated means, without any torque being applied to said body or the port, and without requiring that the body or the port be turned. The tube, the body, and the port assembly may comprise biocompatible materials. In addition, the port may comprise a first inner diameter at an opening thereof and a bottom surface with a reduced surface area for contact with the end of the tube, wherein the bottom surface has an outer diameter less than the first inner diameter of the port. The portion of the tube located within the body may have a first diameter and the end of the tube may comprise a bottom surface having an outer diameter less than the first outer diameter of the tube, thereby concentrating the force exerted at the sealing location and allowing a seal to be formed capable of a leak-free seal and preventing extrusion of the tube from the port without requiring such force to be applied to connect the assembly together by an operator. In addition, the tube may have a tip which has a first end with a first outer diameter and the tip also has a portion thereof with a second outer diameter which is greater than the first outer diameter. The port may be comprised of a combination of two or more distinct components, such as if the port comprises a bottom surface of a first component and an recess extending from the bottom surface is provided by a second component.

In certain embodiments, a fluidic connection assembly for high pressure applications is provided which comprises a connector assembly having a connector and having means for allowing an operator to select between a first position of said connecter and a second position of said connector, wherein in the first position said connector is adapted to be inserted into or removed from a port, and in the second position said connector is adapted to be retained in the port, and wherein said connector has a passageway therethrough adapted to receive a portion of a tube, and means located within said connecter for exerting a force on a portion of tube located within the passageway of said connector when said connector is in the second position, wherein said connector is adapted to be connected to the port without any torque and without turning either said connector or the port, and wherein said connecter assembly and said means for exerting a force on a portion of a tube are adapted to sealingly engage the tube in the port when a fluid flows through the tube. The means for allowing an operator to select between a first position and a second position may comprise a plurality of tabs each connected to a corresponding radial projection which moves radially inward or outward when the tabs are moved radially inward or outward, and such movement may correspond to each other inward movement of the projections when the tabs move inward), or may be different from one another (i.e., inward movement of the projections when the tabs are moved outwardly). The means for allowing an operator to select between a first position and a second position may, comprise a collar and ball detent. The means for exerting a force may comprises a spring, and the means may be preselected so that the force adapted to be exerted is a force of at least a preselected amount, or within a preselected range. The means for exerting a force and said connector assembly may be adapted to sealingly engage one end of the tube when a fluid flows through the tube at pressures up to 5,000 psi, 10,000 psi, 15,000 psi, 20,000 psi, and/or 25,000 psi.

In certain embodiments of the present disclosure, a fluidic connection assembly is provided and which comprises a body having a first end and a second end, and having a plurality of sides, and further having a bottom portion with a plurality of latch portions, each corresponding to one of the sides, wherein the latch portions are adapted to be retained in a port when inserted therein, said body further having a passageway therethrough adapted to receive a tube extending through said body, said body further having a plurality of sides each having a slot therein, each slot corresponding to one of the sides of said body, wherein each side of said body which has a slot does not have a corresponding latch portion, wherein the sides with corresponding latch portions of said body are adapted to move inwardly towards the center of the body when a force is exerted thereon, thereby allowing said body to be disconnected from the port, and wherein the second end of said body is adapted to cooperate with a spring for exerting a force against a bottom of the tube.

In addition, certain embodiments provide a method of connecting a tube to a port of a component of an analytical instrument system, which method comprises providing an assembly having a first end and a second end, wherein the assembly is adapted to connect to a port of a component of an analytical instrument system, providing a tube having a first end and a second end and extending through the assembly, and inserting, without any threaded engagement of the assembly with the port, at least a portion of the second end of the tube and the second end of the assembly into the port so that a portion of the assembly is removably held in the port and provides a sealed connection between the second end of the tube and the port, wherein the sealed connection is leakproof at pressures of up to at least 2,500 psi.

In other embodiments, a fluidic connection assembly is provided which comprises a body having a first end and a second end, and having a plurality of tabs located between the first and second ends, wherein each of the plurality of tabs extends radially outwardly from said body, and wherein the second end of said body further has a plurality of radially inwardly extending latch portions, each corresponding to one of the tabs, wherein the latch portions are adapted to engage and retain a first end of a port body when the first end of the port body is between the latch portions of said body and the latch portions are in a closed position, and the latch portions are adapted to move radially outwardly when the corresponding tabs move radially inwardly, said body further having a passageway therethrough adapted to receive a tube extending through said body, and a spring located in said body and having a first end proximal the first end of said body and a second end adapted to exert a force to urge one end of the tube against at least a portion of a port in the port body. The fluidic connection assembly may further comprise a spring and a tube extending through the extension member, through the body, and through the spring. The end of said tube may further comprise a PEEK tip, and the spring may comprise a coiled spring. In addition, the assembly may further comprise a boss in the port of the port body which has a diameter smaller than the outer diameter of the tube. The port may comprise a port within an AI system component, including at least one of a union, tee, cross, pump, valve, column, guard column, manifold, or detector.

In some embodiments, a fluidic connection assembly is provided which comprises a first body having a passageway therethrough and having first end and a second end, and having a plurality of tabs defining the second end, wherein a middle portion of said first body has a plurality of radially inwardly extending shoulder portions, each corresponding to one of the tabs, wherein each of the shoulder portions are adapted to move radially inwardly when a corresponding tab is moved radially inwardly, a second body having a first end and a second end and located within said first body, wherein the first end of said second body abuts the interior surface of the first end of said first body, said second body further having a plurality of middle portions, each adapted to move radially inwardly when a corresponding shoulder portion of said first body moves radially inwardly, and further having latch portions proximal the second end of said second body, wherein the latch portions are adapted to move radially inwardly when the middle portions move radially inwardly, and wherein the latch portions are adapted to removably, engage with radially inward projections at a first end of a port body in an AI system, said second body further having a passageway therethrough adapted to receive a tube extending through said second body, and a spring located in said second body and having a first end proximal the first end of said second body and a second end adapted to exert a force to urge one end of the tube against at least a portion of a port in the port body. The assembly may further comprise a spring and a tube extending through said spring, and the end of said tube may comprise a PEEK tip. In addition, the assembly may further comprise a boss in the port of the port body which has a diameter smaller than the outer diameter of the tube. The port may comprise a port within an AI system component, including at least one of a union, tee, cross, pump, valve, column, guard column, manifold, or detector.

In certain embodiments, a fluidic connection assembly is provided which may comprise a body having a first end and a second end, each of the first and second ends having openings therein, and having a hollow portion therein, a first spring located at least partially within the hollow portion of said body, and having a first end abutting an interior surface of the hollow portion of said body, a latch member having an opening therethrough and having a base portion and a top portion, wherein the base portion of said latch member is adapted to fit at least partially within said body, and wherein the top portion has one or more projections adapted to be held in recesses on an exterior portion of said body, and a cap member having an opening therethrough and having first and second sides and an extension on the first side of said cap member which is adapted to extend into at least a portion of the hollow portion of said body and to hold said latch member and said cap member together, wherein the second side of said cap member is adapted to be attached to the second end of said body, and wherein said latch member is adapted to engage with and securely hold an adapter when a portion of one end of the adapter is inserted into the opening of said cap member and the opening of said latch member, and wherein each of said body, said spring, said latch member, and said cap member are adapted to receive at least a portion of tubing therethrough. In addition, the first spring may be in a compressed state when said cap member, said latch member, and said body are assembled together and said first spring is located entirely within the hollow portion of said body. The fluidic connection assembly may further comprise a second spring, wherein said second spring is located within the hollow portion of said body and adjacent to at least one side of said latch member. The second spring may be adapted to push said latch member so that a radially inward projection of said latch member is pressed against a portion of said adapter. The adapter and the inward projection of the latch member may have cooperating ramps or angled portions to allow for easier engagement of the adapter and the inward projection. The fluidic connection assembly may further comprise a tube having one end which extends through the first and second ends of said body, said first spring, said latch member, and extends out of the opening of the second side of said cap member. The first spring may exert a force which urges the end of said tube away, from said body. The fluidic connection assembly may further comprise a washer or disc located within said body and adjacent to a second end of said first spring, a sleeve member surrounding at least a portion of said tube, wherein said sleeve member has a first end and a second end, and wherein said first spring exerts a force on said washer and said washer exerts a force on said sleeve, and said sleeve exerts a force on said tube which urges the end of said tube away from said body. The assembly may further comprise a tip surrounding a portion of the tube and at least a portion of which is surrounded by the sleeve, wherein the force exerted on the sleeve is transferred to one end of said tip to urge said tip against a surface of a port. The port may comprise a port within an AI system component, including at least one of a union, tee, cross, pump, valve, column, guard column, manifold, or detector.

In certain embodiments, a fluidic connection assembly is provided which may comprise a body having a first end and a second end, each of the first and second ends having openings therein, and having a hollow portion therein, a first spring located at least partially within the hollow portion of said body, and having a first end abutting an interior surface of the hollow portion of said body, a latch member having an opening therethrough and having a base portion, and a cap member having an opening therethrough and having first and second sides, and which is adapted on one side to surround a portion of one end of the body, with the cap further having a base portion which is adapted to receive and hold a second spring therein, with the cap further adapted to receive and hold at least a portion of the latch member therein, with the latch member further adapted to engage with and securely hold an adapter when a portion of one end of the adapter is inserted into the opening of said latch member, and wherein each of said body, said spring, said latch member, and said cap member are adapted to receive at least a portion of tubing therethrough. In addition, the first spring may be in a compressed state when said cap member, said latch member, and said body are assembled together and said first spring is located entirely within the hollow portion of said body. The fluidic connection assembly may further comprise a second spring, wherein said second spring is located within the base portion of said cap and adjacent to at least one side of said latch member. The second spring may be adapted to push said latch member so that a radially inward projection of said latch member is pressed against a portion of said adapter and/or into an annular notch of the adapter. The adapter and the inward projection of the latch member may have cooperating ramps or angled portions to allow for easier engagement of the adapter and the inward projection. The fluidic connection assembly may further comprise a tube having one end which extends through the first and second ends of said body, said first spring, said latch member, and extends out of the opening of the second side of said cap member. The first spring may exert a force which urges the end of said tube away from said body. The fluidic connection assembly may further comprise a washer or disc located within said body and adjacent to a second end of said first spring, a sleeve member surrounding at least a portion of said tube, wherein said sleeve member has a first end and a second end, and wherein said first spring exerts a force on said washer and said washer exerts a force on said sleeve, and said sleeve exerts a force on said tube which urges the end of said tube away from said body. The assembly may further comprise a tip surrounding a portion of the tube and at least a portion of which is surrounded by the sleeve, wherein the force exerted on the sleeve is transferred to one end of said tip to urge said tip against a surface of a port. The port may comprise a port within an AI system component, including at least one of a union, tee, cross, pump, valve, column, guard column, manifold, or detector.

In certain embodiments a method of connecting a tube to a port is provided, with the method comprising the steps of providing a tube having first and second ends, inserting the first end of the tube through a fluidic connection assembly which may comprise a body having a first end and a second end, each of the first and second ends having openings therein, and having a hollow portion therein, a first spring located at least partially within the hollow portion of said body, and having a first end abutting an interior surface of the hollow portion of said body, a latch member having an opening therethrough and having a base portion and a top portion, wherein the base portion of said latch member is adapted to fit at least partially within said body, and wherein the top portion has one or more projections adapted to be held in recesses on an exterior portion of said body, and a cap member having an opening therethrough and having first and second sides and an extension on the first side of said cap member which is adapted to extend into at least a portion of the hollow portion of said body and to hold said latch member and said cap member together, wherein the second side of said cap member is adapted to be attached to the second end of said body, and wherein said latch member is adapted to engage with and securely hold an adapter when a portion of one end of the adapter is inserted into the opening of said cap member and the opening of said latch member, and wherein each of said body, said spring, said latch member, and said cap member are adapted to receive at least a portion of tubing therethrough, inserting a least a portion of tube into an adapter and inserting at least a portion of one end of the adapter into the second end of said body and having the projection of said latch member engage with a portion of the adapter to securely hold the adapter and the latch member together, and engaging the other end of the adapter with a port, such as by threadably engaging threads on the adapter with threads of the port.

BRIEF DESCRIPTION OF THE DRAWINGS

FIG. 1 is an isometric view of a fluidic connector assembly in accordance with an embodiment of the present disclosure.

FIG. 2 is a front view of a fluidic connector assembly in accordance with an embodiment of the present disclosure.

FIG. 3 is a cross-sectional view of the fluidic connector assembly shown in FIG. 2 taken along line C-C.

FIG. 5 is a side view of a fluidic connector assembly in accordance with an embodiment of the present disclosure.

FIG. 7 is a cross-sectional view of an embodiment of a fluidic connector assembly which is connected to a port.

FIG. 8 is an enlarged cross-sectional view of a portion of the fluidic connector assembly shown in FIG. 8.

FIG. 9 is a cut-away view of an embodiment of a fluidic connector assembly in accordance with the present disclosure.

FIG. 10 is a cross-sectional view of the fluidic connector assembly shown in FIG. 9.

FIG. 11 is a cross-sectional view of a fluidic connector assembly in accordance with an embodiment of the present disclosure, and is shown in a connected state.

FIG. 12 is an enlarged, cross-sectional view of a portion of the fluidic connector assembly shown in FIG. 11

FIG. 13 is an enlarged, cross-sectional view of a portion of a fluidic connector assembly in accordance with an embodiment of the present disclosure.

FIG. 14 is an enlarged, cross-sectional view of a portion of a fluidic connector assembly in accordance with an embodiment of the present disclosure.

FIG. 15 is an enlarged, cross-sectional view of a portion of a fluidic connector assembly in accordance with an embodiment of the present disclosure.

FIG. 16 is an enlarged, cross-sectional view of a portion of a fluidic connector assembly in accordance with an embodiment of the present disclosure.

FIG. 17 is a cross-sectional view of a fluidic connector assembly in accordance with one embodiment of the present disclosure, and is shown in a connected state.

FIG. 18 is an enlarged cross-sectional view of a portion of a fluidic connector assembly in accordance with one embodiment of the present disclosure, and is shown in a connected state.

FIG. 19 is another enlarged cross-sectional view of a portion of the fluidic connector assembly shown in FIG. 18 in accordance with one embodiment of the present disclosure, and is shown in a connected state.

FIG. 21 is an isometric view of another alternative embodiment of an assembly in accordance with the present disclosure.

FIG. 22 is a side view of the assembly of FIG. 21.

FIG. 23 is a cross-sectional view of the assembly of FIG. 21 taken along line E-E of FIG. 22.

FIG. 24 is another side view of the assembly of FIG. 21.

FIG. 25 is a cross-sectional view of the assembly of FIG. 21 taking along line F-F of FIG. 24.

FIG. 26 is a cross-sectional view of a connection assembly in accordance with an embodiment in accordance with the present disclosure.

FIG. 27 is a cross-sectional view of a connection assembly and a port configuration in accordance with an embodiment in accordance with the present disclosure.

FIG. 28 is a cross-sectional view of a connection assembly and a port configuration in accordance with an embodiment in accordance with the present disclosure.

FIG. 29 is a cross-sectional view of a connection assembly and a port configuration in accordance with an embodiment in accordance with the present disclosure.

FIG. 30 is a cross-sectional view of a connection assembly in accordance with an embodiment in accordance with the present disclosure.

FIG. 39 is a cross-sectional view of a quick connect/disconnect assembly in a connection assembly in one embodiment of the present disclosure.

FIG. 40 is an exploded view of the assembly of FIG. 39.

FIG. 45 is a cross-sectional view of the fluidic connection assembly of FIG. 43.

FIG. 46 is a cross-sectional view of the fluidic connection assembly shown in FIG. 45 as shown in an assembled state.

DETAILED DESCRIPTION

Figure 4A:
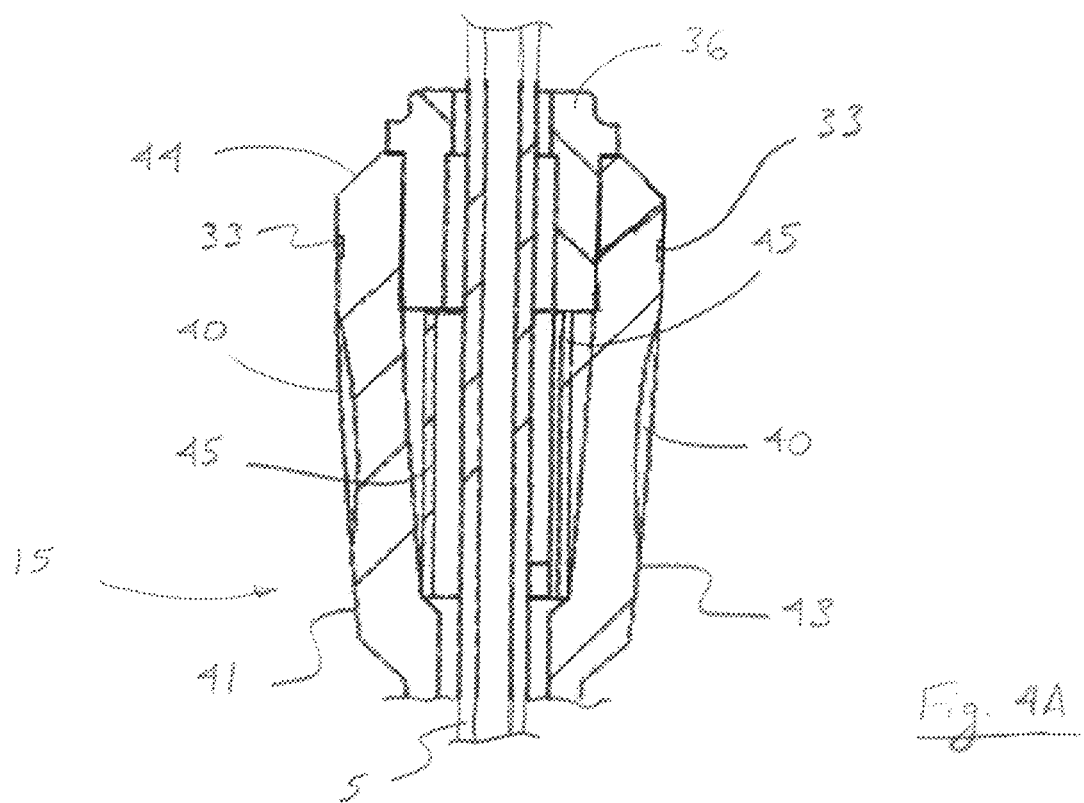
FIG. 4A is an enlarged cross-sectional view of a portion of the fluidic connector assembly shown in FIGS. 2 and 3.

FIG. 1 provides an isometric view of a fluidic connector assembly 1 in accordance with one embodiment of the present disclosure. As shown in FIG. 1, the fluidic connector 1 and its components are assembled. As shown in FIG. 1, the assembled fluidic connector assembly 1 includes tubing 5, a top extension 10, a body 15, a spring 20, and a bottom flange 25. In this particular embodiment, the tubing 5 extends through passageways adapted to receive the tubing 5 in each of the extension 10 and body 15, and the tubing 5 extends through the center open area of the spring 20, which in this particular embodiment is a coiled spring. In this particular embodiment, the bottom flange 25 of the fluidic connector assembly 1 is provided by one end of tubing 5. Each of these main components of the fluidic connector 1 and their use and operation are described in more detail below.

Still referring to FIG. 1, the extension portion 10 includes a member 30 which extends longitudinally on one side of the extension 10 from a top end to a base member 36. Extension member 10 also includes a series of toroidal, or ring-like, members 32. As shown in FIG. 1, the toroidal members 32 generally form rings around, and are generally disposed perpendicular to, the longitudinal axis of the extension 10. At the top end of the extension member 10 is a top toroidal member 34, which is larger in size than the other toroidal members 32 of the extension 10. Those skilled in the art will appreciate that the toroidal members 32 may vary in size, shape, and number as may be desired. In addition, the toroidal members 32 could be replaced by a solid column (not shown) if desired, or by a column with slots, grooves, holes, or the like therein as may be desired. The extension member 10 provides an advantage because it provides relief to tubing 5 to avoid unnecessary strains or stresses imposed on tubing 5 if twisted, grabbed, or otherwise manipulated by an operator. The top extension 10 thus protects the tubing 5 to avoid wear and tear. To a lesser extent, an operator may grasp and manipulate the extension 10. Those skilled in the art will appreciate that the extension 10 can be provided in other forms as may be desired to provide relief for tubing 5, and will also appreciate that the assembly 1 can be provided either with or without an extension 10, whether in the specific embodiment shown and disclosed herein or another form or shape. As also shown in FIG. 1, the base 36 of the extension 10 is located on top of the body 15. The body 15 includes a top portion 44, a face 41, a hinge 33, and an indentation 40 on face 41, as well as a bottom member 42. Details regarding the body 15 and its features and operation are provided below.

As shown in FIG. 1, located below the bottom member 42 of body 15 is a ring portion 46 of the body 15 and, located below the ring portion 46, is a swing member 20. The spring member 20 in this particular embodiment can be a coiled spring of a desired material, length, and strength. Those skilled in the art will appreciate that the material and size of spring member 20 can be selected so that the spring member 20 provides the desired amount of force, or biasing, when engaged (as described in more detail below) in a fluidic connection in a desired application. For example, one of skill would appreciate that it would be advantageous to have the spring member 20 provide a greater biasing force when the fluidic connector 1 will be used in an application with a greater fluidic pressure, than might be the case if the fluidic connector 1 is to be used in an application with a relatively small fluidic pressure. For example, not all fluidic connections in a given AI system used for a given application need operate under the same fluid pressure. The fluid pressures may change even in such situations for different connections in the AI system. Moreover, a given AI system may be used in an application in which lower fluid pressures are used than may be encountered in the same AI system when used for a different application. For example, an LC system may be used for in vitro applications with fluid pressures at 200 psi or less, yet this same system may also be used in other applications with higher pressures.

Also shown in FIG. 1 is a flange 25 of tubing 5. As can be seen, the flange 25 is located at the bottom of the fluidic connector 1, and below the bottom end of the spring 20. In the particular embodiment shown in FIG. 1, the flange 25 is one end of the tubing 5, and tubing 5 extends from flange 25 through the spring 20, body 15, and extension 10. The flange 25 provides an advantage because it is located between a port or other connector (not shown in FIG. 1) when the fluidic connector 1 is connected to a port or other connector and the spring 20. This is useful, for example, in systems involving biological samples, because the flange 25 and tubing 5 can be made of a biocompatible material and spring 20 can be made of metal if desired, as the spring 20 is not located in the flow path and thus cannot contaminate or otherwise affect the fluid passing through the system in which the fluidic connector 1 is to be used.

Referring now to FIGS. 2 and 3, additional details regarding the fluidic connector 1 and its components and features are shown. For ease of reference, the same numbers are used in the various Figures for the same items. FIG. 2 is a "front" view of the fluidic connector 1, while FIG. 3 is a cross-sectional view of the fluidic connector 1 taken along line C-C of FIG. 2. Those skilled in the art will appreciate that terms such as "top," "bottom," "front," "back," and the like as used herein are for convenience in reference to the Figures, but in fact the fluidic connector 1 can be used in any orientation, so such terms should not be considered limiting in any fashion but are instead merely for the convenience of the reader.

As shown in FIGS. 2 and 3, the tubing 5 extends along a longitudinal axis of the fluidic connector 1 as assembled. Each of the extension 10, body 15, and spring 20 are configured so that each has a passageway through which the tubing 5 may extend. As shown in FIG. 3, the body 15 has a first side 41 and a second side 43, and in this particular embodiment, each has an indentation 40. Those skilled in the art will appreciate that, although both sides 41 and 43 of the body 15 are substantially the same as one another, this need not be the case, such as if a particular application in which the fluidic connector 1 is to be used presents a configuration such that a different shape or size of body 15 is more appropriate. As also shown in FIG. 3, a portion of the base 36 of the extension 10 extends into an interior portion of the body 15 at the top end of the body 15. Those skilled in the art will appreciate that the extension base 36 and the body 15 can be adapted to allow the extension base 36 to fit securely and/or releaseably in the top end of the body 15. Alternatively, a portion of the extension base 36 can be secured to the interior of the body 15, such as by use of a glue or adhesive, or the outer diameter of the portion of the base 36 to fit inside the interior portion of the body 15 can be substantially the same size or slightly larger if the material of the extension base 36 can be deformed as the inner diameter of the body 15 in the area adapted to securely receive that portion of the extension base 36. Those skilled in the art will appreciate that, because the extension 10 need not be used if so desired, the base 36 need not form a portion of extension 10 and, indeed, the connection assembly 1 and the body 15 do not require the use of the base 36. For example, the top of the body 15 in place of a base 36 could instead be formed of the same material as the rest of body 15, or could be left open if desired. Those of skill will also appreciate that the body 15 and base 36 can be formed to allow a snap-fit connection, such that the base 36 and extension 10 can be removably attached to the body 15 by an operator, or detached therefrom, as may be desired.

A hinge 33 is located at or near the top of the face 41 and at or near the top of face 43. The hinges 33 allow at least portions of the faces 41 and 43 to move inwardly and outwardly with respect to the longitudinal axis of the fluidic connector 1. Referring to FIG. 2, the hinge 33 at or near the top of the body 15 can be seen. In this particular embodiment, the hinge 33 defines the top of the face 41. In addition, a slot 23 on each side of the face 41 extends from each side of the hinge 33 downward and defines the face 41. As shown in FIG. 2, the slots 23 further extend downwardly from face 41 on either side of a front face of the bottom member 42 of the body 15. As can be seen from FIGS. 2 and 3, when the face 41 is pushed inwardly by an operator towards the longitudinal axis of the assembly 1, the portion of face 41 below hinge 33 can move inward because it is not fixed with respect to the rest of body 15. In addition, it can be seen that the two slots 23 join together near the bottom of the bottom member 42 of the body 15. The slots 23 are located and define the area of face 41 that can move when pressed such that the projections or latches 37 also move inwardly with the face 41. It will be appreciated, such as from FIG. 3, for example, that when the latches 37 both move inwardly, the distance between their outer edges decreases and provides a shorter length, thus allowing easy and quick insertion of the bottom member 42 of body 15 into, or removal from, a port of an AI system component. Those skilled in the art will appreciate that, although slots 23 as shown in FIG. 2, for example, extend continuously from either side of hinge 33 and define face 41 and then meet and join at or near the bottom of the bottom member 42, slots 23 can be configured differently if desired. For example, face 41 can be defined by a series of two or more slots (not shown) that are not continuous but yet extend in essentially the same pattern as shown in FIG. 2 for slots 23. Alternatively, instead of slots 23, a weakened area of the body 15 may be provided, such as the case described above for hinge 33 with a thinner width, to define face 41.

As shown in FIG. 3 (and as described in more detail below), a second spring member 45 is located within body 15 in this embodiment. In a normal resting position (e.g., without any force applied to faces 41 and 43 by an operator), the spring member 45 exerts a force against the inside surfaces of faces 41 and 43 and pushes them away from the longitudinal axis and to a closed position, such as is shown in FIG. 2. When a force is exerted on the faces 41 and 43, pushing them towards the longitudinal axis of the fluidic connector 1, the projections 37 proximal the bottom of the body 15 move towards the longitudinal axis, thereby making it easier for an operator to quickly insert the projections 37 (and thereby a portion of the fluidic connector 1) into a port or fitting (not shown in FIGS. 2 and 3), or to remove the projections 37 (and thereby the fluidic connector 1) from a port or fitting.

Figure 4B:
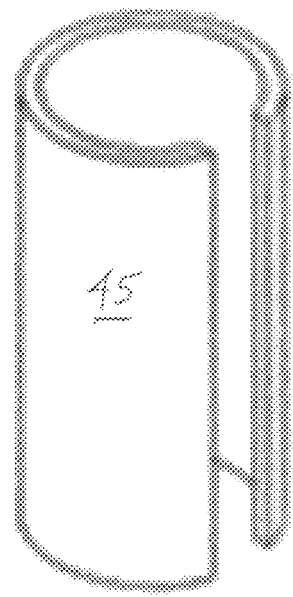
FIG. 4B is an isometric view of a band spring useful in an embodiment of the present disclosure.

Referring now to FIGS. 4A and 4B, additional details regarding the fluidic connector assembly 1 shown in FIGS. 2 and 3, and particularly with respect to body 15, are shown and are described below. FIG. 4A provides an enlarged, cross-sectional view of a portion of the fluidic connector 1, primarily the body 15. As shown in FIG. 4A, the tubing 5 extends through passageways extending through the extension base 36 and the body 15. As in FIG. 3, the body 15 in FIG. 4A includes a left indentation 40 on the left face 41 and a right indentation 40 on the right face 43 of body 15. As in FIG. 3, a portion of the extension base 36 is located within an interior portion of the body 15, at the top end of body 15, and a portion of the extension base 36 extends outward and exterior to the top end of the body 15. Located below the portion of the extension base 36 which is located within an interior portion of body 15 is a second spring member 45.

As shown in FIG. 4A, the tubing 5 also extends through the spring member 45 and along the longitudinal axis thereof. FIG. 4B provides an isometric view of the second spring member 45. As shown in FIG. 4B, the second spring member 45 in this particular embodiment is a band spring with a slot running the vertical length thereof. The second spring member 45 serves to bias or push the two faces 41 and 43 outwardly and away from the longitudinal axis of the assembly 1, but is selected and adapted (such as by the selection of its shape, material(s) and size) so that it can be deformed (from the position shown in FIGS. 4A and 4B) inwardly when a force is applied, such as when a user presses the two indentations 40 on the two faces 41 and 43 towards the longitudinal axis of the fluidic connector 1. Those skilled in the art will appreciate that the assembly 1 can be usefully used without the need for a spring 45. However, the use of a spring 45 is believed to be useful in order to bias the faces 41, 43 outwardly and to thereby avoid potential problems with fatigue of the material of the body 15. For example, if no spring 45 is used and the body 15 and faces 41, 43 have been pushed inwardly numerous times, the faces 41, 43 may tend to stay inwardly disposed, which may not be desired. The use of spring 45 thus can be used to help provide biasing of faces 41, 43 outwardly as may be desired.

Those skilled in the art will appreciate that human strength may vary, sometimes substantially. A fluidic connector assembly which is easily and quickly operable by men and women, strong or weak, would be advantageous. Such an assembly also would be advantageous if the ability to obtain a sealed connection does not vary from user to user, and does not require a narrow range of force or torque to obtain a sealed engagement, and does not require the use of any tools. The fluidic connector assembly 1 provides these advantages. For example, spring member 45 can be selected to require no more than an amount in a range of from two to five (e.g., three) pounds of force to be applied to indentations 40 to move the projections 37 inwardly enough to detach the fluidic connector 1 from a port. Almost all reasonably healthy and non-disabled adult humans are believed able to exert such a force by pinching sides 41 and 43 together between a thumb and finger (and without requiring any tools). Moreover, the fluidic connector assembly 1 of the present disclosure is advantageous because, once connected to a port, the fluidic connector assembly 1 provides a secure sealing engagement. An operator can easily visually check to be sure that the projections 37 are held in a port; such a confirmation is all that is needed for the operator to confirm that a seal has been obtained with the connection. Moreover, the sides 41 and 43 will provide a visual cue and confirmation of a sealing engagement because, once the sealing engagement has been made, the latches 37 will be biased outwardly from the longitudinal axis, and so will the faces 41 and 43, with the location of the faces 41 and 43 easily visible to an operator.

Figure 6:
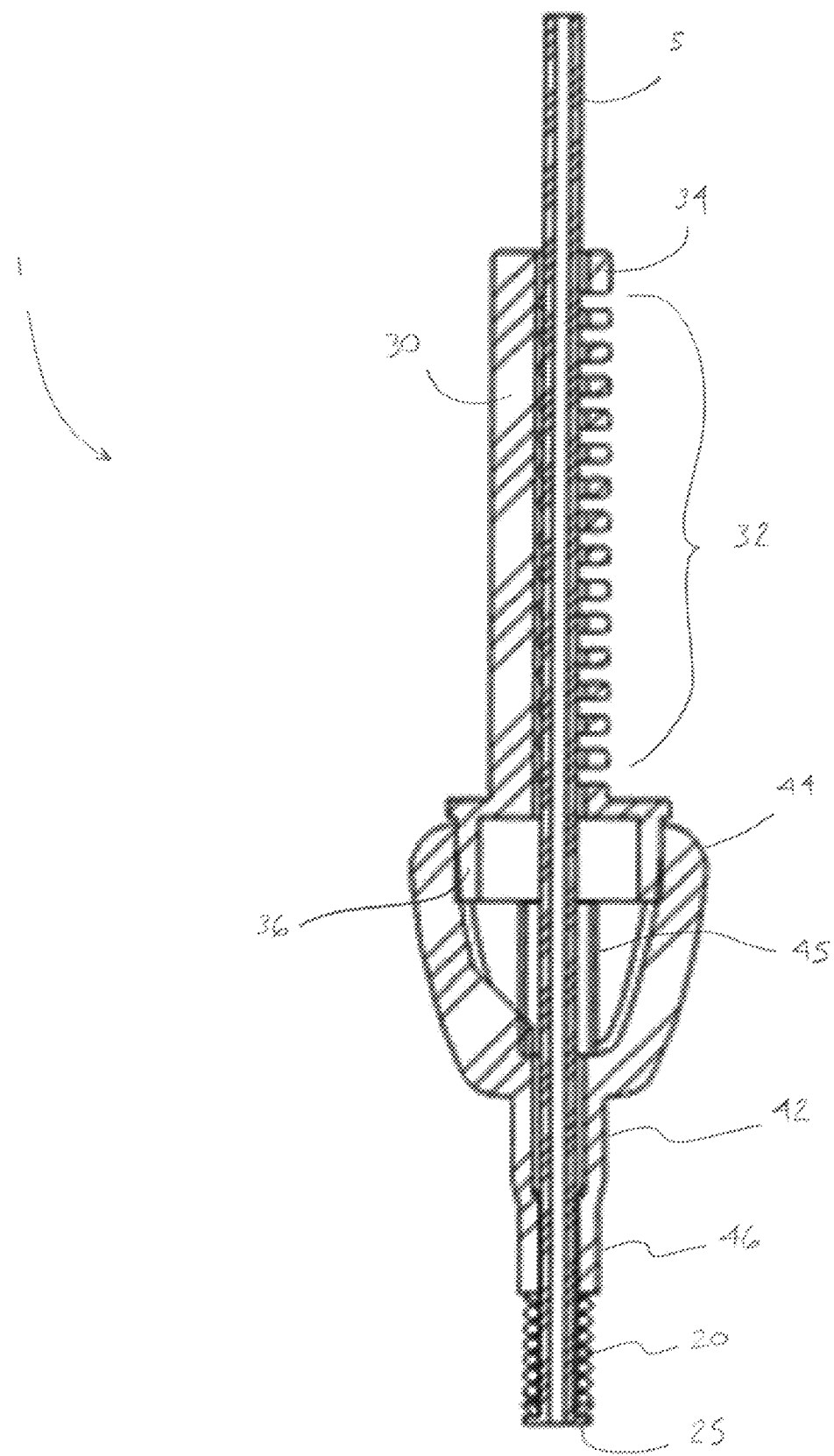
FIG. 6 is a cross-sectional view of the fluidic connector assembly shown in FIG. 5 taken along line D-.

Referring now to FIGS. 5 and 6, additional views of the fluidic connector assembly 1 in connection with the embodiment described above are provided. FIG. 5 provides a side view of the fluidic connector 1, as well as a cutline D-D, and FIG. 6 provides a cross-sectional view of the fluidic connector 1 as taken along line D-D as indicated in FIG. 5. It will be appreciated that additional details regarding the shapes and features of the fluidic connector 1 can be seen. For example, FIG. 6 provides a cross-sectional view showing spine member 30 of the extension 10 on one side of the extension 10 with the series of rings or toroidal members 32 on the other side.

Those skilled in the art will appreciate that, depending on the intended application, including without limitation the expected fluidic pressures, the nature of the fluids to be used, the nature of the samples to be analyzed, and the like, the composition of the materials used, as well as the specific shapes and sizes, of the various components and features of the fluidic connector 1 as shown and described above can be varied. For example, in applications in which biocompatibility is desired, the tubing 5 can be made of polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (PCTFE), polymer-sheathed fused silica (such as PEEKSil), fused silica, or silica borite, and can further include a filler material, which can include fibers, such as carbon fibers, glass fibers, nanofibers, and/or metallic fiber, depending on the pressures and fluids involved. It is anticipated that the fluidic connector 1 will be of particular usefulness in in vitro applications, such as those in which the fluidic pressures are about 200 psi or less, and in which biological materials are involved. In such situations, it is often desirable for the fluid path to contain only biocompatible materials. In the embodiment shown and described, however, this is achieved because the tubing 5 is the only component of the fluidic connector 1 touching the fluid. In the embodiment shown in FIGS. 1-6, then, the spring 20 and the second spring member 45 can be made of metal, such as stainless steel, titanium, steel, nickel, nitinol. Alternatively, the spring 20 and/or the second spring member 45 can be made of PEEK, PEI, and/or PPSU.

The extension 10 and body 15 can be made of any one of a number of different materials, including any one or more of the following: metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other materials, such a fused silica, silica borite, PEEKsil, and the like. In one embodiment, the extension is made of one or more polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other polymeric materials, with a wire made of a metal located within the spine member 30 and over molded with PEEK, although those skilled in the art will appreciate that any one of a number of additional or different polymers may be used for this purpose. This particular embodiment of the spine member 30 of the extension 10 allows an operator to bend or twist or otherwise shape the extension 10 or a portion thereof, and for that portion of the extension so manipulated by an operator to retain its shape indefinitely.

As noted above, the extension 10 can be optional. If included, extension 10 can be integral with the body 15, or the extension 10 can be a separate piece that is attached to the body 15. The extension 10 can be permanently attached to the body, such as by glue, epoxy, or other adhesive means, or can be attached such as by melting either or both of extension 10 and body 15 and attaching them and then allowing the polymeric material(s) to harden, or by sintering or other methods. In addition, the extension 10 and body 15 can be adapted so that the extension 10 can be removably attached to the body 15, such as by providing latching means or a compression fit. For example, the extension 10 can be adapted so that its base end has a slightly larger area than the top of the body 15 and can be compressed by a user, then inserted into the top of the body 15, such that when the operator releases the pressure on the extension 10 base end, it expands and is removably secured to the body 15.

An embodiment of the operation of the fluidic connector 1 is now described with reference to FIGS. 2 and 3, although those skilled in the art will appreciate the operation of the fluidic connector 1 in connection with all of the FIGs. An operator can assemble the fluidic connector 1 by placing the tubing 5 through the center passageways of the spring 20, the body 15, and the extension 10. (As noted above, the extension 10 and body 15 can be securely joined together or can be removably joined.) It will be appreciated that the spring 20, when compressed, will exert a force against the flanged end 25 of the tubing 5 and also against the bottom ring 46 of the body 15. This is described in more detail below in connection with the use of the fluidic connector 1 in a port.

As shown in FIG. 3, indentations 40 are located on opposing faces 41 and 43 of the body 15. Although shown as circular, they need not be. It will be appreciated that the spring 45 (shown in more detail in FIGS. 4A and 4B) can be used to provide a force biasing the faces 41 and 43 towards an outer or exterior position (i.e., away from the longitudinal axis of fluidic connection 1). The faces 41 and 43 can be depressed by an operator (without the use of tools), thus forcing the spring 45 to compress towards the longitudinal axis of the fluidic connector 1. As the operator presses the faces 41 and 43 towards the longitudinal axis of the fluidic connector 1, the spring 45 compresses on opposing sides as the faces 41 and 43 push the spring 45 inwardly towards the longitudinal axis of the fluidic connector 1. As the spring 45 is compressed inwardly, the bottom member 42 of the body 15 moves inwardly from its previously biased position. When this happens, the latches or projections 37 on the bottom member 42 also move inwardly and thus have a smaller outer diameter or length, thereby allowing quick insertion into, and easy removal of the fluidic connector 1 from, a port or other fluidic connection, such as in a component in an AI system.

By pressing faces 41 and 43 inwardly and inserting the bottom portion of assembly 1 into a port, then releasing the pressure on faces 41 and 43, an operator can obtain a connection that is sealed and leak-proof, and provides sufficient force to keep the sealed connection (even when a fluid under high pressures, such as from about 200 psi to about 5000 psi or so is flowing through the tubing 5) in place. An operator can make a desired connection in a LC or other analytical instrument system using the assembly 1 without the need for any torque, such as on a nut, without the need for a threaded connection, and without the need for any additional tools, such as a wrench or the like. Moreover, an operator can disconnect the assembly 1 from a port by pressing faces 41 and 43 inwardly and pulling on the body 15 or other portion of the assembly 1 and easily removing the assembly 1 from the port, again without the need for any application of a torque, without the need for disconnecting a threaded engagement (such as if a nut with threads is used), and without the need for any additional tools.

Referring now to FIGS. 7 and 8, an alternative embodiment of a fluidic connector 701 is shown. In FIG. 7, the fluidic connector 701 includes tubing 705 which extends along and around a longitudinal axis of the fluidic connector 701, The fluidic connector 701 includes an extension member 710, a body 715, a first ring 760, a second ring 765, a spring 720, and a backup ring 775. The extension member 710 can be substantially the same as the extension member 10 described above, and as shown in FIG. 7, the extension member 710 includes a series of toroidal members 732 located between an extension base 736, and a top ring or toroidal member 734.

The body 715, as shown in FIG. 7, includes hinges 733 on opposing faces 741 and 743. Each of the faces 741 and 743 includes an indentation 740. Located within an interior portion of the body 715 is a spring member 745. As shown in FIG. 7, the spring member 745 in this particular embodiment is a cantilevered spring, which can be made of metal or other materials, such as those described above. It can be seen from FIG. 7 that the spring 745 can be selected with respect to its size, shape and material composition so that the spring 745 exerts a force outward from the longitudinal axis of the fluidic connector 701 and against the faces 741 and 743.

Still referring to FIG. 7, it can be seen that the lower portion of the body 715 is located within a port in a body 770. The port in the body 770 can be a port in any one of a number of components or fittings in an AI system. As shown in FIG. 7, the body 715 has projections 737 which have a greater outer diameter than the portions of the body 715 above and below the projections 737. The projections 737 hold the lower portion of the body 715 within the port, since the port opening has a diameter less than that of the outer diameter of the projections 737 when the body 715 is in a normal or rest position.

The fluidic connector 701 shown in FIG. 7 also includes a first ring 760, a second rig 765, and a spring 720. The spring 720 in this particular embodiment and as shown in FIG. 7 is a coiled spring, which can be made of metal or other appropriate materials, such as those discussed above. The spring 720 can be selected as to its size, shape, and material composition so that it exerts a desired force against both upwards and downwards. Because the projections 737 hold the body 715 in place once they are located as shown in FIG. 7 with respect to the port of body 770, the body 715 is securely connected to the body 770. In addition, the spring 720 exerts a downward force, thereby pressing downwards on the backup ring 775 which, in turn, presses downwardly on the flange 725 of the tubing 705, thus keeping the end of the flange 725 of the tubing 705 pressed firmly and sealingly against the passageway in the body 770.

Referring now to FIG. 8, an enlarged cross-sectional view of a portion of the body 715 and certain components is provided. As shown at the top end of the body 715, a portion of the base 736 of the extension member 710 is located within and proximal to a top end of the body 715. Hinges 733 are located in the body 715, also proximal to its top end, but as shown in FIG. 8, the hinges 733 are located on opposing faces 741 and 743 of the body 715.

Referring now to FIG. 8, an enlarged cross-sectional view of a portion of the body 715 and certain components is provided, with the body 715 connected to a port of a body 770. As shown at the top end of the body 715, a portion of the base 736 of the extension member 710 is located within and proximal to a top end of the body 715. Hinges 733 are located in the body 715, also proximal to its top end, but as shown in FIG. 8, the hinges 733 are located on opposing faces 741 and 743 of the body 715. Hinges 733 are adapted to allow the faces 741 and 743 to move inwards towards the longitudinal axis of the fluidic connector 701 when a force is exerted thereon, such as when the faces 741 and 743 are pressed by an operator. When such a force is exerted, such as when an operator presses on the faces 741 and 743, and the faces move inwardly, the projections 737 also move inwardly towards the longitudinal axis. Thus, an operator can remove the fluidic connector 701 from the body 770, and disconnect the fluidic connector 701, by pressing on the faces 741 and 743 and pulling the fluidic connector 701 upwards and away from the port of the body 770. Because the tubing 705 extends through passageways in each of the other components of the fluidic connector 701 as shown in FIG. 7, the entire fluidic connector 701 can be removed from the body 770 without any need to disassembly or remove any of the components of the fluidic connector 701 from one another.

Still referring to FIG. 8, undercut portions 771 are provided by the body 770 as part of the port of the body 770. The undercut portions 771 are adapted to receive and hold the projections 737 of the body 715 when the lower portion of the body 715 is inserted into the port. The undercut portions 771 retain the projections 737 and keep the fluidic connector 701 connected to the body 770 once the projections 737 have been inserted sufficiently far enough into the port of the body 770. The spring 745 is selected so that it exerts an outward force on the faces 741 and 743 of the body 715 and thus also exerts an outward force on the projections 737 of the body 715, thereby retaining the projections 737 in place and retained by the undercut portions 771 of the port and thereby maintaining the fluidic connector 701 in a sealed connection with body 770.

By pressing faces 741 and 743 inwardly and inserting the bottom portion of assembly 701 into a port of the body 770, then releasing the pressure on faces 741 and 743, an operator can obtain a connection that is sealed and leak-proof, and provides sufficient force to keep the sealed connection (even when a fluid under high pressures, such as from about 200 psi to 5000 psi or so is flowing through the tubing 705) in place. An operator can make a desired connection in a LC or other analytical instrument system using the assembly 701 without the need for any torque, such as on a nut, without the need for a threaded connection, and without the need for any additional tools, such as a wrench or the like. Moreover, an operator can disconnect the assembly 701 from a port in the body 770 by pressing faces 741 and 743 inwardly and pulling on the body 715 or other portion of the assembly 701 and easily removing the assembly 701 from the port of the body 770, again without the needed for any torque, without the need for disconnecting a threaded engagement (such as if a nut with threads is used), and without the need for any additional tools.

Referring now to FIGS. 9 and 10, another embodiment of a fitting connector assembly is shown in a cut-away view. In FIG. 9, the fluidic connector 901 includes a body having a head 910 at one end and a lower portion 912 at an opposing end. As seen in FIG. 9, a tube 905 extends from above the head 910 and through a passageway extending through the body. The tubing 905 has a flange 925 at its bottom end, which extends out from the lower portion 912 of the body. As shown in FIG. 9, the head 910 can be generally rectangular in shape (although head 910 can generally be of other shapes, such as circular, elliptical, and the like). A slot 904 is shown on one side of the head 910; a similar and opposing slot (not shown in FIG. 9) would be on the opposing side in this particular embodiment, thus providing a generally rectangular head 910 with four sides; two opposing sides of which have slots therein. The fluidic connector 901 also includes a spring member 945 located at or near the top end of the body 910. The head 910 also has splines 907, which are provided to allow an operator to grasp and manipulate the fluidic connector 901 easily. The fluidic connector 901 has an interior portion, which includes a tapered portion 902, which is generally conical in shape. As shown in FIG. 9, located below the head 910 are projections 937 extending out from the longitudinal axis of the fluidic connector 901. Located below the lower portion 912 of the body is a spring 920, which in this particular embodiment can be a coiled spring. FIG. 10 provides a cross-sectional view of the embodiment of the fluidic connector 901 shown in FIG. 9.

An operator can easily assembly the fluidic connector 901 by placing the tubing 905 through the spring 920, through the central passageway through the lower portion 912 and head 910 of the body, and through the central passageway through the spring member 945, and extending from the top end of the fluidic connector 901. The spring member 945 can be removably secured within the head 910 if desired, or can be permanently attached or secured to the head 910. The spring member 945 can be any one of number of different types of spring members, such as an elastomeric spring. The spring member 945 serves to push or bias the four sides of the head 910 outward from the longitudinal axis of the fluidic connector 901. However, the spring member 945 can be selected (such as by selecting its shape, size, and material composition) so that an operator can easily push the two opposing sides of the head 910 which do not have slots 904 towards the longitudinal axis. The slots 904 allow the other two sides to move towards each other, and thus the projections 937 move towards each other and the longitudinal axis, thereby providing a smaller outer diameter than when in a resting or normal position (such as when no additional force is applied to opposing sides of head 910). By squeezing the two opposing sides of head 910 which do not have slots 904, the operator can move the projections closer together for easy insertion of the lower portion of the fluidic connector 901 into a port and, when the operator releases the two opposing sides, the projections 937 move outwardly from the longitudinal axis of the fluidic connector 901 and, due to their now greater outer diameter, can be securely held in place in the port. To remove the fluidic connector 901 once secured to a port, the operator can squeeze the two opposing sides of head 910 which do not have slots 904 towards one another and towards the longitudinal axis, thereby moving the projections 939 towards the longitudinal axis and reducing the outer diameter of the two projections 937, at which point the operator can easily pull the entire (and still assembled) fluidic connector 901 from the port. The fluidic connector 901 thus allows an operator to quickly connect the fluidic connector 901 to a port, to quickly disconnect the fluidic connector 901 from a port, all without requiring the use of any tools or applying a particular force beyond that necessary to insert the fluidic connector 901 into the port as described. Moreover, the spring 920 pushes the flange 925 against the bottom of a port and thereby ensures a sealing connection when the fluidic connector 901 is connected to a port as just described.

Referring now to FIG. 11, another embodiment of a fluidic connector 1101 is shown. In FIG. 11, the fluidic connector 1101 includes an extension portion 1110 and a body 1115. The extension 1110 includes a top member 1134 and a series of toroidal members 1132. Also included as a part of extension 1110 (but not shown in FIG. 11) is a spine member. The base 1136 of the extension 1110 is located within a portion of the body 1115. The body 115 includes two opposing faces 1141 and 1143, each of which has an indentation 1140. In addition, each of the opposing faces 1141 and 1143 has a hinge 1133 to allow at least a portion of the face 1141 and 1143 to move inwardly and outwardly with respect to the longitudinal axis of the fluidic connector 1101. The fluidic connector 1101 also includes a spring 1145 located within an interior portion of the body 1115. The body 1115 also includes a lower portion which has projections 1137 adapted for removable engagement as described below. Located below the body 1115 is a ring member 1165, and below the ring member 1165 is a spring 1120, which in this particular embodiment and as shown in FIG. 11 is a coiled spring. As can be seen from FIG. 11, the tubing 1105 has a flange 1125 at one end, and the tubing 1105 extends along the longitudinal axis of the fluidic connector 1101 through a central open portion of the spring 1120 and through passageways in the ring 1165, the body 1115, the base 1136, and the extension 1110.

In FIG. 11, the fluidic connector 1101 is connected via an adapter 1185 to a port in a component or fitting 1170, such as a component or fitting 1170 of the type used in an AI system. As shown in FIG. 11, the projections 1137 have an outer diameter greater than the top opening of the adapter 1185. The undercut portions of the adapter 1185 hold the projections 1137 securely in place relative to the adapter 1185 once they are inserted into the adapter 1185. As also shown in FIG. 11, the adapter 1185 has a portion which is externally threaded in this embodiment. Moreover, the port of component 1170 is internally threaded, and the external threaded portion of the adapter 1185 is selected and adapted so that adapter 1185 can be screwed into the port of the component 1170 and thereby securely and removably held in place and connected to the component 1170. As the adapter 1185 is screwed into the port of component 1170, the spring 1120 in the fluidic connector 1101 will be compressed and will exert a force upon the backup ring 1175, which in turn will exert a force on the flange 1125 and urge or press the flange 1125 against the bottom of the port of component 1170 as shown in FIG. 11.

Referring now for FIG. 12, an enlarged cross-sectional view of a portion of the connected fluidic connector 1101 shown in FIG. 11 is provided. Like numerals are used for the same features and components shown in both FIGS. 11 and 12, although additional numerals are used for certain details better illustrated in FIG. 12. As shown in FIG. 12, the tubing 1105 extends through a spring 1120, and both tubing 1105 and spring 1120 are located within a passageway in an adapter 1185. The tubing 1105 has a flange 1125 at a bottom end, which is pressed against the bottom of the port of the component 1170. As shown in FIG. 12, a fluid passageway 1180 extends from the bottom of the port of component 1170. The fluidic connector 1101 in FIG. 12 also shows the backup ring 1175 in more detail. The backup ring 1175 is located between the bottom of the spring 1120 and the top of the flange 1125. The backup ring 1175 at its bottom end or side has a smaller diameter than at its top end or side. The backup ring 1175 can be used to concentrate the force exerted on the flange 1125 to a smaller or reduced area of the surface of the flange 1125, which has the advantage of keeping the fluid pressure area as small as possible during operation when a fluid is flowing under pressure through tubing 1105. The backup ring 1175 thus helps maintain a sealed connection between the fluidic connector 1101 and the component 1170. As also shown in FIG. 12, the port of the component 1170 has a lower portion 1203 and, above that, an internally threaded portion with internal threads 1202. As noted above, the adapter 1185 has an externally threaded portion with external threads 1201. The external threads 1201 are selected so that they can be removably and securely engaged with the internal threads 1202 of the port of component 1170.

Referring now to FIG. 13, another embodiment of a fluidic connector is provided. As shown in FIG. 13, a component 1370 has a tee connection among fluid passageways 1390, 1391, and 1392. In this particular embodiment, the tube 1305 of the fluidic connector does not have a passageway therethrough, but is solid. Alternatively, the tube 1305 could be made of a semi-permeable material to allow some fluid to flow therethrough, but only under pressure. As shown in FIG. 13, a bottom end of the tube 1305 is located adjacent to the bottom of the port 1308 of the component 1370 in the connected mode. Also shown in FIG. 13 is a bottom sleeve 1303. The sleeve 1303 in this embodiment is attached to the tube 1305. The sleeve 1303 can be attached to the tube 1305 through techniques such as fusing, crimping or overmolding. The sleeve 1303 can be advantageous because it provides a surface which is biased against the bottom of the port by the spring 1320 and provides additional surface area to provide a seal.

In this particular embodiment in FIG. 13, the fluidic connection acts as a pressure relief, such that when the pressure of a fluid in passageways 1390, 1391, and 1392 exceeds a certain threshold amount, the tube 1305 will be pushed away from a sealing engagement with the bottom of the port and fluid will flow through passageway 1390 and into the port 1308. Those skilled in the art will appreciate that the force exerted on the ring 1303 by the spring 1320 can be selected by selecting the shape, size and material composition of the spring 1320.

Referring now to FIGS. 14, 15, and 16, enlarged cross-sectional views are provided with respect to additional details of alternative embodiments of a fluidic connector in accordance with the present disclosure. Like features and components have the same numerals in FIGS. 14, 15, and 16 for convenience only; it will be apparent that each of FIGS. 14, 15, and 16 illustrates a different potential embodiment in accordance with the present disclosure.

Referring first to FIG. 14, a portion of a port 1408 in a component 1470 is shown. Located within the port 1408 is the bottom portion of a fluidic connector. In FIG. 14, the bottom end of tube 1405 is adjacent to the bottom of the port 1408 and sealingly engaged therewith. The fluidic connector includes a spring 1420 located above a sleeve 1403. As shown in FIG. 14, a passageway for fluid communication extends through the tube 1405 and is aligned with the passageway 1480 in the component 1470. As shown in FIG. 14, the bottom end of the tube 1405 in a sealing engagement with the port 1408 is an essentially or substantially flat surface.

Now referring to FIG. 15, a view of an embodiment similar to that shown in FIG. 14 is provided. In FIG. 15, a tube 1505 extends through the spring 1420 and sleeve 1403 and the fluidic connector is located and connected to a port 1408 in a component 1470. The passageway in tube 1505 is aligned with the passageway 1480 in component 1470. Instead of a flat surface at the bottom of the tube 1505, however, a portion of the tube with a smaller diameter (and thus a smaller or reduced surface area) is in contact with the bottom of the port 1408. The tube 1505 has a reduced diameter portion 1501 at its bottom end, and a tapering portion 1502 slightly above the reduced diameter portion 1501. The use of a reduced diameter portion 1501 is helpful in concentrating the pressure load in a smaller area and thereby increases the pressure at the seal area. This has the advantage of allowing the fluidic connector to remain sealed when connected even at higher fluid pressures.

Another embodiment is shown in FIG. 16. In FIG. 16, a tube 1605 is connected via a fluidic connector in a port 1408 in a component 1470. The passageway through the tube 1605 is aligned with the passageway 1480 in the component 1470. As also shown in FIG. 16, a sleeve 1403 is located above the bottom end of the tube 1605 and below the spring 1420. In FIG. 16, the bottom face of the tube 1605 has a reduced diameter and smaller surface area 1601, with this reduced area 1601 providing the sealing engagement with the bottom of the port 1408. The tube 1605 has a tapered portion 1602 between the reduced area portion 1601 and the portion of tube 1605 above it. As with the embodiment shown in FIG. 15, the embodiment shown in FIG. 16 provides the advantage of concentrating the load in a reduced area and thereby allows operation with a sealed connection at higher pressures.

Referring now to FIGS. 17-20, various views are provided of another embodiment of the present disclosure. In FIG. 17, a cross-sectional view of a connection assembly 1701 as connected to a port in a body 1770 is provided. As shown in FIG. 17, the assembly 1701 has tubing 1705 extending along a longitudinal axis of the assembly 1701, an extension member 1710 having a top portion 1734, a series of toroidal members 1732, and a base 1736. It will be appreciated that these various features correspond to the extension member 10, toroidal members 32, top member 34, and base 36 described above and the foregoing description of such corresponding features applies equally. In FIG. 17, a bottom portion of the assembly 1701 is located in a port of a body 1770, with the bottom portion including a ring member 1765, a spring 1720, a tip member 1750, and a ring 1755. As shown in FIG. 17, one end of the tubing 1705 is adjacent to and abutting the bottom of the port, and portions of the tip member 1750 surrounding the tubing 1705 are also adjacent to and abutting the bottom of the port of the body 1770.

An enlarged cross-sectional view of the bottom portion of the assembly 1701 shown in FIG. 17 is provided in FIG. 18. In FIG. 18, the tip member 1750, the tubing 1705, and the ring 1755 are shown near the bottom of the port of the body 1770. Those skilled in the art will appreciate that, as shown in FIG. 18, when the assembly 1701 is assembled and connected to a port in a body 1770, the spring 1720 urges the tops of the ring 1755 and tip 1750 towards the bottom of the port of the body 1770, thus providing a seal with sufficient force to prevent any leaks and prevent the tubing 1705 from being pushed out of the assembly 1701, even when fluids at high pressures, such as from about 200 psi or so to about 5000 psi or so, are flowing through the tubing 1705 and the assembly 1701 as connected to the port of the body 1770 as shown in FIG. 18. In addition, it will be appreciated that the spring 1720 presses against and exerts an upward force on the ring member 1765, thereby urging the bottom of the body 1715 and the projections near the bottom of the body 1715 (not shown in FIG. 18) against the top of the port of the body 1770. FIG. 19 provides an additional view of the connection assembly shown in FIGS. 17 and 18, with the assembly shown in a sealing engagement, and with like features having the same numbers for convenience of the reader.

Figure 20:
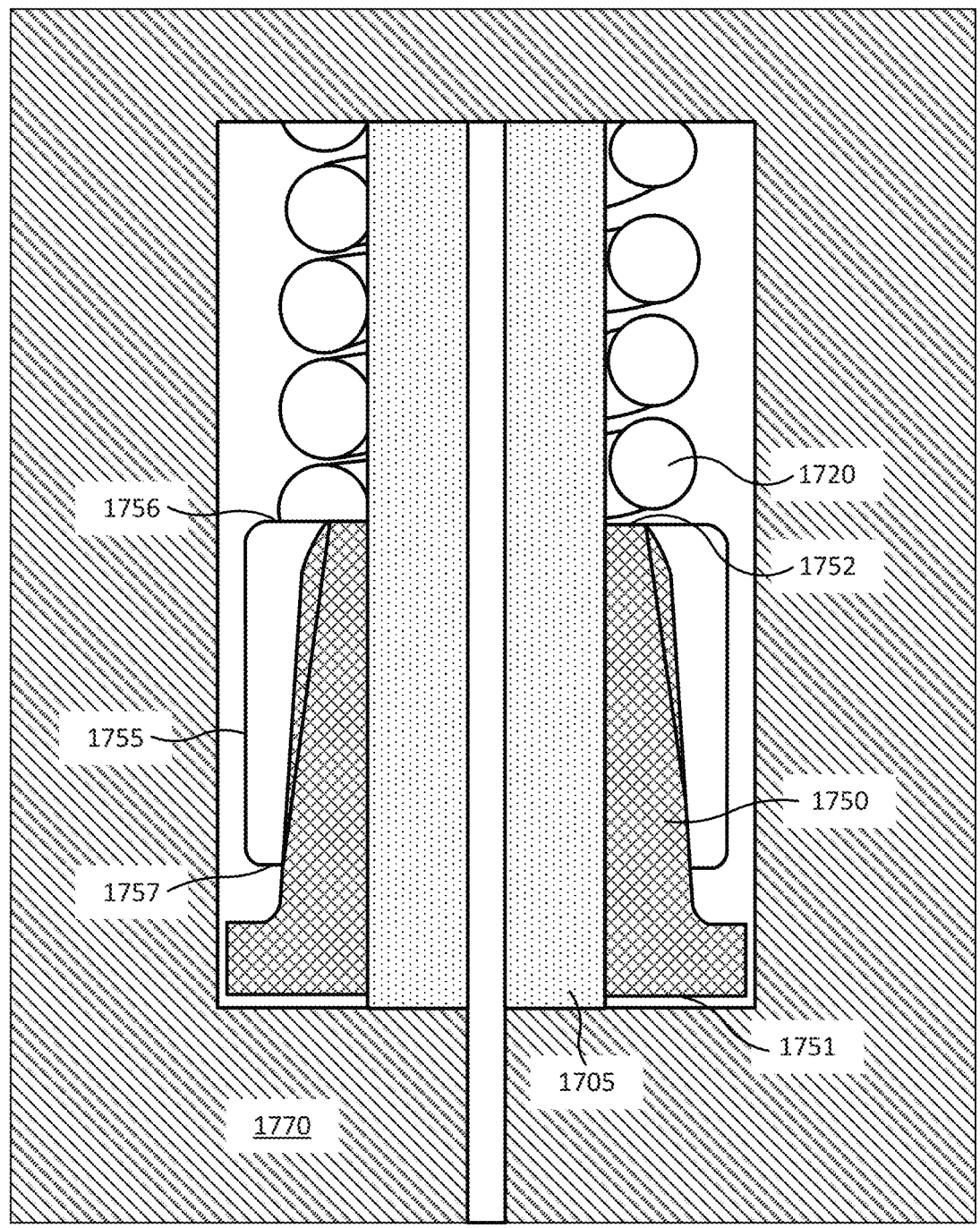
FIG. 20 is another enlarged cross-sectional view of a portion of the fluidic connector assembly shown in FIG. 17 in accordance with one embodiment of the present disclosure, and is shown in a connected state.

Referring now to FIG. 20, additional details are shown in the enlarged cross-sectional view of the fitting assembly 1701 as connected to a port in a body 1770. As shown in FIG. 20, the tip 1750 has a first end and a top end, wherein the top end has a portion 1752 which has a smaller diameter than the bottom portion 1751. As shown in FIG. 20, the bottom portion 1751 provides a greater area for contact with the bottom of the port of the body 1770 (although such contact is not shown in FIG. 20), As also shown in FIG. 20, the ring 1755 has a top end and a bottom end, wherein the top end has a portion 1756 with an exposed surface area greater than the surface area of the bottom end 1757 of the ring 1755. As can be seen in FIG. 20, each of the ring 1755 and the tip 1750 have tapered portions between their respective top and bottom ends as shown in FIG. 20. In the case of the ring 1755, the internal diameter defines a tapered portion, with the internal diameter at the bottom of the ring 1755 greater than the internal diameter of the ring 1755 at its top. In the case of the tip 1750, the outside diameter of the tip 1750 defines a tapered portion, with the bottom of the tapered portion of the tip 1750 having a greater outside diameter than the top of the tapered portion of the tip 1750, all as shown in FIG. 20. It will be appreciated that, when the assembly 1701 is connected to the port of the body 1770 and the spring 1720 exerts a force urging the ring 1755 and the tip 1750 against the bottom of the port of the body 1770, the bottom end 1757 of the ring 1755 will be urged towards the longitudinal axis of the assembly 1701 and exert a force inwardly on the tip 1750 to prevent any leaks between the tubing 1705 and the tip 1750.

The ring 1755 can be made of any one or more of the following materials, as may be desired for the anticipated use(s) of the assembly 1701: PEEK, PEAK, PEI, and/or PPSU. The tip 1750 can be made of any of the following materials, as may be desired for the anticipated uses) of the assembly 1701: polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (MITE), polymer-sheathed fused silica (such as PEEKSil), fused silica, or silica borite, and can further include a filler material, which can include fibers, such as carbon fibers, glass fibers, nanofibers, and/or metallic fiber, depending on the pressures and fluids involved. Those skilled in the art will appreciate that the ring 1755 and tip 1750 can be of any number of desired shapes and sizes, preferably so that the tapered portions of the ring 1755 and the tip 1750 are adapted to cooperate with one another when the assembly 1701 is connected to the port of the body 1770.

Referring now to FIGS. 21-25, another alternative embodiment of the connection assembly in accordance with the present disclosure is provided. As shown in FIG. 21, an assembly 2101 includes an extension member 2110, tubing 2105, a body 2115, a spring 2120, and a flange 2108 at one end of the tubing 2105. From the prior discussion, it will be apparent that the fitting assembly 2101 is adapted to engage with a flat-bottomed port, such as in a component in an AI system (not shown in FIG. 21). The extension member 2110 in this particular embodiment is attached to the top 2136 of the body 2115. As shown in FIG. 21, the body 2115 has four sides, which can be considered a front face, an opposing back face, and a side 2141 and an opposing side 2143 (not shown in FIG. 21). As shown in FIG. 21, the side 2141 has a projection 2137, which is adapted to engage with a port and removably hold the assembly 2101 in a sealing connection with a port.

Now referring to FIGS. 22 and 23, alternative views of the assembly 2101 are provided. FIG. 22 provides a view of one face of the assembly 2101 (which for discussion purposes can be referred to as the "front" face), and FIG. 23 provides a cross-sectional view of the assembly 2101 taken along line F. F. of FIG. 22. It will be appreciated that the same numbers are used to indicate the same features in FIGS. 21-25 for ease of reference by the reader. As shown in FIG. 22, the body 2115 has two opposing sides 2141 and 2143, each of which has projections 2141a and 2143a, respectively. In addition, each of the two sides 2141 and 2143 has lower portions which have projections 2137 on each side of the body 2115. In the assembly, shown in FIG. 22, an operator can push on the projections 2141a and 2143a to push the two opposing sides 2141 and 2143 of the body 2115 inwardly towards the longitudinal axis of the assembly 2101, thus moving projections 2137 inwardly as well and decreasing the length between the tips of the two opposing projections 2137. Doing so allows the assembly 2101 to be quickly and easily inserted into, or removed from, a port (not shown in FIG. 22 or 23).

Referring now to FIGS. 2.4 and 25, additional alternative views of the assembly 2101 are provided. FIG. 24 provides a view of one side 2141 of the assembly 2101 (which for discussion purposes can be referred to as a "side" face), and FIG. 25 provides a cross-sectional view of the assembly 2101 taken along line F-F of FIG. 24. As noted, it will be appreciated that the same numbers are used to indicate the same features in FIGS. 21-25 for ease of reference by the reader. As shown in FIG. 24, the side 2141 of the body 2115 has two members 2135a and 2135b on either side of the projection 2141a. Moreover, the projection 2141a is shown to have a generally rectangular or parallelogram shape, with rounded corners. Those skilled in the art will appreciate that the shape of the projection 2141a can easily be varied as may be desired. For example, the shape shown in FIGS. 21-25 provides a useful shape which is easily used by an operator to push sides 2141 and 2143 towards one another, but other shapes can likewise be used, such as ellipses, circles, squares, triangles, and so forth.

Among other features to note include the alternating grooves in the extension member 2110. As indicated by a comparison of FIGS. 21-25, it can be seen that the grooves in extension member 2110 are essentially arcs which extend roughly 180 degrees around the generally conical edge of the extension member 2110. Again, those skilled in the art will appreciate that differing patterns and configurations can be used for the extension member 2110. The alternating grooves in extension 2110 provide a balance between the strength needed for the extension 2110 to provide effective stress relief for the tubing 2105, while avoiding the use of too much material that is not needed. Those skilled in the art will appreciate that the features of the assembly 2101 as shown in FIGS. 21-25 can be made of the same materials as similar items and features in the embodiments previously described in this disclosure.

Additional embodiments of a quick connect/disconnect assembly are illustrated in FIGS. 26-31. It will be appreciated that like features and items will have the same numbering in FIGS. 26-31 for convenience. In FIG. 26, a cross-sectional view of an assembly 2601 is provided which includes a body 2602 which has a passageway therethrough in which tubing is located along the longitudinal axis of body 2602, with the tubing having an inner tube 2605b and an outer tube 2605a. Also located within a first portion of the body 2602 (i.e., the "top" portion of body 2602 in FIG. 26) is a spring element 2620. As illustrated in FIG. 26, the spring 2620 is a coiled spring which is located around the tubing and within the body 2620. Also located within the body 2602 is a bearing element 2625. As shown in FIG. 26, one side of the bearing element is located at the bottom end of and abuts the spring 2620. The other side of the bearing 2625 is adjacent to and abuts a sleeve 2610 which surrounds a portion of the outer tubing 2605a (and thus inner tubing 2605b as well). The bottom portion of the body 2602 has inwardly projecting shoulders 2637, shown on both sides of the body 2602 in FIG. 26, each having a face 2638.

The assembly 2601 in FIG. 26 also includes a port 2670, which can be a port for an AI system or for any component in an AI system. The port 2670 has an opening at one end through which the tubing 2605a and 2605b extends. The port 2670 also has a flat-bottomed port and a passageway 2675 which allows for fluid communication with a fluid in the interior of the inner tube 2605b. The port 2670 also includes projections 2677 on both sides, each of which has a projection face 2678. As shown in FIG. 26, the body 2602 and port 2670 are removably attached to each other and held together by the engagement of the projections 2677 of the port 2670 and the shoulders 2637 of the body 2602, with the each of the faces 2678 abutting the corresponding faces 2638. The assembly 2601 is thus shown in a connected configuration in FIG. 26.

The inner and outer tubing 2605a and 2605b are configured so that one end of the inner tubing 2605b abuts against the bottom of the flat-bottomed port of port body 2670. Also shown in FIG. 26 is a sleeve 2610, which surrounds a portion of the outer tubing 2605a. One end of the sleeve 2610 abuts one side of the bearing 2625, and the other end of the sleeve 2610 has a recess therein in which a tip 2615 is located. The configuration and use of the tubing with sleeve 2610 and tip 2615 is described in more detail in co-pending U.S. non-provisional patent application Ser. No. 14/992,041, filed Oct. 23, 2015 and titled "Face-Sealing Fluidic Connection System," which is hereby incorporated by reference as if fully set forth herein. Those skilled in the art will appreciate and understand, however, that the present disclosure and its embodiments may such use other tubing configurations as may be desirable for a given application, and are not limited to those shown and described herein.

Those skilled in the art will appreciate that, depending on the intended application, including without limitation the expected fluidic pressures, the nature of the fluids to be used, the nature of the samples to be analyzed, and the like, the composition of the materials used, as well as the specific shapes and sizes, of the various components and features of the fluidic connector assembly 2601 as shown and described above can be varied. For example, in applications in which biocompatibility is desired, the tubing 2605a and 2605b can be made of the same or different materials, including for example [polyetheretherketone (PEEK), polyaryletherketone (PAEK), polyetherketoneketone (PEKK), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (PCTFE), polymer-sheathed fused silica (such as PEEKSil), fused silica, or silica barite, and can further include a filler material, which can include fibers, such as carbon fibers, glass fibers, nanofibers, and/or metallic fibers, depending on the pressures and fluids involved. It is anticipated that the assembly 2601 will be of particular usefulness in applications in which biological materials are involved. In such situations, it is often desirable for the fluid path to contain only biocompatible materials. In the embodiment shown and described, this is achieved because the tubing 2605b, the tip 2615 and the port body 2670 are the only components of the assembly 2601 touching the fluid, an even then tip 2615 need not necessarily come into contact with the fluid if the sealing connection between the end of the inner tubing 2605b and the port body 2670 is made. In the embodiment shown in FIG. 26, then, the spring 2620, as well as the body 2602, the bearing 2625, and the sleeve 2610 can be made of metal, such as stainless steel, steel, titanium, nickel, and/or nitinol. Alternatively, the spring 2620, as well as the body 2602, the bearing 2625, and the sleeve 2610 can be made of metal, or can be made of PEEK, PEAK, PEKK, PEI, and/or PPSU.

A user or operator can quickly and easily connect the body 2602 and port 2670. To connect the body 2602 and port 2670, a user can insert one end of tubing 2605a and 2605b into and through the passageway through the longitudinal axis of body 2602, through the sleeve 2610, and into the opening of port 2610. The user can then pinch the two tabs 2640 extending radially outwardly from the longitudinal axis of the body 2602, and push the two tabs 2640 towards the longintudinal axis (i.e., radially inwardly). By doing so, the user thus moves the two inwardly projections 2637 of the body radially outwardly, and thereby increases the inner diameter between the two projections 2637. Once the inner diameter between the two projections 2637 is greater than the outer diameter of the two shoulders or projections 2677 of the port 2670, the bottom end of the body 2602 can easily and quickly fit over the projections 2677. Once the projections 2637 are below and past the projections 2677, the user can simply release the force on the two tabs 2640 and the projections 2637 of body 2602 will automatically move back radially inwardly, thereby engaging faces 2638 and 2678 so that the body 2602 and the port 2670 are held securely and removably together. To disconnect the body 2602 and port 2670 from one another, a user can simply urge the tabs 2640 radially inwardly and towards the longitudinal axis of the assembly 2601, thereby moving the projections 2637 of the body 2602 radially outward and disengaging the projections 2637 and 2677. Once the inner diameter defined by the two projections 2637 is greater than the outer diameter defined by the projections 2677 of the port 2670, the body 2602 can be pulled away and removed from the port 2670 quickly and easily. As shown in FIG. 26, the assembly 2601 is in a connected configuration.

In this particular embodiment, the two tabs 2640 and the bottom portion of the body 2602 can be substantially rectangular in shape. Those skilled in the art will appreciate, however, that the tabs 2640 and/or bottom portion of the body 2602 can be curved and describe an arc around the longitudinal axis, or can even be circular in shape and extend all the way around the longitudinal axis of the assembly 2601 if desired.

Those skilled in the art will appreciate that, when making a connection, a user will also need to push the body 2602 towards the port 2670 and along the longitudinal axis of the assembly 2601, and doing so will thereby compress the spring 2620. As the spring 2620 is compressed, it will exert a force longitudinally against the bearing 2625 and thereby against the sleeve 2610, which in turn exerts a force against the tip 2615, urging it against the bottom face 2673 of the port 2670 and sealing the inner tubing 2605b in the port to provide a leak-free seal. The spring 2620 can be chosen so that its size and compressive force is such that it fits within the body 2602 as shown and also is easily compressed by a user by hand without the need for tools or fixtures, yet will continue to exert a compressive force against the bearing 2625 to keep the tip 2615 abutting the bottom of the port and thus keep the leak-free seal while the assembly 2601 remains in a connected configuration. We believe that, with the appropriate selection of materials and spring size, a leak-free seal of capillary tubing can be obtained in a flat-bottomed port with fluid flowing through the tubing at pressures of up to 20,000 psi without any leakage or extrusion of the tubing from the assembly 2601.

Referring now to FIG. 27, another cross-sectional view of the assembly 2601 is provided. It will be appreciated that in FIG. 27, the body 2602, tubing 2605a and 2605b, spring 2620, and bearing 2625, as well as sleeve 2610 and tip 2615 can be the same as shown in FIG. 26 and as described above. In FIG. 27, the port 2670' differs in that it no longer provides a conventional flat-bottomed port (as was shown in FIG. 26 and described above). Instead, the bottom of the opening adapted to receive and sealingly hold the tubing in the port 2670' has a standing boss portion 2672 which extends upwardly from the bottom of the opening and radially inwardly towards the longitudinal axis of the port 2670', thus providing a flat-bottomed face 2673' which has a smaller diameter than the inner diameter of the opening of the port 2670' into which the tubing is inserted and is received. As shown in FIG. 27, only the inner tube 2605b is in contact with the face 2673' of the port 2670'. Those skilled in the art will appreciate, however, that the size of the face 2673' of the port 2670' can be chosen so that, when desired, some or all of the tip 2615 and inner tube 2605b together abut the face 2673' instead of just the tube 2605b.

Conventional designs for ports and connections in most UHPLC and HPLC instruments and components typically have a 10-32 coned port with a flat bottom for creating the fluidic seal with one end of tubing connected therein. The standing boss 2672 provides a feature that allows for use of the assembly 2601 with ports like port 2670' in applications with elevated pressures not common for conventional quick connections. Conventional 10-32 port bottoms typically have a sealing area of 0.0032 square inches, whereas the standing boss 2672 can be used to provide a port bottom face 2673' with an area of 0.00031 square inches. The sealing area becomes important when considering the pressure applied to the end of the tubing. Assuming the tubing can be pressed by the user, via a fitting assembly 2601 or otherwise by conventional assemblies, to about 10 lbs of load, then the pressure at the tube end in a standard port is 3,125 psi vs. 32,258 in a port 2670' with the standing boss 2672 and the reduced flat bottomed port face 2673'. Those skilled in the art will appreciate that the standing boss 2672 can be provided in a number of ways; it can be machined directly in the port bottom or can be obtained via the use of an additional insert that fits in the port bottom, or in other ways.

Now referring to FIG. 28, a cross-sectional view of an embodiment of a connection assembly 2801 is provided. In FIG. 28, a body 2602 is provided, which may be the same as the body 2602 described above. The body 2602 has tubing 2605a and 2605b extending through the passageway through the body 2602, and has a coil spring 2620 located within a top portion of the body 2602 and around the tubing, with one end of the coil spring 2620 abutting an interior top end of the body 2602 and the other end abutting one side of a bearing 2625. The body 2602 further has two tabs 2640 and radially extending inward projections 2677.

In FIG. 28, the assembly 2801 includes one end of a column 2855, which has an exterior or outer layer 2850. One end of the outer layer 2850 has external threads 2851, which are adapted to securely engage with the internal threads 2861 of the adapter 2860. As shown in FIG. 28, the adapter 2860 has a first end which provides a port adapted to securely and sealingly receive one end of tubing 2605a and 2605b, as well as securely and removably engage with the body 2602 via the projections 2877 on either side of the adapter 2860. The other end of the adapter 2860 (i.e., the bottom end as illustrated in FIG. 28) has a recess therein which has an internally threaded portion 2861. As shown in FIG. 28, a first portion of the recess in the bottom end of the adapter 2860 is adapted to removably engage with the outer layer 2850 and column 2855.

The adapter 2860 also has a seat portion 2862 therein which, in the embodiment shown in FIG. 28, has an insert 2870 removably seated therein. As shown in FIG. 28, the insert 2870 has a first side which has standing boss 2872 which provides a face 2873 against which the inner tube 2605b and at least a portion of the tip 2615 abut to provide a removably sealing engagement. The standing boss 2872 provides the same advantages as described above with respect to a smaller area for forming the seal with one end of the tubing. The second side of the insert 2870 has a recess portion, in which a filter element 2880 (such as a frit is located. Those skilled in the art will appreciate that, although FIG. 28 illustrates the use of the body 2602 with an adapter 2860 for connecting to one end of a column 2855, the adapter 2860 can be used with body 2602 to provide a quick and easy connect/disconnect function (such as described above) in connection with any one of a number of components in an LC or AI system.

Turning now to FIG. 29, a cross-sectional view of an assembly 2901 is illustrated to show another embodiment of this disclosure. The assembly 2901 includes a body 2602 through which one end or tubing 2605a and 2605b extends, together with a spring 2620 located within and along the longitudinal axis of the body 2602. The body 2602 has tabs 2640 and radially, inward projections 2637 as described above.

In the assembly 2901, an adapter 2970 is used together with the body 2602 to connect the tubing 2605a and 2605b to a union 2910. As illustrated in FIG. 29, the union 2910 may have a conventional port, such as one having an internally threaded portion with 10-32 threads, a conical taper, and then a flat-bottomed face for sealing against an end of a tube. As shown in FIG. 29, the adapter 2970 has a passageway therethrough along its longitudinal axis, with a first or top end as shown in FIG. 29 having proximal thereto radially outwardly extending shoulders or projections 2977 on either side, each of which have faces 2978 and are adapted to removably engage with the projections 2637 on either side of the body 2602. In addition, the first or top end of the adapter 2970 has an opening therein which is adapted to receive one end of the tubing 2605a and 2605b, together with the sleeve 2610.

The bottom end of the adapter 2970 has an externally threaded portion 2951, which is adapted to removably engage with an internally threaded recess portion of the first or top end of the union 2910 shown in FIG. 29. As shown in FIG. 29, the union 2910 may have two ends, each having an internal port, each with an internally threaded portion, a conically tapered portion, and a flat-bottomed portion for receiving one end of a tube or, as shown in FIG. 29, a connector 2920. The connector 2920 shown in FIG. 29 has two ends and a fluid passageway extending therethrough along its longitudinal axis. The first or top end of the connector 2920 has a portion which is of a size and shape that is adapted to removably fit within passageway 2972 of the adapter 2970. The adapter 2970 has a neck portion 2921, which has a narrower inner diameter than the portion of the passageway 2972 below the neck portion 2921, as well as the portion of the passageway 2972 located above the neck portion 2921 as illustrated in FIG. 29. The first or top end of the connector 2920 extends through the passageway 2972 of the adapted 2970 and past the top end of the neck portion 2921. As shown in FIG. 29, the first or top end of the connector 2920 abuts against the bottom end of the tip 2615 and the inner tube 2605b to provide a removable seal, with the passageways in the inner tube 2605b and the connector 2920 aligned to allow fluid to pass therethrough when the assembly 2901 is connected as is shown in FIG. 29.

A cross-sectional view of another alternative embodiment is provided in FIG. 30. A connection assembly 3001 (shown in a connected configuration) includes a first body 3002, a second body 3003, a spring element 3020, a washer element 3025, and a bearing element 3068, each having a passageway therethrough along a longitudinal axis of the assembly 3001. Located within the passageway of each of the first body 3002, second body 3003, spring 3020, washer 3025, and bearing 3068 is tubing 3005. As shown in FIG. 30, one end of tubing 3005 extends through the passageway of the assembly 3001 and a portion of which is located in a first port at one end of a connector 3070. Also shown in FIG. 30 is a tip 3015 and a sleeve 3010, each of which surrounds a portion of the tubing 3005.

The first body 3002 has arms or tabs 3040 on either side. It will be appreciated that the arms 3040 can be rectangular, arc-shaped, or circular and extend all the way around the longitudinal axis of the body 3002, or may have such other shape as desired. The body 3002 also has inwardly radially projecting shoulders 3006 on either side. When a user presses the arms 3040 radially inwardly, the shoulders 3006 also move radially inwardly. When the shoulders 3006 move radially inwardly, they press inwardly against portions 3007 of the second body 3003. When the portions 3007 of the second body 3003 are moved inwardly towards the longitudinal axis of the assembly 3001, the projections 3077 at the second or bottom end of the second body 3003 also move radially inwardly and therefore define a narrower outer diameter proximal the second or bottom end of the second body 3003. As shown in FIG. 30, the projections 3077 in a connected configuration are located and removably held within a recess 3040 proximal a first or top end of the connector 3070. In addition, a bearing 3067 is located on the bottom side of the second body 3003 and a first or top side of the bearing 3067 abuts against the bottom end of the second body 3003.

As also shown in FIG. 30, located within the passageway of the second body 3003 and proximal a first or top end thereof is a spring element 3020. A top side of the spring 3020 abuts against an interior surface of the top end of the second body 3003, while the bottom side of the spring 3020 abuts against a first or top side of the washer 3025. The first or top side of the washer 3025 has shoulders adapted to receive and hold the bottom side of the spring 3020, while the bottom side of the washer has shoulders adapted to receive and hole a first or top end of the sleeve 3010.

The connector 3070 in FIG. 30 has at a top or first end an opening defined by radially, inward projections 3071, which define an inner diameter narrower than that of the recess 3040. As also shown in FIG. 30, the connector 3070 has a flat-bottomed port at one end which is adapted to receive and sealingly hold one end of the tubing 3005, tip 3015, and sleeve 3010. The connector 3070 further has a passageway 3075 from the flat-bottomed port to a second port, which as shown in FIG. 30, may be of a conventional type of port, with a flat bottom for receiving an end of tubing 3090 therein, a conically tapered portion for engaging with a ferrule 3091, and an internally threaded portion adapted to removably engage with an externally threaded end of a nut 3092.

Those skilled in the art will appreciate that, depending on the intended application, including without limitation the expected fluidic pressures, the nature of the fluids to be used, the nature of the samples to be analyzed, and the like, the composition of the materials used, as well as the specific shapes and sizes, of the various components and features of the fluidic connector assembly 3001 as shown and described above can be varied. For example, in applications in which biocompatibility is desired, the tubing 3005 can be made of the same or different materials, including for example [polyetheretherketone (PEEK), polyaryletherketone (PAEK), polyetherketoneketone (PEW), fluorinated ethylene propylene (FEP), ethylene tetrafluoroethylene (ETFE), polytetrafluoroethylene (PTFE), perfluoroalkoxy (PFA, also called perfluoroalkoxyethylene), polychlorotrifluoroethylene (PCTFE), polymer-sheathed fused silica (such as PEEK-Sil), fused silica, or silica borite, and can further include a filler material, which can include fibers, such as carbon fibers, glass fibers, nanofibers, and/or metallic fibers, depending on the pressures and fluids involved. It is anticipated that the assembly 2601 will be of particular usefulness in applications in which biological materials are involved. In such situations, it is often desirable for the fluid path to contain only biocompatible materials. In the embodiment shown and described, this is achieved because the tubing 3005, the tip 3015 and the port body 3070 are the only components of the assembly 3001 touching the fluid, and even then tip 3015 need not necessarily come into contact with the fluid if the sealing connection between the end of the tubing 3005 and the port body 3070 is made.

In the embodiment shown in FIG. 30, then, the spring 3020, as well as the first body 3002, the second body 3003, the bearing 3025, the washer 3068, and the sleeve 3010 can be made of metal, such as stainless steel, steel, titanium, nickel, and/or nitinol. Alternatively, the spring 3020, as well as the first body 3002, the second body 3003, the bearing 3025, the washer 3068, and the sleeve 3010 can be made of one or more non-metals, such as PEEK, PEAK, PEKK, PEI, and/or PPSU.

A user or operator can quickly and easily connect the assembly 3001. To connect the first body 3002 and second body 3003 with the connector 3070, a user can insert one end of tubing 3005 into and through the passageway through the longitudinal axis of first body 3002, second body 3003, spring 3020, washer 3025, bearing 3068, and through the sleeve 3010, and into the opening of connector 3079. The user can then pinch the two tabs 3040 extending radially inwardly towards the longitudinal axis of the body 2602, which then pushes the two shoulders 3006 towards the longitudinal axis (i.e., radially inwardly). By doing so, the user thus moves the two projections 3077 of the second body 3003 radially inwardly, and thereby decreases the outer diameter of the bottom end of the second body 3003 as defined by the two projections 3077. Once the outer diameter defined by the two projections 3077 is less than the inner diameter of the two shoulders or projections 3071 at the top end of the connector 3070, the bottom end of the second body 3003 can easily and quickly fit past the projections 3071 and into the recess at the top end of the connector 3070. Once the projections 3077 are below and past the projections 3071, the user can simply release the force on the two tabs 3040 and the projections 3077 of the second body 3003 will automatically move back radially outwardly, thereby engaging the projections 3071 and 3077 so that the bottom end of the second body 3003 and the top end of the connector 3070 are held securely and removably together. To disconnect the second body 3003 and the connector 3070 from one another, a user can simply urge the tabs 3040 radially inwardly and towards the longitudinal axis of the assembly 3001, thereby moving the projections 3077 of the second body 3003 radially inward and disengaging the projections 3077 and 3071. Once the outer diameter defined by the two projections 3077 is less than the inner diameter defined by the projections 3071 of the connector 3070, the bottom end of the second body 3003 can be pulled away and removed from the connector 3070 quickly and easily.

Those skilled in the art will appreciate that, when making a connection, a user will also need to push the first body 3002, and thereby the second body 3003, longitudinally towards the connector 3070 and along the longitudinal axis of the assembly 3001. Doing so will thereby compress the spring 3020. As the spring 3020 is compressed, it will exert a force longitudinally against the washer 3025 and thereby against the sleeve 3010, which in turn exerts a force against the tip 3015, urging it against the bottom face of the port at the top end of the connector 3070 and sealing the tubing 3005 in the port of the connector 3070 to provide a leak-free seal. It will be appreciated that the spring 3020 can be selected so that it is strong enough to continue to exert enough force on the sleeve 3010 and thereby tip 3015 as long as the assembly 3001 remains in a connected configuration, yet will be of such strength that a user will be able to compress the spring 3020 when making a connection with assembly 3001 by hand and without the need for any tools or fixtures. We believe that, with the appropriate selection of materials and spring size, a leak-free seal of capillary tubing can be obtained in a flat-bottomed port with fluid flowing through the tubing at pressures of up to 20,000 psi without any leakage or extrusion of the tubing from the assembly 3001.

Figure 31:
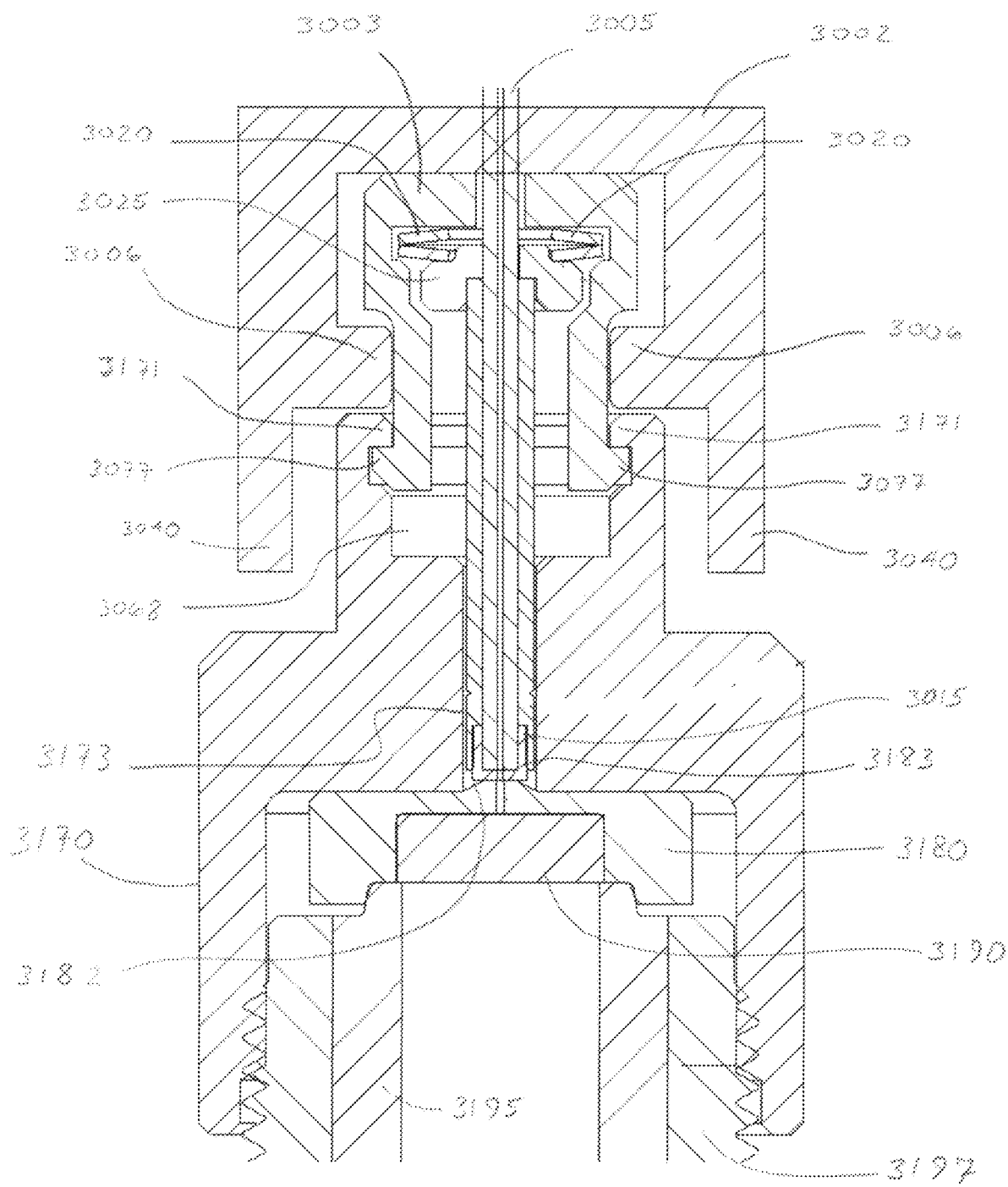
FIG. 31 is a cross-sectional view of a connection assembly and a port configuration in accordance with an embodiment in accordance with the present disclosure.

Referring now to FIG. 31, a cross-sectional view of another embodiment of a connection assembly is provided. In FIG. 31, the assembly 3101 includes a first body 3002, a second body 3003, a spring 3020, a washer 3025, tubing 3005, a tip 3015, a bearing 3068, and a sleeve 3010, each of which may be configured like that described above, and each of which has passageways therethrough. It will be appreciated that the assembly 3101 is shown in a connected configuration.

In FIG. 31, the assembly 3101 includes an adapter 3170, which can be used to connect one end of the tubing 3005 to a first end of a column 3195. The adapter 3170 has a first or top end which has radially inward projections 3171, which are adapted to removably engage with the projections 3077 of the second body 3003. As shown in FIG. 31, in a connected configuration, the inner diameter defined by the projections 3171 of the adapter 3170 is less than the outer diameter defined by the projections 3077, so the bottom end of the second body 3003 is held within the first or top end of the adapter 3170. The adapter 3170 also includes an interior recess 3173 extending along a portion of its longitudinal axis, with the recess 3173 of a shape and size and configured to receive and removably hold therein the sleeve 3010, tip 3015, and tubing 3005. The bottom end of the recess 3173 defines a flat-bottom face.

An insert 3180 can be located at the top end of the recess defined at the second or bottom end of the adapter 3170. As illustrated in FIG. 31, the insert 3180 has a first or top face and a second or bottom face. Because the top end of the insert 3180 has a standing boss 3182, the top face 3183 of the insert 3180 defines a smaller surface area than that of the port or recess 3173. The smaller surface area of face 3183 provides the same advantages as described above by concentrating the pressure load applied by a user to connect the assembly 3101 and thereby allow the assembly 3101 to operate leak-free at higher pressures.

Located in a recess on the bottom side of the insert 3180 is a filter element 3190, which can be a frit of a conventional type. As shown in FIG. 31, the outer layer 3197 of the column 3195 is secured to the bottom end of the adapter 3170 by the mating of the external threads proximal the top or first end of the outer layer 3197 and the internal threads proximal the second or bottom end of the adapter 3170.

Figure 32:
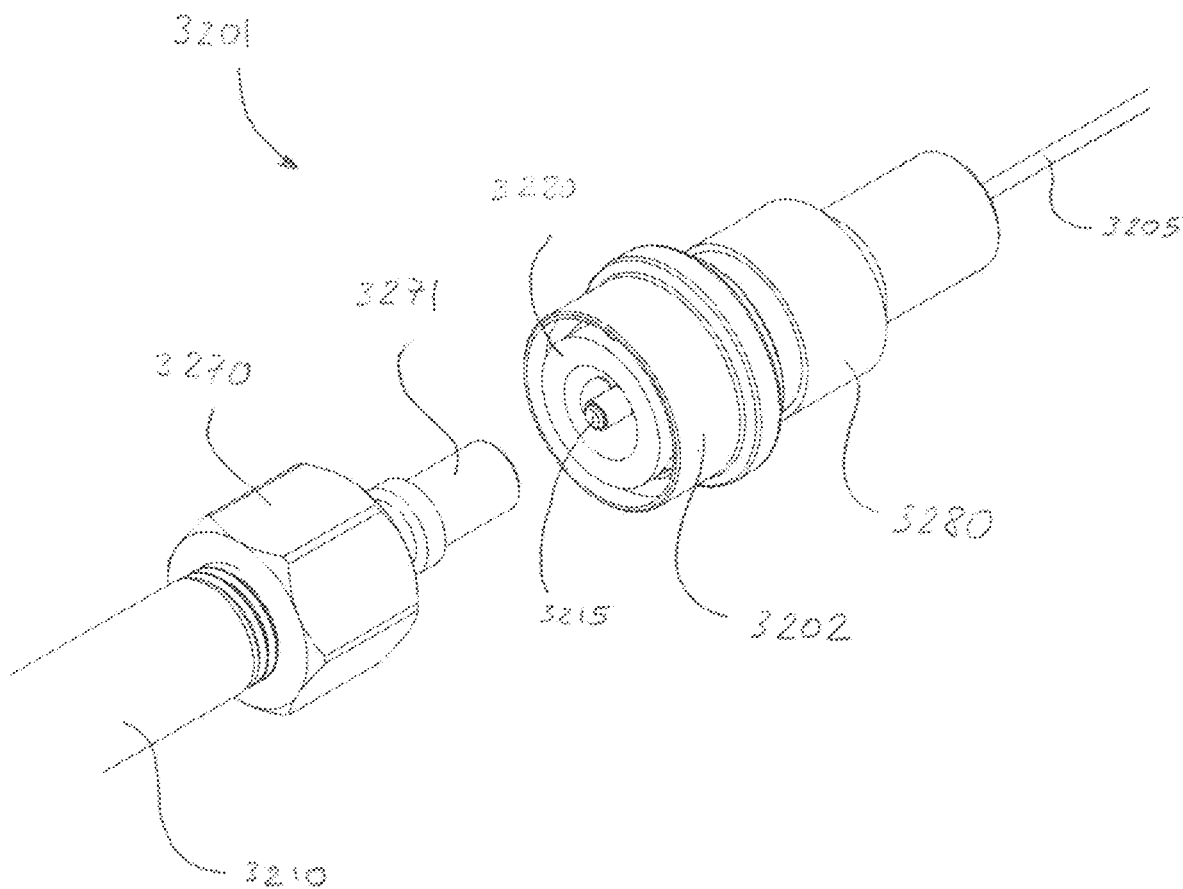
FIG. 32 is an exploded view of a connection assembly of an alternative embodiment in accordance with the present disclosure.
Figure 33:
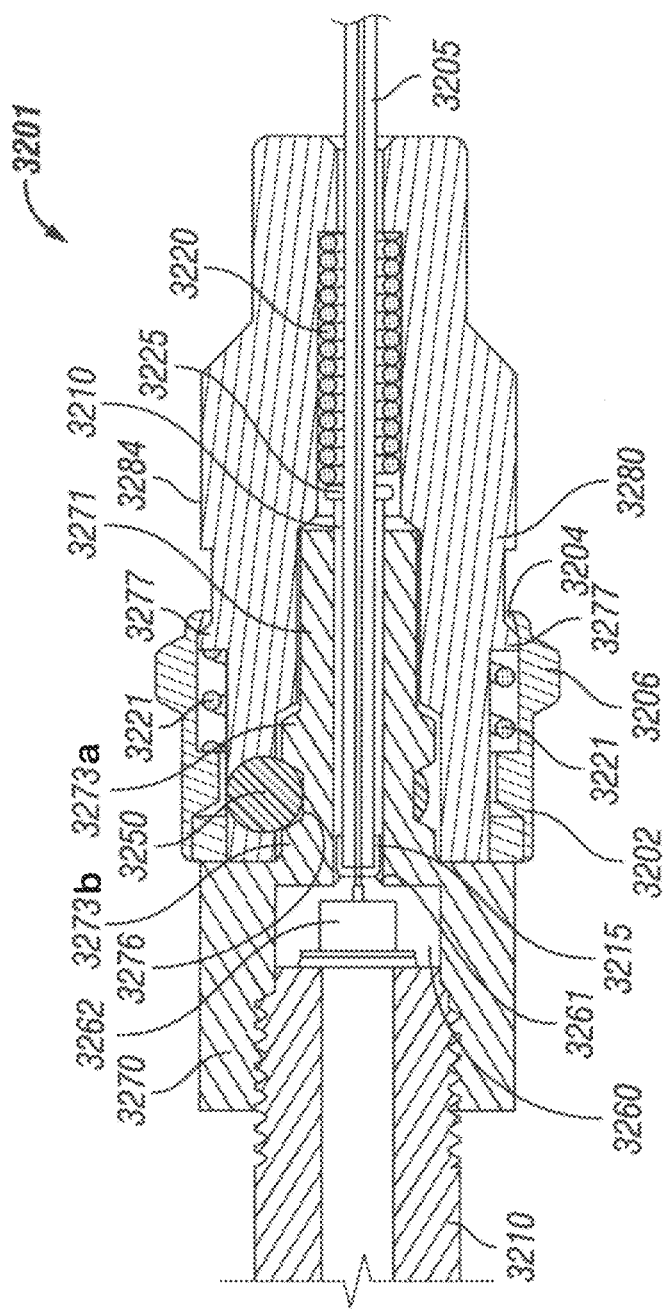
FIG. 33 is a partial cross-sectional view of the connection assembly of FIG. 32 in a connected configuration in accordance with the present disclosure.

Referring now to FIGS. 32 and 33, an alternative embodiment of a quick connect/disconnect assembly is illustrated. FIG. 32 is an exploded isometric illustration of an embodiment of an assembly in accordance with the present disclosure in a disconnected configuration, while FIG. 33 is a cross-sectional view of the assembly of FIG. 32 in a connected configuration. In FIG. 32, the assembly 3201 provides an alternative embodiment for a connection assembly which may be quickly and easily connected or disconnected by an operator or user by hand with an axial force and without any requirement for any torque forces, tools, or other equipment. The assembly 3201 includes a column 3210 which has attached by threaded engagement at one end thereof an adaptor 3270, with the adaptor 3270 having a projecting end portion 3271. Also shown in FIG. 32 is a portion of tubing 3205, which has at one end a tip 3215. A portion of the tubing 3205 extends through and along the longitudinal axis of a connector 3280. Also shown in FIG. 32 is a collar 3202, which is proximal one end of the connector 3280 and extends around an exterior portion of the connector 3280 at that end. It will be appreciated that the column 3210, adaptor 3270, connector 3280, and collar 3202 can be made of a variety of materials, including stainless steel, steel, titanium, nickel, PEEK, PEAK, PEKK, PEI, and/or PPSU.

As shown in FIG. 33, the assembly 3201 is illustrated in a cross-sectional view in a connected configuration. The adaptor 3270 has proximal one end an interior threaded portion adapted to removably engage with an exterior threaded portion proximal one end of the column 3210. As shown in FIG. 33, a fit or filter 3262 is located in a holder 3260, with one side of the holder 3260 abutting against one end of the column 3210. In addition, the holder 3260 has a tapered portion 3261 on the side opposite the column 3210, with this latter side adapted to form a sealing engagement with the tip 3215 at one end of the tubing 3205. The tapered portion 3215 can be a frusta-conical shape or any other shape that provides a reduced diameter surface at the side of the holder 3260 adapted to form a seal with the end of the tubing 3205 and/or tip 3215 (as shown in this particular embodiment of FIG. 33).

The adapter 3270 has an end portion 3271 proximal the second end of the adapter 3270, which is located in a recess located within and proximal to a first end of the connector 3280. As shown in FIG. 33, the adapter 3270 has a passageway therethrough, portions of which are adapted to receive and hold the tubing 3205, a tubing sleeve 3210, as well as the holder 3260 and the first end of the column 3270. In addition, the adapter 3270 has a reduced outer diameter portion 3276 and, on either side thereof, has shoulder (or enlarged diameter) portions 3273a and 3273b. As shown in FIG. 33, a hall 3250 is located between the shoulder portions 3273a and 3273b and rests against the exterior or the adapter 3270 at the reduced diameter portion 3276. The ball 3250 and the adapter 3270 thus form a ball detent connection to hold the collar 3202 and connector 3280 in place once the ball 3250 is located between the two shoulder portions 3273a and 3273b.

Still referring to FIG. 33, a spring 3221 is located in a gap area located between the interior surface of a portion of the collar 3202 and an exterior surface portion of the connector 3280, with one end of the spring 3221 abutting against a shoulder or radially outward projecting portion 3277 of the connector 3280. The spring 3221 serves to bias or push the connector 3280 and collar 3202 away from one another, thereby keeping the collar 3202 in place proximal one end of the connector 3280 unless and until an operator or user pushes the collar 3202 away from the column and towards the right in FIG. 33. Once an operator so pushes the collar 3202 with enough force, the collar 3202 and ball 3250 will move to the right of the shoulder 3273a, and at that point the adapter 3270 can be quickly and easily removed from the connector 3280 by simply pulling the two apart. The collar 3202 includes an enlarged diameter portion, or shoulder portion, 3206 in order to allow an operator to easily grasp or push or pull the collar 3202 in whatever direction is desired.

To connect the adapter 3270 and connector 3280 when they are not yet connected, an operator can easily and quickly move the collar 3202 away from the left end of the connector 3280 and towards the right end, thereby moving the ball 3250 up and out of the reduced diameter portion 3276, then insert the first end portion 3271 of the adapter 3270 into the recess in the end of the connector 3280. The operator can then push the collar 3202 back towards the left (in FIG. 33) and the ball 3250 will engage and be located within the shoulders 3273a and 3273b. The ball 3250 and detent configuration and the spring 3221 will hold the collar 3202 in place once an operator has made a connection. At one end of the collar 3202 are radially inwardly projecting shoulders 3204. As shown in FIG. 33, the shoulder 3204 have an interior diameter which is less than that of the shoulders 3277 of the connector 3280, and less than that of the portion 3284 of the connector 3280. The shoulders 3277 and 3284 thus prevent the collar 3202 from moving either left or right by more than a specific amount. By selecting the distance between the shoulders 3277 and 3284, and by selecting the spring 3221, a preselected biasing force can be obtained to bias the collar 3202 and the connector 3280 towards a position in which the collar 3202 is located at or near the end of the connector 3280 which abuts or is proximal the adapter 3270.

The connector 3280 shown in FIG. 33 has a second spring 3220 located therein. The spring 3220 is located in an interior passageway portion of the connector 3280, with one end held in the passageway by the end of the connector 3280, and the other end of the spring 3220 abutting one side of a washer 3225. The other side of the washer 3225 abuts the sleeve 3210. The spring 3220 thus provides an axial force biasing the washer 3225 and therefore the sleeve 3210, as well as the tubing 3205 and the tip 3215, towards and against one side of the holder 3260. As detailed above, the reduced surface area of the holder 3260 which is provided by the tapered portion 3261 allows a much greater force per unit of area to be obtained where the tip 315 abuts the holder 3261 given a particular axial load from the spring 3220. The spring 3220 can be selected so that it provides a preselected force to bias or push the tip 3215 against the holder 3261 to obtain a sealing engagement. It will be appreciated that, depending on the intended application of the connection assembly 3201, a higher or lower fluidic pressure may be used and so a higher or lower pressure may be desired to ensure that the tubing 3205 is not extruded from the assembly 3201 by the fluidic force and that there is no leakage of the fluid.

Figure 34:
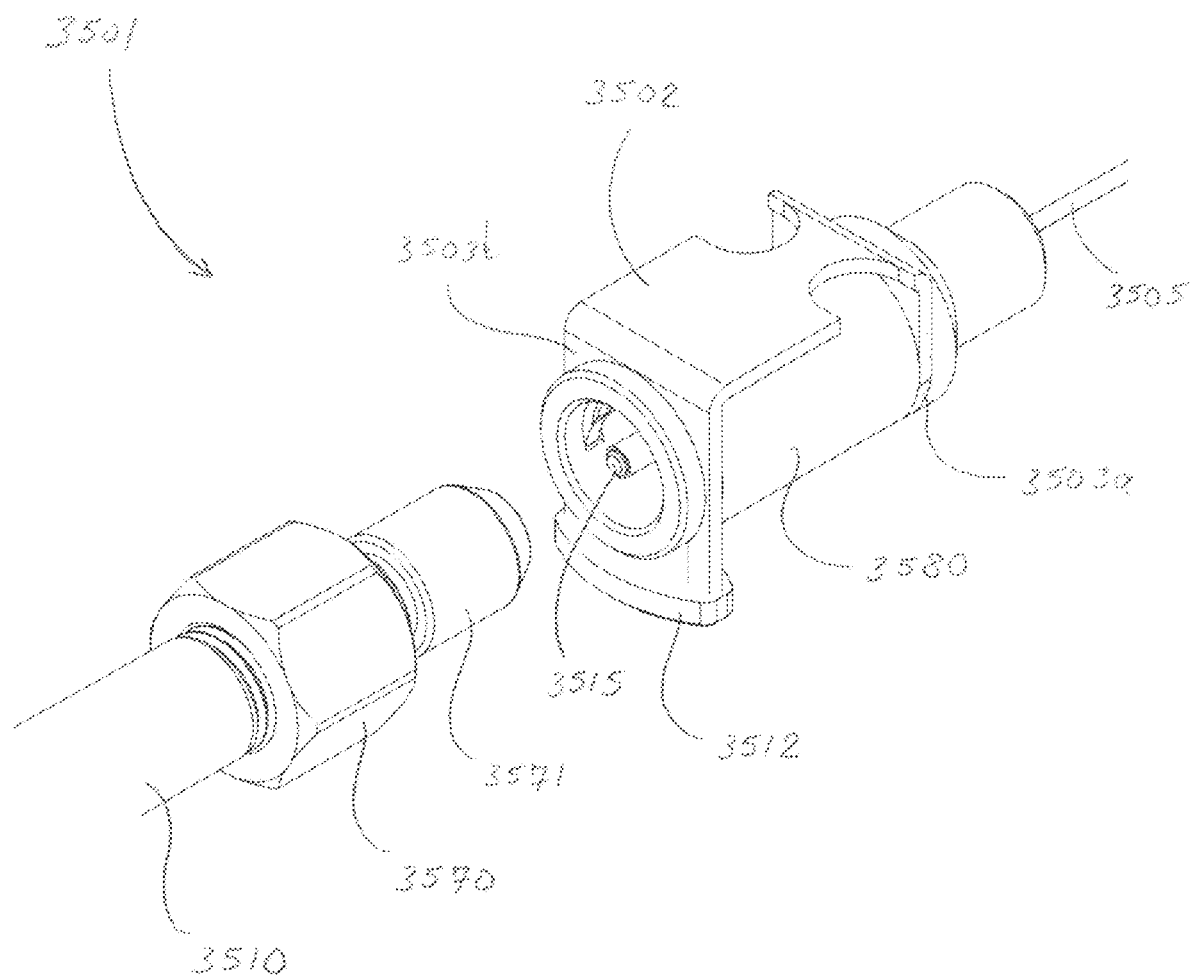
FIG. 34 is an exploded view of a connection assembly of an alternative embodiment in accordance with the present disclosure.
Figure 35:
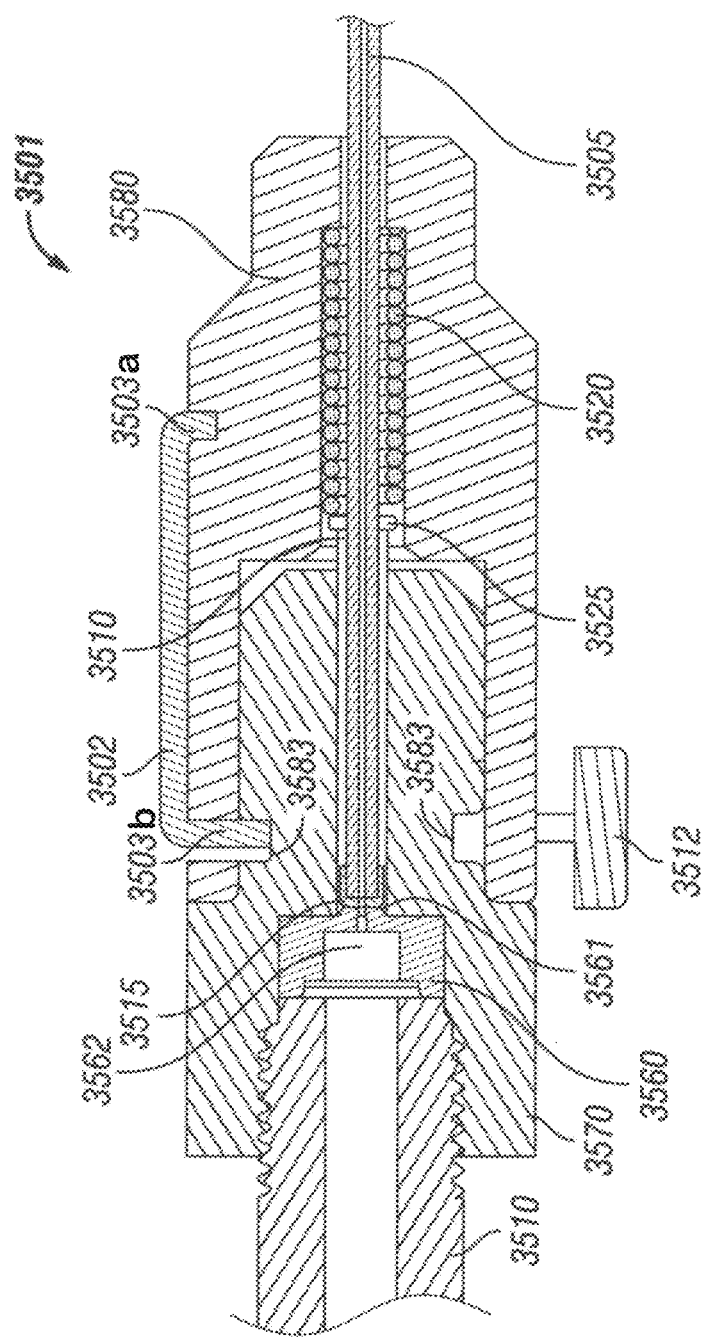
FIG. 35 is a partial cross-sectional view of the connection assembly of FIG. 33 in a connected configuration in accordance with the present disclosure.

Referring now to FIGS. 34 and 35, another embodiment of a connection assembly is provided. FIG. 34 is an exploded isometric view of the connection assembly 3501 in a disconnected configuration, while FIG. 35 is a cross-sectional view of the assembly 3501 in a connected configuration.

In FIG. 34, the assembly 3501 includes a column 3510, an adapter 3570, a collar 3502, a connector 3580, and tubing 3505. As shown in FIG. 34, one end of the tubing has a tip 3515. In addition, the collar 3502 has a first or front portion 3503b and a second or rear portion 3503a. In this particular embodiment, the first portion 3503b has on one side thereof a button portion 3512. It will be appreciated that column 3510, adapter 3570, collar 3502, connector 3580, and tubing 3505 can comprise biocompatible materials, such as PEEK or PEAK, PEKK, PEI, and/or PPSU, or can comprise other materials, such as stainless steel, nickel, steel, and/or titanium. As with the other embodiments described herein, the various items and features described and shown may comprise various materials which may be selected depending on the application to which the assembly 3501 is intended for, such as applications involving different pressures and/or different fluids of various pH levels, corrosivity, and the like.

Referring now to FIG. 35, the assembly 3501 is shown in a connected configuration in a cross-sectional view. As those skilled in the art will appreciate, the column 3510, frit or filter 3562, and holder 3560 with a tapered side 3561 may be like those shown and described elsewhere in this disclosure. As shown in FIG. 35, the adapter 3570 has at one end an internally threaded portion with threads adapted to engage with an externally threaded portion of one end of the column 3510. A first end of the connector 3580 abuts against portions of the adapter 3570. The connector 3580 includes a button portion 3512 on one side thereof, which is connected to a latching portion 3503b. The first latching portion 3503b is located within a recess on an exterior portion of the connector 3580 and also within a groove 3583 in an exterior portion of the adapter 3570. In addition, the connection has a second latching portion 3503a, which is located within a second groove in the exterior of the connector 3580.

To disconnect the assembly 3501 from the connected configuration shown in FIG. 35, an operator can push on the button portion 3512, thereby pushing the first latching portion 3503b out of the grooves 3583 of the adapter 3570, at which point the adapter 3570 and connector 3580 can be pulled apart from one another. From a disconnected configuration, the operator can connect the assembly 3501 by pushing the button portion 3512 radially inward and then inserting the adapter into the recess at one end of the connector 3580, then releasing the button 3512 and allowing the first latching portion 3503b to return to its location within the groove 3583 of the adapter 3570, thereby retaining the adapter 3570 and the connector 3580 in a connected configuration.

As also shown in FIG. 35, the connector 3580 has a passageway therethrough which is adapted to receive and hold the tubing 3505, as well as a spring 3520 proximal one end of the connector 3580. The spring 3520 provides an axial loading force which biases the washer 3525 and therefore the sleeve 3510 and tubing 3505, as well as the tip 3515, towards the holder 3560. The spring 3520 may be selected to provide a preselected force adapted to be sufficient to force the tip 3515 against one side of the holder 3560 as shown in FIG. 35 to provide a sealing engagement which does not leak and which will be sufficient to prevent the tubing 3505 from being forced out of a sealing engagement due to the intended pressures for the fluid flowing through the tubing 3505. The holder 3560 has a tapered or frusto-conical portion 3561 to provide a reduced surface area against which the tip 3515 provides a sealing engagement. This allows the assembly 3501 to handle a greater fluid pressure without requiring an operator to significantly add a greater axial force to obtain a sealing engagement. As noted above, the tubing 3505, holder 3560, tip 3515, filter 3562, and/or the column 3510 may comprise biocompatible materials for applications in which biocompatibility is desired. In addition, these items may comprise materials selected for a particular intended application, such as those involving higher or lower pressures, or involving high or low pH levels, or those involving particular fluids, such as may be corrosive.

Those skilled in the art will appreciate that the embodiments shown and described in the present disclosure can be used in a variety of different configurations. For example, although the embodiments shown and described above have referred to use with flat-bottomed ports, those skilled in the art will appreciate that the assembly in its various embodiments of this disclosure can also be used in coned ports or other types of connections. In addition, various types of tubing and fitting assembly configurations may be used in addition to those shown and described, including without limitation those face-sealing assemblies shown and described in co-pending U.S. patent application Ser. No. 14/922,041 filed on Oct. 23, 2015, and titled "Face-Sealing Fluidic Connection System," which was published as U.S. published patent application US 2016/0116088 A1 on Apr. 28, 2016, and is hereby incorporated by reference as fully set forth herein.

Figure 36:
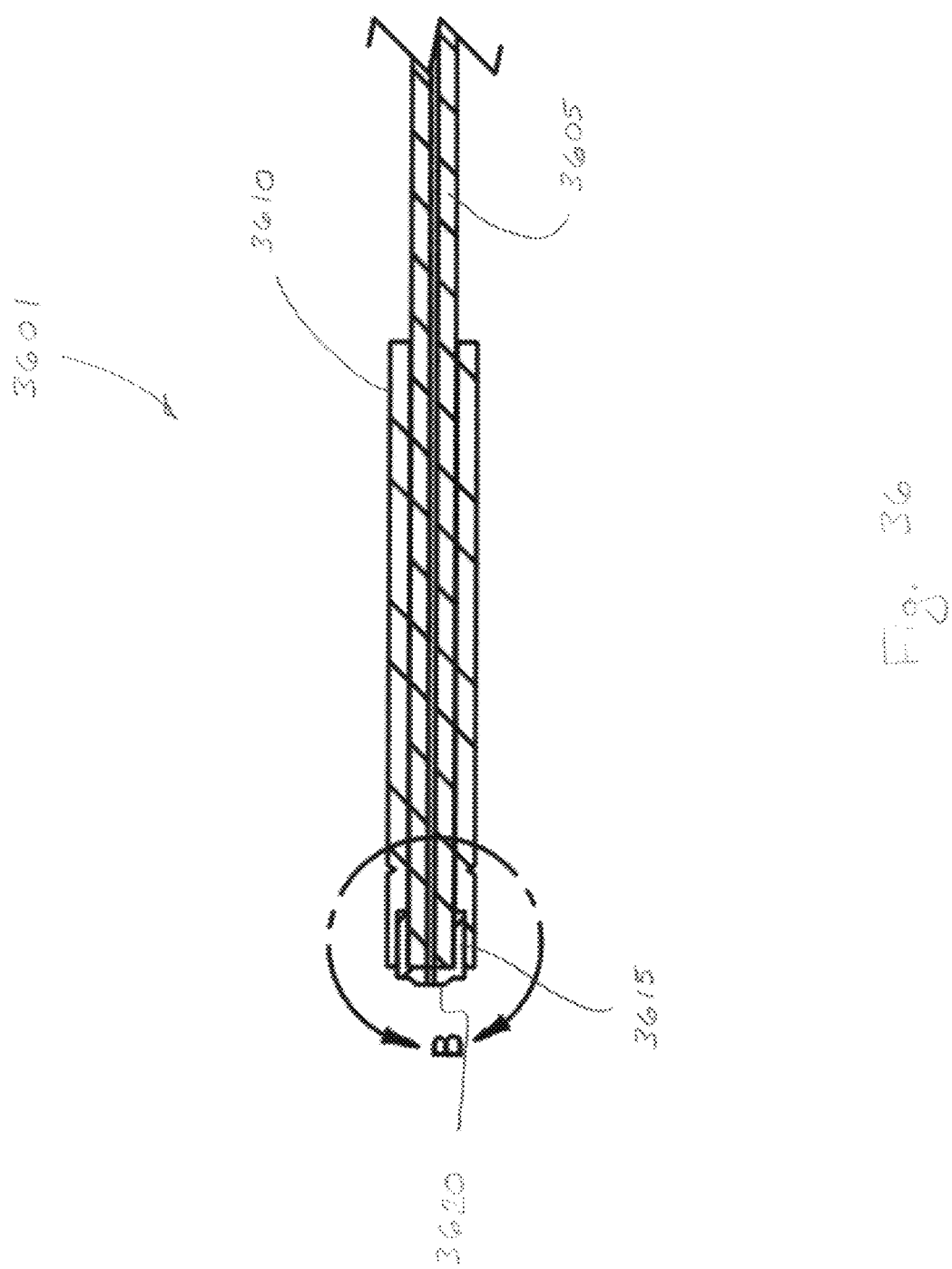
FIG. 36 is a partial cross-sectional view of a tubing assembly in accordance with one embodiment of the present disclosure.

In addition to the tubing assemblies shown and described in US Published Patent Application No. 2016/0116088 A1, other types of tubing assemblies may be used in accordance with various embodiments of the present disclosure. Turning to FIG. 36, for example, a tubing assembly 3601 is shown in a partial cross section. The assembly 3601 includes a tube 3605, a sleeve 3610, and a tip 3615. It can be seen from FIG. 36 that the tip 3615 has a first end with a reduced surface area 3620. The reduced surface area 3620 extends outward and defines a first end of the tip 3615, so that when the tubing assembly 3601 is inserted into a port or other connection assembly member to form a sealing connection, the reduced surface area 3620 is the portion of the tip 3615 which abuts the bottom of a port. By having reduced surface area 3620 in sealing engagement, the stresses are concentrated in a smaller area (i.e., the reduced surface area 3620 instead of over an area defined by the outer diameter of the tip 3615), thus allowing for a sealing connection which can withstand higher pressures of fluid flow through the tubing assembly 3601.

The tube 3605 can be any one of a number of materials. In one particular embodiment, tube 3604 may be a capillary tube. Similarly, sleeve 3610 can be comprised of various materials. Tip 3615 also can be made of various materials. The tubing 3605, tip 3615, and sleeve 3610 may comprise any one or more of the following materials, and need not comprise the same material as each other. Tubing 3605, sleeve 3610, and tip 3615 may comprise any one or more of materials, which may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other materials, such a fused silica, silica borite, PEEKsil, and the like.

Figure 37:
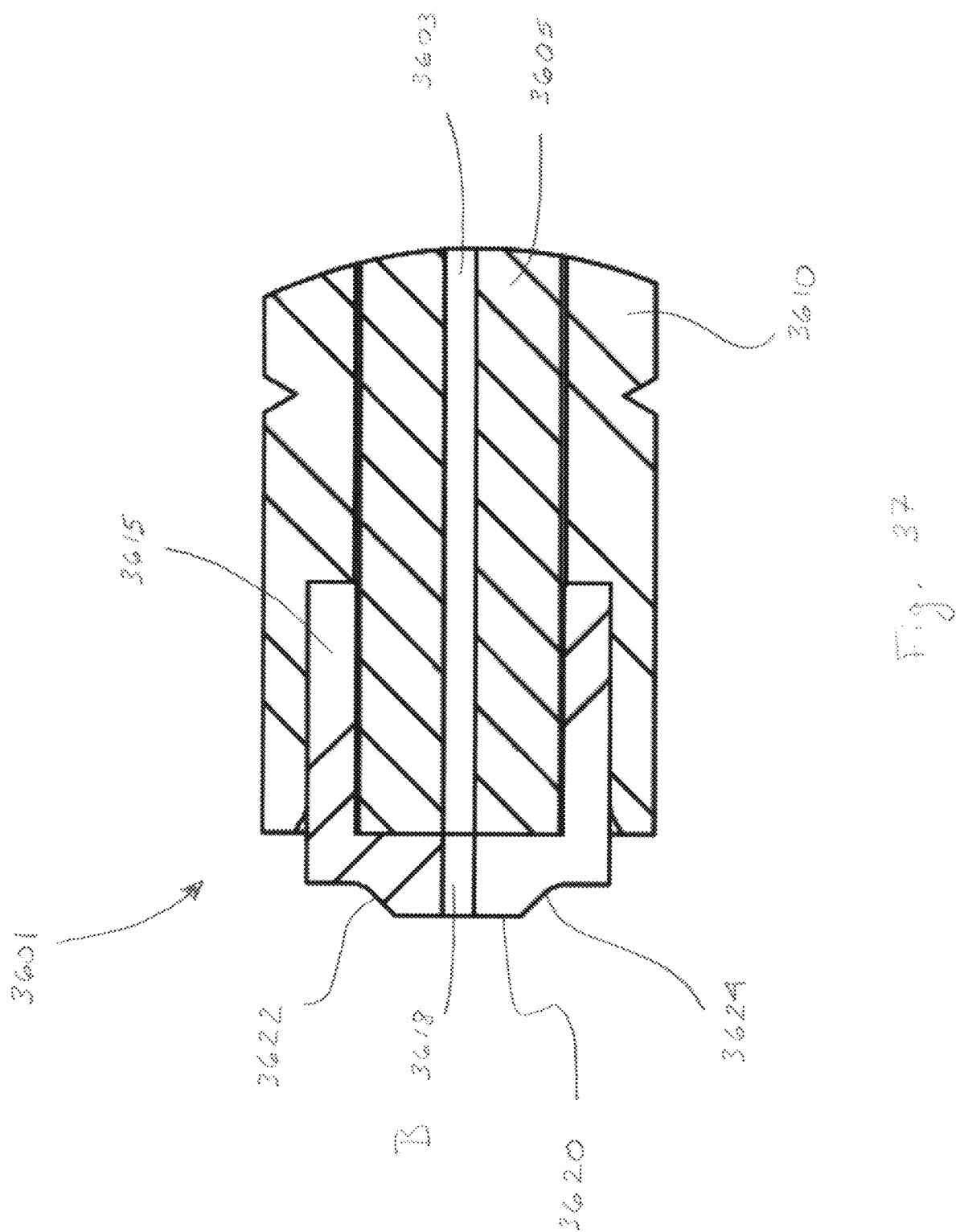
FIG. 37 is an enlarged partial cross-sectional view of the tubing assembly of FIG. 36.

Referring now to FIG. 37, further details of the end of the tubing assembly 3601 can be seen. As shown in FIG. 37, one end of the tubing assembly 3601 may include an end of a capillary tube 3605 which has a passageway 3603 extending therethrough for fluid flow. The end of the tube 3605 fits within a seating portion of the tip 3615. As shown in FIG. 37, tip 3615 has one end which covers and surrounds the outer surface of a portion of the tube 3605. In addition, the tip 3615 has a second end which has a reduced surface area portion 3620, and the second end of the tip 3615 is located between the end face of the tube 3605 and a port bottom surface (not shown in FIG. 37), As also shown in FIG. 37, the reduced surface area portion 3620 of the tip 3615 has a smaller diameter than the outer diameter of the tip 3615, and extends outwardly from the shoulder portions 3622 and 3624 of the tip 3615. Tip 3615 also has a passageway 3618 extending therethrough, which is preferably aligned with the fluid passageway 3603 of the tube 3605.

Referring now to FIGS. 38A, 38B, and 38C, additional views of the tip 3615 are provided. FIG. 38B is a side view of the tip 3615, with the reduced surface area or boss 3620 shown on the left side. FIG. 38A provides a top view of the tip 3615, and also shows the boss 3620 and the fluid pathway 3618. FIG. 38C is a sectional view of the tip 3615 taken along line A-A of FIG. 38A, and shows the reduced surface area 3620, the shoulder portion 3622 (which is shown as curved in FIG. 38C, but could be angled or even be provided with a right angle if desired), In addition, FIG. 38C shows the passageway 3618 through the end of the tip 3615 and also the hollow seating portion 3628, which is adapted to receive the end of a tube therein, such as is shown in FIG. 37.

Figure 41:
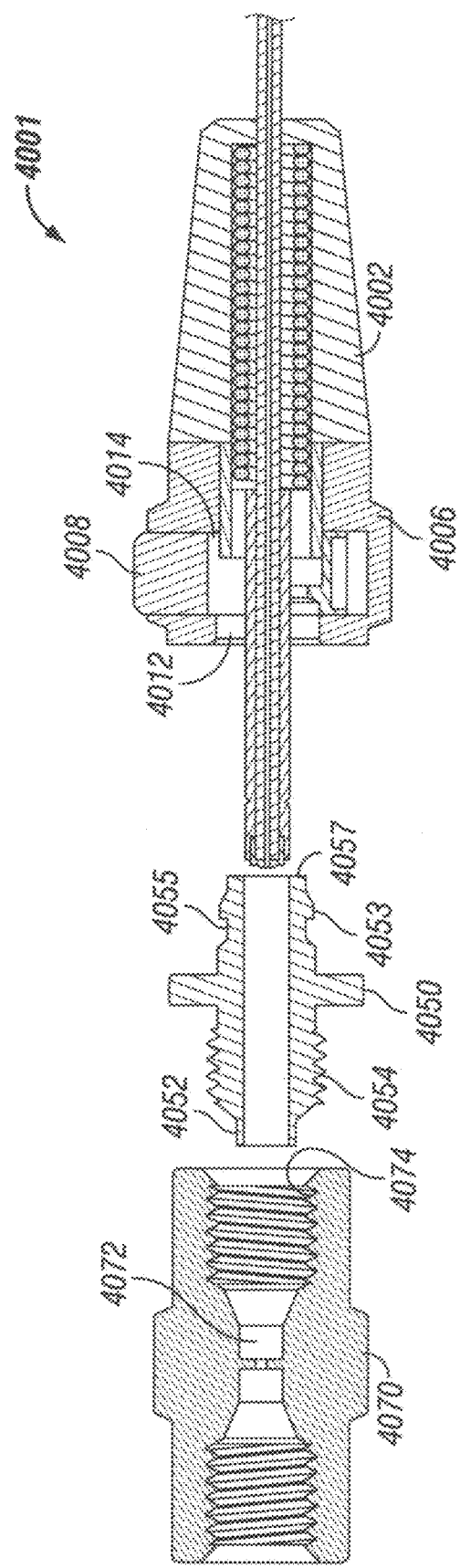
FIG. 41 is a view of the assembly of FIGS. 39 and 40 shown in an exploded cross-sectional view with an adapter and a union in an embodiment of the present disclosure.

Referring now to FIGS. 39-41, an alternative embodiment of a quick connect/disconnect assembly 4001 in accordance with the present disclosure is shown, together an embodiment of the quick connect/disconnect assembly 4001 with an adapter 4050 and a union 4070 to form a further assembly. In FIG. 39, the assembly 4001 is shown in a cross-sectional view in an assembled state. The assembly 4001 includes a body 4002, tubing 4005, a spring 4020, a cap 4006, and a latch 4008. As shown in FIG. 39, the tubing 5 extends through each of the body 4002, tubing 4005, spring 4020, cap 4006, and latch 4008, and extends from an opening on the left side of the assembly 4001. At one of end of the tubing 4005, a tip 4015 is provided. As also shown in FIG. 39, a portion of the tip 4015 and the tubing 4005 are enclosed by a sleeve 4010. In addition, it can be seen that the spring 4020 is located within a hollow portion of the body 4002, and one end of the spring 4020 abuts an interior surface of one end of the body 4002. In addition, a second end of the body 4002 extends into an opening in the first end of the cap 4006 and into an opening in one end of the latch 4008.

In FIG. 40, an exploded cross-sectional view of the assembly 4001 is provided. For convenience of the reader, like numerals are used in FIGS. 39-41 for like features. As shown in FIG. 40, the body 4002 is generally hollow, with one end having an opening therethrough for the tubing 4005 and the other end having an opening adapted to receive the spring 4020. The hollow portion of the body 4002 is adapted to receive and hold all or a portion of the spring 4020. As shown in FIGS. 39-41, the spring 4020 is a coiled spring, and can be made of a suitable metal. Those skilled in the art will appreciate, however, especially from the foregoing disclosure, that the spring 4020 may be any one of the various types of springs described above and made be made of any of the potential materials noted earlier with respect to the springs described above.

A washer 4025 is also shown in FIG. 40. The washer 4025 abuts against one end of the spring 4020, while the other end of the spring 4020 abuts an interior surface of one end of the body 4002. The relationship of the tube 4005, sleeve 4010, and tip 4015 can be as described above for such an assembly, and the tube 4005, sleeve 4010, and tip 4015 can be of any of the shapes and made of any of the materials noted above with respect to the earlier description thereof.

The cap 4006 shown in FIG. 40 has opposing openings 4012a and 4012b at opposing ends thereof. In addition, the cap 4006 has an opening 4012c which extends into a hollow interior portion adapted to receive and hold the latch 4008. In addition, the cap 4006 has a pocket 4012d which is open to the hollow interior portion 4012c. The pocket 4012d is adapted to receive and hold a second spring 4007. As shown in FIG. 40, the spring 4007 is a coiled tapered spring. Those skilled in the art will appreciate, however, that the spring 4007 may be any one of the types of springs described earlier in this disclosure.

Still referring to FIG. 40, the latch 4008 is shown. The latch 4008 has a central passageway therethrough that is adapted to allow the tubing 4005, sleeve 4010, and tip 4015 combination (or just one or more components thereof) to fit through the latch 4008. In addition, the latch 4008 includes a radially inwardly extending projection 4008a. The radially inwardly projection 4008a is adapted to cooperate with one end of an adapter 4050 like that shown in FIG. 41.

In FIG. 41, the assembly 4001 is shown with the tubing 4005 extending therethrough. In addition, an adapter 4050 and a union 4070 are shown. The adapter 4050 has a first end 4057 and a second end 4052. The first end 4057 is adapted to fit into and be held securely by the openings 4012 in cap 4006 and the interior portion 4014 of the latch 4008. As shown in FIG. 41, the first end 4057 has radially outward projections 4053, as well as an annular notch or ring 4055 with a smaller outside diameter than the annular projection 4057. In addition, the projection 4057 has a ramped portion facing towards the opening 4012. The ramped portion is adapted to cooperate with a ramped portion of the projection 4008a of the latch 4008. The ramped portions are adapted so that no tools or excessive force is required to insert the first end 4057 of the adapter 4050 into the opening 4012 and engage the ramped portions so that the projection 4008a fits into at least a portion of the annular notch 4055 and thereby securely holds the adapter 4050 and the cap 4006 (and thereby the assembly 4001) together. In addition, the adapter 4050 includes a second annular flange which extends radially outwardly in a central portion of the adapter 4050. Near the second end 4052 of the adapter 4050 are external threads 4054.

As shown in FIG. 41, the external threaded portion 4054 of the adapter 4050 is adapted to removably engage with the internally threaded portion 4074 of a first end of the union 4070. The first end of the union 4070 further has a flat-bottomed port 4072 for sealing engagement with the tip 4015 when the tip 4015 is pressed against the bottom of the port 4072. Those skilled in the art will appreciate that, although a union 4070 is shown in FIG. 41, any one of a number of different components of an analytical instrument system may comprise a port that may be connected as described to the assembly 4001 and adapter 405 instead of the union 4070. For example, other components which might have ports sealingly connected to the assembly 4001 and adapter 4050 instead of the union 4070 include at least the following: a column, or may be a port which is part of a manifold, a pump, a valve, a column, a filter, a guard column, a detector, a pressure regulator, a reservoir, a degasser, a debubbler, a union, a tee, a cross, a splitter, a sample loop, a connector, or another component in an AI instrument or system. The means for exerting an axial force may comprises a spring, including without limitation a coiled spring.

The fluidic connection assembly 4001, as well as adapter 4050 and union 4070, in accordance with the present disclosure may comprise any one or more of various materials, which may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other materials, such a fused silica, silica borite, PEEKsil, and the like. The tubing 4005, tip 4015, and sleeve in the assembly 4001 similarly may comprise any one or more of the foregoing materials. In addition, those skilled in the art will appreciate that the various constituent components of the assembly 4001, and/or adapter 4050 and/or union 4070, may comprise the same or may comprise different materials. For example, assembly 4001 in one particular embodiment may have a body 4002 which comprises PEEK, a cap 4006 which comprises PEEK, and a latch 4008 which comprises PEEK, while springs 4020 and 4007 comprise a metal such as stainless steel, and such an assembly 4001 can be used with an adapter 4050 made of metal such as stainless steel, and a union 4070 which comprise a metal or PEEK. Those skilled in the art will further appreciate that, for those components made of polymeric materials, the polymeric material may include fibers, including carbon fibers, metallic fibers, and the like. It will be further appreciated that, even if an adapter 4050 comprises metal, the overall fluidic connection made with assembly 4001 can still be biocompatible, as long as the tubing tip 4015 of the tubing 4005 extending through the assembly 4001, the adapter 4050, and in sealing engagement with the bottom of the port 4072 of the union 4070, as well as the union 4070, comprise biocompatible materials.

Those skilled in the art will also appreciate that the material and size of spring members 4020 and 4007 can be selected so that the spring members 4020 and 4007 provide the desired amount of force, or biasing, when engaged (as described in more detail above) in a fluidic connection in a desired application. For example, one of skill would appreciate that it would be advantageous to have the spring member 4020 and spring 4007 provide a greater biasing force when the assembly 4001 will be used in an application with a greater fluidic pressure, than might be the case if the assembly 4001 is to be used in an application with a relatively small fluidic pressure. For example, not all fluidic connections in a given AI system used for a given application need operate under the same fluid pressure. The fluid pressures may change even in such situations for different connections in the AI system.

Methods of making a fluidic connection or disconnecting tubing from a port or component with respect to the assembly 4001 as shown in FIGS. 39-41 are now summarized. In making a connection, an operator or user may perform the steps of providing a tube 4005 having first and second ends, wherein the second end may comprise a compressible tip, inserting one end of the tube through a body 4002, wherein said body 4002 comprises a first end and a second end, said body 4002 further having a passageway therethrough adapted to receive a tube 4005 extending through said body, and wherein an interior portion proximal the second end of said body is adapted to cooperate with a spring 4020 for exerting a force against a washer or disc 4025 which in turn exerts a force against a sleeve 4010 which surrounds a portion of the tube 4005, thus biasing the end of the tube 4005 in a longitudinal direction away from the body 4002. In addition, the operator or user may insert a portion of a latch 4008 into a portion of a cap 4006 adapted to receive the latch 4008 portion. A spring 4007 may also be inserted into a recess in the cap 4006, with the spring 4007 adapted to urge the latch upward and radially outwardly. The user or operator alternatively may simply obtain a tube 4005 and place one end through the interior passageway of the assembly 4001 once assembled. In either case, an adapter 4050 can be provided and the user or operator can insert one end of the tube 4005 into the passageway through the adapter 4050, and insert one end 4057 of the adapter 4050 into the opening 4012 of the cap and the interior portions of latch 4008. As noted, the annular projection or flange 4053 of the adapter has ramped portions adapted to engage with the ramped portions of the latch 4008a to allow the user or operator to compress the spring 4020 more easily and have the latch 4008 securely engage with and hold the adapter 4050 in place. An operator or user can then insert the threaded end of the adapter 4050 into a port or other component such as any of the types described above, and then engage the threaded portion of the port or component (such as the union 4070) to obtain a secure and sealed fluidic connection. To disconnect the assembly 4001 from the port or component, a user may turn the assembly 4001 and/or the port or other component (such as union 4070) in the opposite direction to disengage the threaded portions from one another, then remove the adapter 4050 and assembly 4001 and the tube 4005 from the port or other component.

The spring 4020 may be selected to provide a preselected force or range of force adapted to be sufficient to force the tip 4015 against the bottom face of the port or component to provide a sealing engagement which does not leak and which will be sufficient to prevent the tubing 4005 from being forced out of a sealing engagement due to the intended pressures for the fluid flowing through the tubing 4005. It will also be appreciated that the spring 4020 may be selected so that the force required to compress the spring, such as by inserting one end of the adapter 4050 into the cap 4006 and latch 4008 and securely engage the adapter 4050 with the assembly 4001, is relatively limited and does not require any tools or equipment, but can be done by an operator or user by hand. Moreover, it will be appreciated that the adapter 4050 and assembly 4001 connection, once made, may be permanent or may be a removable connection, especially if the intended use of the assembly 4001 is for lower pressure applications and therefore the force required to keep the assembly 4001 and adapter 4050 secured together is not as great. In such situations, the second spring 4007 can be selected to provide a relatively lower force against the bottom of the latch 4008.

Those skilled in the art will also appreciate that the embodiments shown and described in the present disclosure can be used in a variety of different configurations. For example, although the embodiments shown and described above have referred to use with flat-bottomed ports; those skilled in the art will appreciate that the assembly in its various embodiments of this disclosure can also be used in coned ports or other types of connections, including those described above. In addition, various types of tubing and fitting assembly configurations may be used in addition to those shown and described, including without limitation those face-sealing assemblies shown and described in co-pending U.S. patent application Ser. No. 14/922,041 filed on Oct. 23, 2015, and titled "Face-Sealing Fluidic Connection System," which was published as U.S. published patent application US 2016/0116088 A1 on Apr. 28, 2016, and is hereby incorporated by reference as fully set forth herein.

Figure 38:
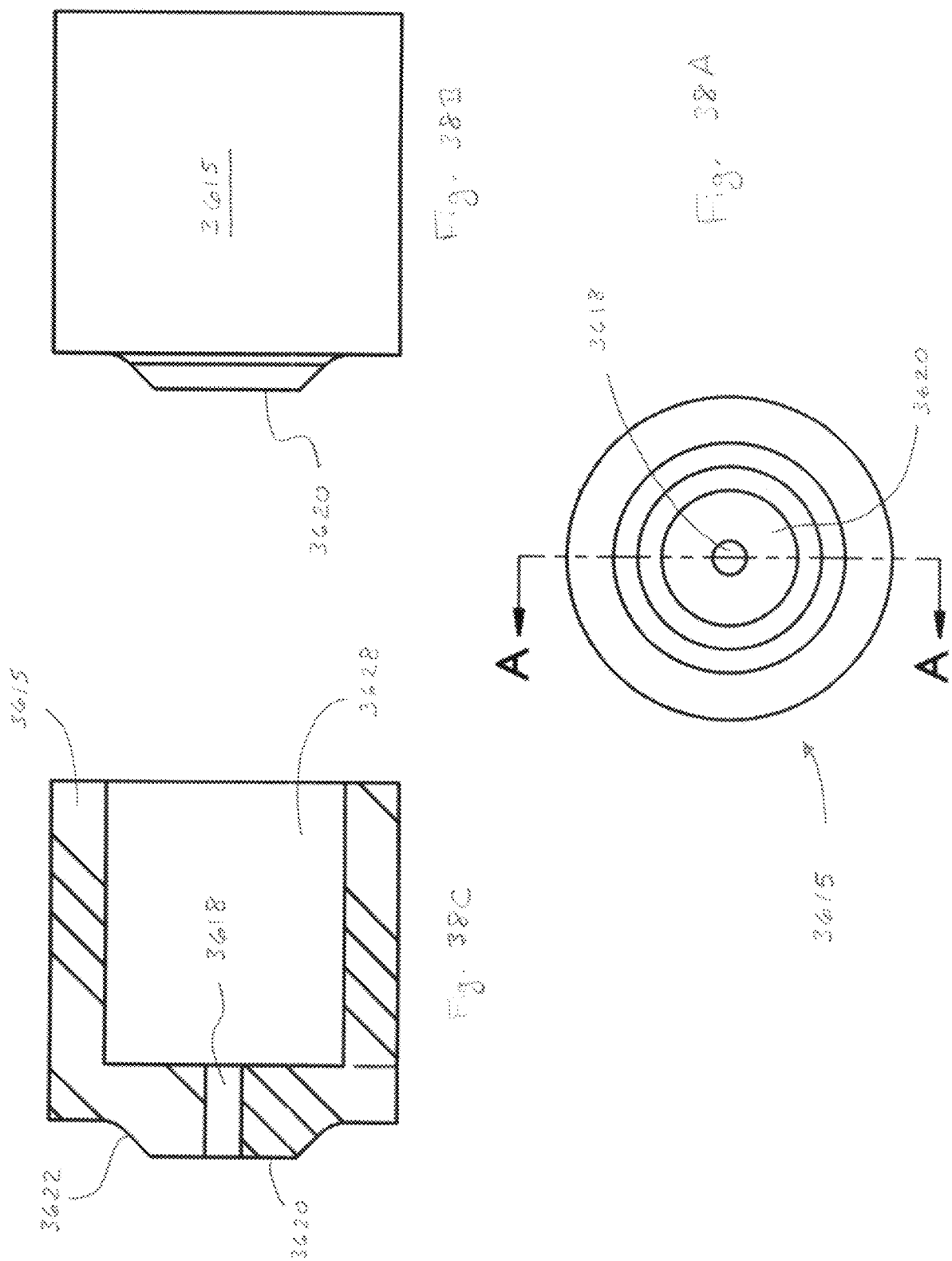
FIG. 38A is a frontal view of a tip of the tubing assembly of FIGS. 36 and 37.
FIG. 38B is a side view of a tip of the tubing assembly of FIGS. 36 and 37.
FIG. 38C is a cross-sectional view of the tip of the tubing assembly of FIGS. 36 and 37.

In addition to the tubing assemblies shown and described in US Published Patent Application No. 2016/0116088 A1, other types of tubing assemblies may be used in accordance with various embodiments of the present disclosure, such as those illustrated in FIGS. 36-38 and described above, for example. The tube 4005 can be any one of a number of materials. In one particular embodiment, tube 4005 may be a capillary tube. Similarly, sleeve 4010 can be comprised of various materials. Tip 4015 also can be made of various materials. The tubing 4005, tip 4015, and sleeve 4010 may comprise any one or more of the following materials, and need not comprise the same material as each other, and such materials may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other materials, such a fused silica, silica barite, PEEKsil, and the like.

We believe that the assembly 4001 can be used to achieve leak-free, sealing connections without any extrusion of tubing 4005 from a port (such as port 4072) when fluid is flowing through the tubing 4005 at pressures of up to at least 20,000 psi, including for biocompatible applications.

Figure 42:
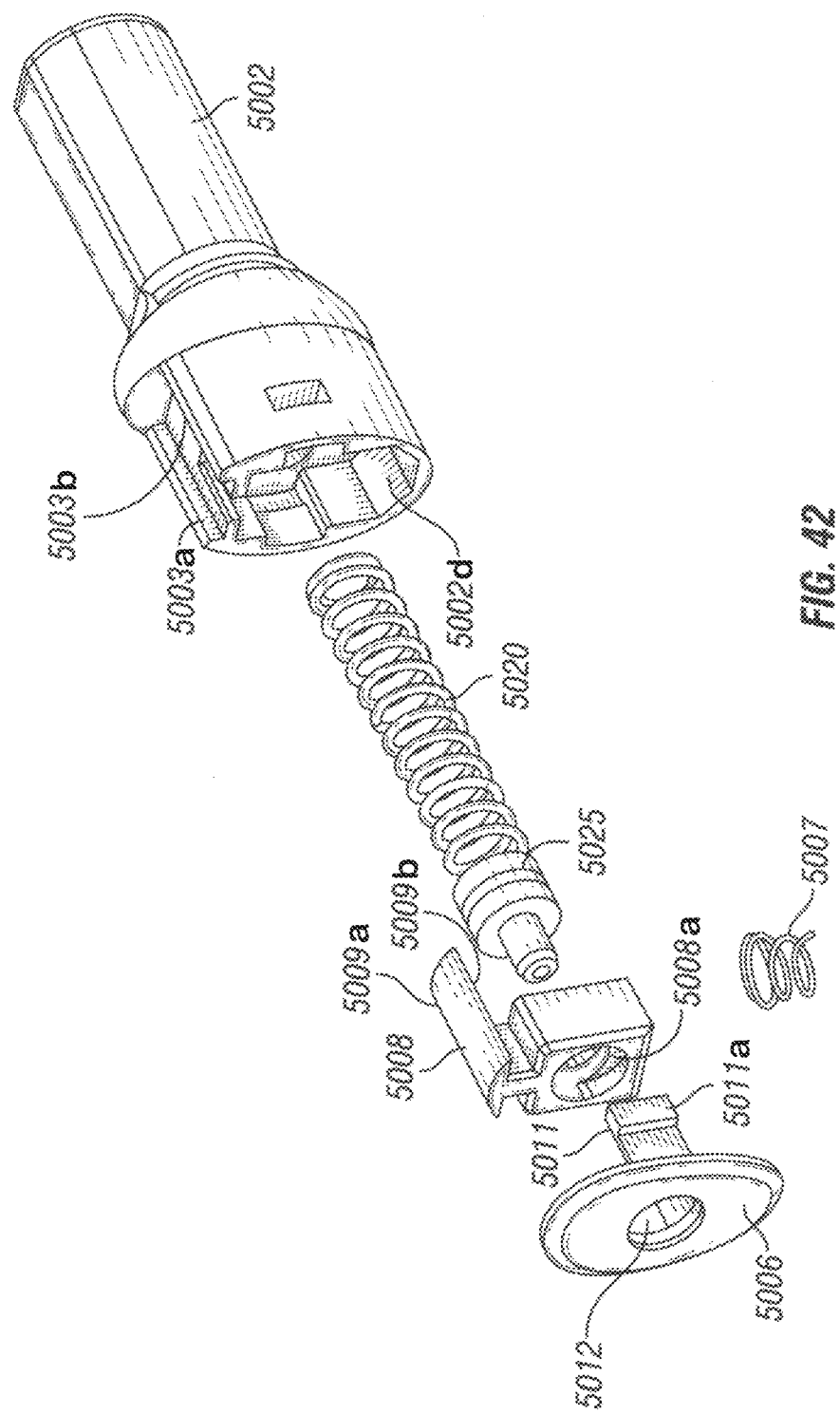
FIG. 42 is an exploded view of a fluidic connection assembly of one particular embodiment in accordance with the present disclosure.

Referring now to FIGS. 42-46, an alternative embodiment of the quick connect/disconnect assembly 5001 in accordance with the present disclosure is shown, together with an embodiment of the quick connect/disconnect assembly 5001 with an adapter 5050 to form the further assembly 5001a. For convenience of the reader, like numerals are used in FIGS. 42-46 for like features. In FIG. 42, the assembly 5001 is shown in an exploded three-dimensional view. The assembly 5001 includes a body 5002, a spring 5020, a cap 5006, and a latch 5008. Although not shown in FIG. 42, those skilled in the art will appreciate that tubing (not shown in FIG. 42) can extend through each of the body 5002, spring 5020, cap 5006, and latch 5008, and can extend from an opening on the left side of the assembly 5001, as well as the right side of the assembly 5001.

The body 5002 is generally hollow, with one end (the right hand side as shown in the orientation of FIG. 42) having an opening therethrough adapted to receive tubing (not shown in FIG. 42) and the other end (the left hand side in the orientation shown in FIG. 42) having an opening adapted to receive the spring 5020. The hollow portion of the body 5002 is adapted to receive and hold all or a portion of the spring 5020. As shown in FIG. 42, the spring 5020 is a coiled spring, and can be made of any suitable metal. Those skilled in the art will appreciate, however, especially from the foregoing disclosure, that the spring 5020 may be any one of the various types of springs described above and made be made of any of the potential materials noted earlier with respect to the springs described above. In addition, the body 5002 has a pocket 5002d which is open to the body's hollow interior portion. The pocket 5002d is adapted to receive and hold the second spring 5007. As shown in FIG. 42, the spring 5007 is a coiled tapered spring. Those skilled in the art will appreciate, however, that the spring 5007 may be any one of the types of springs described earlier in this disclosure.

A washer 5025 is also shown in FIG. 42. The washer 5025 abuts against one end of the spring 5020, while the other end of the spring 5020 abuts an interior surface of one end of the body 5002. The cap 5006 shown in FIG. 42 has an opening 5012. In addition, the cap 5006 has an extension 5011 on one side thereof, and the extension 5011 has a latching or holding member 5011a, which projects radially inward towards the longitudinal axis of the assembly 5001.

Still referring to FIG. 42, the latch 5008 is shown. The latch 5008 has a central passageway therethrough. In addition, the latch 5008 includes a radially inwardly extending projection 5008a, The radially inwardly extending projection 5008a is adapted to cooperate with one end of an adapter 5050 like that shown in FIG. 43, as explained in more detail below. The latch 5008 on its top portion in the orientation shown in FIG. 42 further has opposing projections 5009a and 5009b. As shown in FIG. 42, the top of the latch 5008 is angled or arcuate, so that the thickness of the latch 5008 at the outer sides of projections 5009a and 5009b is relatively thinner than towards the center of the top of the latch 5008. It will be appreciated that the top of the latch 5008, including projections 5009a and 5009b, is sized and adapted to slide into (and out of, if desired) the corresponding top right portion of the body 5002. The body 5002 further includes recesses 5003a and 5003b which are adapted to removably receive and securely hold the projections 5009a and 5009b, respectively, of the latch 5008. When assembled, the projections 5009a and 5009b fit into and are securely held in the recesses 5003a and 5003b.

Figure 43:
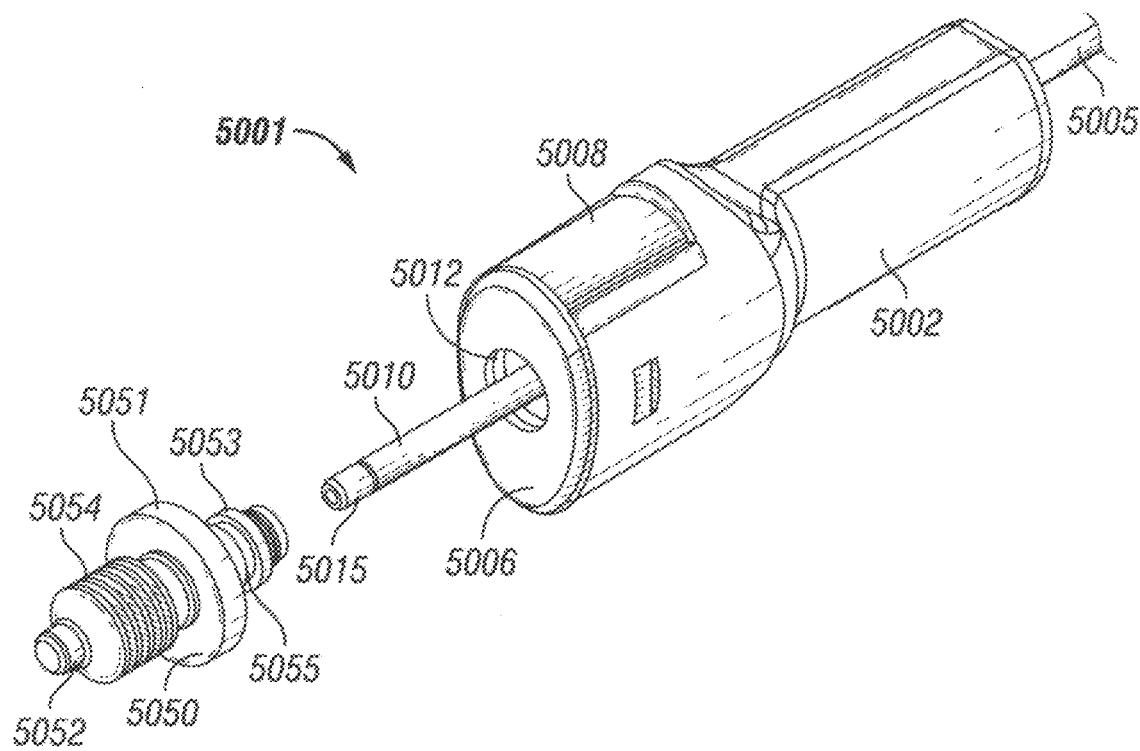
FIG. 43 is a partially exploded three-dimensional view of a fluidic connection assembly of one particular embodiment in accordance with the present disclosure.

Now referring to FIG. 43, the assembly 5001 is shown with tubing 5005 extending therethrough. In addition, an adapter 5050 is shown. The adapter 5050 has a first end and a second end. The first end of the adapter 5050 is adapted to fit into and be held securely in place by the interior extending projection 5008a of the latch 5008. As shown in FIG. 43, the first end has a radially outward projection 5053, as well as an annular notch or ring 5055 with a smaller outside diameter than the annular projection 5053. In addition, the projection 5053 has a ramped portion facing towards the opening 5012. The ramped portion of the annular flange 5053 is adapted to cooperate with a ramped portion of the projection 5008a of the latch 5008. The ramped portions are adapted so that no tools or excessive force is required for an operator or user to insert the first end 5053 of the adapter 5050 into the opening 5012 and engage the ramped portions so that the projection 5008a fits into at least a portion of the annular notch 5055 and thereby securely holds the adapter 5050 and the latch 5008 (and thereby the assembly 5001) together. In addition, the adapter 5050 includes a second annular flange 5051 which extends radially outwardly in a central portion of the adapter 5050. Near the second end 5052 of the adapter 5050 are external threads 5054.

As also shown in FIG. 43, one end of the tubing 5005 has a tip 5015 provided. As also shown in FIG. 43, at least a portion of the tip 5015 and the tubing 5005 are enclosed by a sleeve 5010. The relationship of the tube 5005, sleeve 5010, and tip 5015 can be as described above, and the tube 5005, sleeve 5010, and tip 5015 can be of any of the shapes and made of any of the materials noted above with respect to the earlier description thereof. Those skilled in the art will further appreciate that other types of tubing, such as without tip 5015 and/or without a sleeve 5010, or with different configurations for either or both the tip 5015 and/or sleeve 5010, can be used with the assembly 5001 as described herein.

Figure 44:
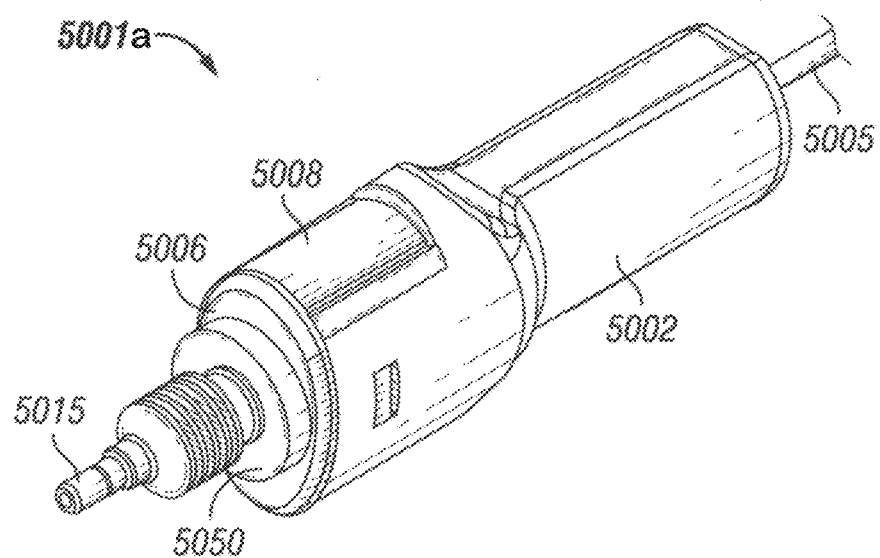
FIG. 44 is a three-dimensional view of the fluidic connection assembly of FIG. 43 in an assembled state.

In FIG. 44, assembly 5001a is shown in an assembled state. The assembly 5001a includes the body 5002, tubing 5005, the latch 5008, the cap 5006, the adapter 5050, and the tip 5015. As can be seen from a comparison of FIGS. 43 and 44, FIG. 44 shows the adapter 5050 as inserted into the opening of the cap 5006 and held by the latch 5008 projection 5008a (not seen in FIG. 44). As assembled, the adapter 5050, cap 5006, latch 5008, and body 5002 form an assembly 5001a which will securely hold together, and which can be used to secure one end of the tubing 5005 (or, as shown in FIG. 44, the tip 5015 at one end of the tubing 5005) to a port of or to another component in a fluidic system, such as an analytical instrument system.

Referring now to FIG. 45, a cross-sectional view of the assembly 5001 and the adapter 5050 is provided. As can be seen, the adapter 5050 has a first end 5057 and a second end 5052. Proximal the first end 5057 is an annular flange or radially outwardly extending projection 5053. The ramped portion of the flange 5053 is shown and is located on the side of the flange 5053 facing the assembly 5001. In addition, a portion of the adapter behind the flange 5053 has a smaller diameter and can be considered a notch portion 5055 directly behind or proximal behind the flange 5053. In addition, the adapter has external threads 5054 and a second end adapted to fit into and form a seal in a flat bottomed port or other component.

Still referring to FIG. 45, it can be seen that the spring 5020 is located within a hollow portion of the body 5002, and one end of the spring 5020 abuts an interior surface of one end of the body 5002. In addition, a second end of the body 5002 is removably attached to one side of the latch 5008. As shown in FIG. 45, the second end of the body 5002 provides a recess in which the second spring 5007 is located. As will be appreciated by those skilled in the art, the second spring 5007 is used to press the inward projection 5008a of the latch 5008 into the notch 5055 of the adapter 5050 when the first end 5057 of the adapter 5050 is inserted into the second end of the assembly 5001. Similarly, it will be appreciated that the spring 5020 is adapted to press the washer 5025 and, in turn, one end of the sleeve 5010 and also the tip 5015, away from the second end of the body 5002 (and towards the left side of the view shown in FIG. 45 in this orientation of the assembly 5001).

It will be appreciated that the external threaded portion 5054 of the adapter 5050 is adapted to removably engage with an internally threaded portion of a port or other component (not shown in FIG. 45). In the particular configuration of the adapter 5050 as shown, it will be appreciated the end 5052 of the adapter 5050 is adapted for use with a flat-bottomed port for sealing engagement with the tip 5015 when the tip 5015 is pressed against the bottom of the port. Those skilled in the art will appreciate that, although a flat-bottomed port has been described, any one of a number of different components of an analytical instrument system may comprise a port that may be connected as described to the assembly 5001 and adapter 5050. For example, other components which might have ports sealingly connected to the assembly 5001 and adapter 5050 include at least the following: a column, or may be a port which is part of a manifold, a pump, a valve, a column, a filter, a guard column, a detector, a pressure regulator, a reservoir, a degasser, a debubbler, a union, a tee, a cross, a splitter, a sample loop, a connector, or another component in an AI instrument or system. The means for exerting an axial force may comprises a spring, including without limitation a coiled spring. In addition, those skilled in the art will appreciate that, although not shown, the end 5052 of the adapter 5050 may be of a configuration that is adapted to provide a sealing engagement in a frusta-conical shaped port or component.

FIG. 46 provides a cross-sectional view of the assembly 5001a as assembled and ready for insertion into a flat-bottomed port or component of an analytical instrument system (not shown) to provide a sealing engagement.

It will be appreciated from the foregoing disclosure that the assembly 5001a allows an operator or user to easily insert the end of the tubing having the tip 5015 and the end 5052 of the adapter 5050 into a flat-bottomed port by engaging internal threads of the port or component (not shown) with the external threads of the adapter 5050. The force exerted by the biasing of the spring 5020 will maintain a sealing engagement of the tip 5015 and the bottom face of the port of component. We believe that the assembly 5001a can be used to achieve leak-free, sealing connections without any extrusion of tubing 5005 from a port when fluid is flowing through the tubing 5005 at pressures of up to at least 20,000 psi, including for biocompatible applications.

The fluidic connection assembly 5001 and assembly 5001a, as well as adapter 5050, in accordance with the present disclosure may comprise any one or more of various materials, which may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand polyetherimide (PEI), polyetherketoneketone (PEKK), polyaryletherketone (PAEK), polyethylene, polypropylene, polyvinylchloride, acrylic, and/or other materials, such a fused silica, silica barite, PEEKsil, and the like. The tubing 5005, tip 5015, and sleeve 5010 in the assembly 5001 similarly may comprise any one or more of the foregoing materials. In addition, those skilled in the art will appreciate that the various constituent components of the assembly 5001, and/or adapter 5050, may comprise the same or may comprise different materials. For example, assembly 5001 in one particular embodiment may have a body 5002 which comprises PEEK, a cap 5006 which comprises PEEK, and a latch 5008 which comprises PEEK, while springs 5020 and 5007 comprise a metal such as stainless steel, and such an assembly 5001 can be used with an adapter 5050 made of metal such as stainless steel. Those skilled in the art will further appreciate that, for those components made of polymeric materials, the polymeric material may include fibers, including carbon fibers, metallic fibers, and the like. It will be further appreciated that, even if an adapter 5050 comprises metal, the overall fluidic connection made with assembly 5001a can still be biocompatible, as long as the tubing tip 5015 of the tubing 5005 extending through the assembly 5001a, and in sealing engagement with the bottom of the port, comprise biocompatible materials.

Those skilled in the art will also appreciate that the material and size of spring members 5020 and 5007 can be selected so that the spring members 5020 and 5007 provide the desired amount of force, or biasing, when engaged (as described in more detail above) in a fluidic connection in a desired application. For example, one of skill would appreciate that it would be advantageous to have the spring member 5020 and spring 5007 provide a greater biasing force when the assembly 5001 will be used in an application with a greater fluidic pressure, than might be the case if the assembly 5001 is to be used in an application with a relatively small fluidic pressure. For example, not all fluidic connections in a given AI system used for a given application need operate under the same fluid pressure. The fluid pressures may change even in such situations for different connections in the AI system.

Methods of making a fluidic connection or disconnecting tubing from a port or component with respect to the assembly 5001 and FIGS. 42-46 are now summarized. In making a connection, an operator or user may perform the steps of providing a tube 5005 having first and second ends, wherein the second end may comprise a compressible tip, inserting one end of the tube through a body 5002, wherein said body 5002 comprises a first end and a second end, said body 5002 further having a passageway therethrough adapted to receive a tube 5005 extending through said body, and wherein an interior portion proximal the second end of said body is adapted to cooperate with a spring 5020 for exerting a force against a washer or disc 5025 which in turn exerts a force against a sleeve 5010 which surrounds a portion of the tube 5005, thus biasing the end of the tube 5005 in a longitudinal direction away from the body 5002. In addition, the operator or user may insert a portion (such as projections 5009a and 5009b) of a latch 5008 into a portion of the body 5002 adapted to receive and hold them, and insert a portion of a cap 5006 into or around an exterior portion of the latch 5008 (such as projection 5011a and 5011, which are adapted to engage with a portion of latch 5008 and hold cap 5006 and latch 5008 together). A spring 5007 may also be inserted into a recess in the body 5002, with the spring 5007 adapted to urge the latch 5008 upward and radially outwardly.

The user or operator alternatively may simply obtain a tube 5005 and place one end through the interior passageway of the assembly 5001 once assembled. In either case, an adapter 5050 can be provided and the user or operator can insert one end of the tube 5005 into the passageway through the adapter 5050, and insert one end 5057 of the adapter 5050 into the opening of the cap 5006 and the interior portions of latch 5008 and/or body 5002. As noted and described above, the annular projection or flange 5053 of the adapter 5050 has ramped or angled portions adapted to engage with the ramped portions of the latch 5008 to allow the user or operator to compress the spring 5020 more easily and have the latch 5008 securely engage with and hold the adapter 5050 in place. An operator or user can then insert the threaded end of the adapter 5050 into a port or other component such as any of the types described above, and then engage the threaded portion of the port or component (not shown) to obtain a secure and sealed fluidic connection. To disconnect the assembly 5001 from the port or component, a user may turn the assembly 5001 and/or the port or other component (not shown) in the opposite direction to disengage the threaded portions from one another, then remove the adapter 5050 and assembly 5001 and the tube 5005 from the port or other component.

The spring 5020 may be selected to provide a preselected force or range of force adapted to be sufficient to force the tip 5015 against the bottom face of the port or component to provide a sealing engagement which does not leak and which will be sufficient to prevent the tubing 5005 from being forced out of a sealing engagement due to the intended pressures for the fluid flowing through the tubing 5005. It will also be appreciated that the spring 5020 may be selected so that the force required to compress the spring, such as by inserting one end of the adapter 5050 into the cap 5006 and latch 5008 and securely engage the adapter 5050 with the assembly 5001, is relatively limited and does not require any tools or equipment, but can be done by an operator or user by hand. Moreover, it will be appreciated that the adapter 5050 and assembly 5001 connection, once made, may be permanent or may be a removable connection, especially if the intended use of the assembly 5001 is for lower pressure applications and therefore the force required to keep the assembly 5001 and adapter 5050 secured together is not as great. In such situations, the second spring 5007 can be selected to provide a relatively lower force against the bottom of the latch 5008.

Those skilled in the art will also appreciate that the embodiments shown and described in the present disclosure can be used in a variety of different configurations. For example, although the embodiments shown and described above have referred to use with flat-bottomed ports, those skilled in the art will appreciate that the assembly in its various embodiments of this disclosure can also be used in coned ports or other types of connections, including those described above. In addition, various types of tubing and fitting assembly configurations may be used in addition to those shown and described, including without limitation those face-sealing assemblies shown and described in co-pending U.S. patent application Ser. No. 14/922,041 filed on Oct. 23, 2015, and titled "Face-Sealing Fluidic Connection System," which was published as U.S. published patent application US 2016/0116088 A1 on Apr. 28, 2016, and is hereby incorporated by reference as fully set forth herein.

In addition to the tubing assemblies shown and described in US Published Patent Application No. 2016/0116088 A1, other types of tubing assemblies may be used in accordance with various embodiments of the present disclosure, such as those illustrated in FIGS. 42-46 and described above, for example. The tube 5005 can be any one of a number of materials. In one particular embodiment, tube 5005 may be a capillary tube. Similarly, sleeve 5010 can be comprised of various materials. Tip 5015 also can be made of various materials. The tubing 5005, tip 5015, and sleeve 5010 may comprise any one or more of the following materials, and need not comprise the same material as each other, and such materials may include metal, such as steel, including stainless steel, aluminum, titanium, as well as polymeric materials such as polyetheretherketone (PEEK), polyoxymethylene (POM) such as available under the mark DELRIN and known sometimes as acetal, RADEL brand polyphenylsulfone (PPSU), ULTEM brand poiyetherimide (PEI), polyetherketoneketone (PEKK), polyaryletherketone (PAEK), polyethylene, polypropylene, polyvinylchloride, acrylic, and/or other materials, such a fused silica, silica borite, PEEKsil, and the like.

While the present invention has been shown and described in various embodiments, those skilled in the art will appreciate from the drawings and the foregoing discussion that various changes, modifications, and variations may be made without departing from the spirit and scope of the invention as set forth in the claims. Those skilled in the art will further appreciate that various materials can be used in place of or in addition to those described herein, and that the embodiments shown and described can be used in additional applications and provide additional advantages beyond those set forth herein. Hence, the embodiments shown and described in the drawings and the above discussion are merely illustrative and do not limit the scope of the invention as defined in the claims herein. The embodiments and specific forms, materials, and the like are merely illustrative and do not limit the scope of the invention or the claims herein.

We claim:

1. A fluidic connection assembly comprising:
a body having a first end and a second end, each of the first and second ends having openings therein, and having a hollow portion therein;
a first spring located at least partially within the hollow portion of said body, and having a first end abutting an interior surface of the hollow portion of said body;
a latch member having an opening therethrough and having a base portion and a top portion, wherein the base portion of said latch member is adapted to fit at least partially within said body, and wherein the top portion has one or more projections adapted to be held in recesses on an exterior portion of said body;
a cap member having an opening therethrough and having first and second sides and an extension on the first side of said cap member which is adapted to extend into at least a portion of the hollow portion of said body and to hold said latch member and said cap member together, wherein the second side of said cap member is adapted to be attached to the second end of said body; and
wherein said latch member is adapted to engage with and securely hold an adapter when a portion of one end of the adapter is inserted into the opening of said cap member and the opening of said latch member, and wherein each of said body, said first spring, said latch member, and said cap member have a hollow passage therethrough, wherein the hollow passages form a continuous pathway from the first end to the second end of the body, and wherein the continuous pathway is adapted to receive a tube therein extending from the first end to the second end of the body.

2. The fluidic connection assembly of claim 1 wherein said first spring is in a compressed state when said cap member, said latch member, and said body are assembled together and said first spring is located entirely within the hollow portion of said body.

3. The fluidic connection assembly of claim 1 further comprising a second spring, wherein said second spring is located within the hollow portion of said body and adjacent to at least one side of said latch member.

4. The fluidic connection assembly of claim 3 wherein said second spring is adapted to bias said latch member so that a radially inward projection of said latch member is pressed against a portion of said adapter when a first end of the adapter is inserted into said latch member.

5. The fluidic connection assembly of claim 1 further comprising a tube having one end which extends through the pathway and through the first and second ends of said body, said first spring, said latch member, and extends out of the opening of the second side of said cap member.

6. The fluidic connection assembly of claim 5 wherein said first spring exerts a force which urges the one end of said tube away from said body.

7. The fluidic connection assembly of claim 6 further comprising a washer located within said body and adjacent to a second end of said first spring, a sleeve member surrounding at least a portion of said tube, wherein said sleeve member has a first end and a second end, and wherein said first spring exerts a force on said washer and said washer exerts a force on said sleeve, and said sleeve exerts a force on said tube which urges the one end of said tube away from said body.

8. A fluidic connection assembly comprising:
a body having a first end and a second end, each of the first and second ends having openings therein, and having a hollow portion therein;
a first spring member located at least partially within the hollow portion of said body;
a latch member having an opening therethrough and having a base portion adapted to removably fit at least partially within said body;
a cap member having an opening therethrough and having first and second sides and an extension on the first side of said cap member which is adapted to removably hold said latch member and said cap member together, wherein the second side of said cap member is adapted to be attached to the second end of said body, and wherein said latch member is adapted to engage with and removably hold an adapter when a portion of the adapter is inserted into the opening of said cap member and the opening of said latch member, wherein each of said body, said first spring member, said latch member, and said cap member have a hollow passage therethrough, wherein the hollow passages form a continuous passageway from the first end to the second end of the body, and wherein the continuous passageway is adapted to receive a tube therein extending from the first end to the second end of the body.

9. The fluidic connection assembly of claim 8 wherein said first spring member is in a compressed state when said cap member, said latch member, and said body are assembled together and said first spring member is located entirely within the hollow portion of said body.

10. The fluidic connection assembly of claim 8 further comprising a second spring member, wherein said second spring member is at least partially located within a pocket portion of said body and adjacent to at least one side of said latch member.

11. The fluidic connection assembly of claim 10 wherein said second spring member is adapted to bias said latch member so that a radially inward projection of said latch member is pressed against a portion of said adapter when the adapter is inserted into said latch member.

12. The fluidic connection assembly of claim 8 further comprising a tube having one end which extends through the passageway and through the first and second ends of said body, said first spring member, said latch member, and extends out of the opening of the second side of said cap member.

13. The fluidic connection assembly of claim 12 wherein said first spring member urges the one end of said tube away from said body.

14. The fluidic connection assembly of claim 8 further comprising a washer located within said body and adjacent to a second end of said first spring member, wherein the passageway comprises tubing and a sleeve member surrounding at least a portion of said tubing, said sleeve member having a first end and a second end, and wherein said first spring member exerts a force on said washer and said washer exerts a force on said sleeve, and said sleeve urges an end of said tubing away from said body.

15. The fluidic connection assembly of claim 8 wherein at least one of said body, said latch member, and said cap member comprise polyetherketoneketone.

16. The fluid connection assembly of claim 8, wherein said assembly is adapted to provide a leak-free connection of one end of tubing when fluid is flowing through the tubing at pressures up to at least 5,000 psi.

17. The fluidic connection assembly of claim 8, wherein when a first end of the adapter is located within the second end of the body, a radially inward projection of the latch member presses against a portion of the first end of the adapter.

18. The fluidic connection assembly of claim 17, wherein a second end of the adapter is adapted to removably engage a port.

19. The fluidic connection assembly of claim 18 wherein the port comprises a flat-bottomed port.

20. A fluidic connection assembly comprising:
a body having a first end and a second end, each of the first and second ends having openings therein, and having a hollow portion therein;
a first spring located within the hollow portion of the body, and having a first end abutting an interior surface of the hollow portion of the body;
a latch member having an opening therethrough and having a base portion and a top portion, wherein the base portion of the latch member is adapted to fit at least partially within the body, and wherein the top portion has one or more projections adapted to be held in one or more corresponding recesses on an exterior portion of the body;
a cap member having an opening therethrough and having first and second sides and an extension on the first side of the cap member which is adapted to extend into at least a portion of the hollow portion of the body and to removably hold the latch member and the cap member together, wherein the second side of the cap member is adapted to be attached to the second end of the body, and wherein the latch member is adapted to removably hold an adapter when a portion of one end of the adapter is inserted into the opening of the cap member and the opening of the latch member, wherein each of the body, the first spring, the latch member, and the cap member have a hollow passage therethrough, wherein the hollow passages form a continuous pathway from the first end to the second end of the body, wherein the continuous pathway is adapted to receive a tube therein extending from the first end to the second end of the body, and wherein when the cap member, the latch member, and the body are assembled together, the first spring is located entirely within the hollow portion of said body.

21. The fluidic connection assembly of claim 20 further comprising a second spring, wherein said second spring is located within the hollow portion of the body and adjacent to at least one side of the latch member.

22. The fluidic connection assembly of claim 21 wherein the second spring is adapted to bias the latch member so that a radially inward projection of the latch member is pressed against a portion of the adapter when a first end of the adapter is inserted into the latch member.

* * * * *